(12) United States Patent
Nakada et al.

(10) Patent No.: US 7,983,827 B2
(45) Date of Patent: Jul. 19, 2011

(54) BRAKE CONTROL APPARATUS

(75) Inventors: Yuki Nakada, Atsugi (JP); Katsuya Iwasaki, Isehara (JP)

(73) Assignee: Hitachi, Ltd., Tokyo (JP)

( * ) Notice: Subject to any disclaimer, the term of this patent is extended or adjusted under 35 U.S.C. 154(b) by 850 days.

(21) Appl. No.: 11/984,011

(22) Filed: Nov. 13, 2007

(65) Prior Publication Data
US 2008/0120004 A1 May 22, 2008

(30) Foreign Application Priority Data
Nov. 16, 2006 (JP) ................................. 2006-310251

(51) Int. Cl.
G06F 7/00 (2006.01)
(52) U.S. Cl. ............. 701/78; 701/70; 303/167; 303/121
(58) Field of Classification Search ................... 701/70, 701/78; 303/3, 11, 117.1, 121, 122, 146, 303/167
See application file for complete search history.

(56) References Cited

U.S. PATENT DOCUMENTS

| | | | | |
|---|---|---|---|---|
| 5,114,216 A * | 5/1992 | Tsuda et al. | ................ | 303/117.1 |
| 5,782,541 A * | 7/1998 | Schappler | ......................... | 303/3 |
| 6,010,198 A * | 1/2000 | Nakazawa | ................. | 303/113.1 |
| 6,123,397 A * | 9/2000 | Ohtomo et al. | .......... | 303/122.05 |
| 6,450,591 B1* | 9/2002 | Kawahata et al. | ....... | 303/122.05 |
| 6,739,676 B1* | 5/2004 | Isono et al. | ................ | 303/114.3 |
| 6,913,326 B1* | 7/2005 | Ohkubo et al. | ................. | 303/11 |
| 2001/0006306 A1* | 7/2001 | Kagawa et al. | ................ | 303/20 |
| 2002/0011750 A1* | 1/2002 | Higashimura et al. | ..... | 303/117.1 |
| 2002/0079736 A1* | 6/2002 | Soga | ........................... | 303/113.1 |
| 2005/0182550 A1* | 8/2005 | Matsuura | ......................... | 701/78 |
| 2006/0087173 A1 | 4/2006 | Kajiyama et al. | | |
| 2006/0087175 A1* | 4/2006 | Nakaoka et al. | ............... | 303/121 |
| 2006/0120885 A1* | 6/2006 | Sakikawa et al. | .......... | 417/269 |
| 2006/0267401 A1* | 11/2006 | Nishio et al. | .................. | 303/11 |
| 2007/0016352 A1* | 1/2007 | Tsunehara et al. | .............. | 701/70 |
| 2007/0069577 A1* | 3/2007 | Nakaura et al. | ............... | 303/155 |
| 2007/0090690 A1* | 4/2007 | Ohkubo | ......................... | 303/122 |
| 2007/0106444 A1* | 5/2007 | Asano | .............................. | 701/70 |
| 2009/0079259 A1* | 3/2009 | Iwasaki et al. | ................ | 303/146 |
| 2009/0091180 A1* | 4/2009 | Iwasaki et al. | .................. | 303/11 |

FOREIGN PATENT DOCUMENTS

| | | | |
|---|---|---|---|
| DE | 36 36 139 A1 | 4/1988 | |
| DE | 44 28 929 A1 | 2/1996 | |
| EP | 1 498 333 A2 | 1/2005 | |
| JP | 2000-159094 A | 6/2000 | |

* cited by examiner

Primary Examiner — Mark Hellner
Assistant Examiner — Helal A Algahaim
(74) Attorney, Agent, or Firm — Foley & Lardner LLP

(57) ABSTRACT

A brake control apparatus for a wheeled vehicle includes wheel cylinders; a pump hydraulically connected to the wheel cylinders for pressurizing the wheel cylinders; a motor for driving the pump; control valves hydraulically connected between the pump and respective ones of the wheel cylinders for allowing fluid communication therebetween with respective variable cross-sectional flow areas; a pressure sensor for measuring an internal pressure of each of the wheel cylinders; and a control unit. The control unit performs wheel cylinder pressure control of controlling the internal pressures of the wheel cylinders by the motor and the control valves so as to conform the measured internal pressures of the wheel cylinders to respective ones of desired internal pressures of the wheel cylinders. During the wheel cylinder pressure control, the control unit constantly keeps a condition that the cross-sectional flow area of at least one of the control valves is maximized.

20 Claims, 30 Drawing Sheets

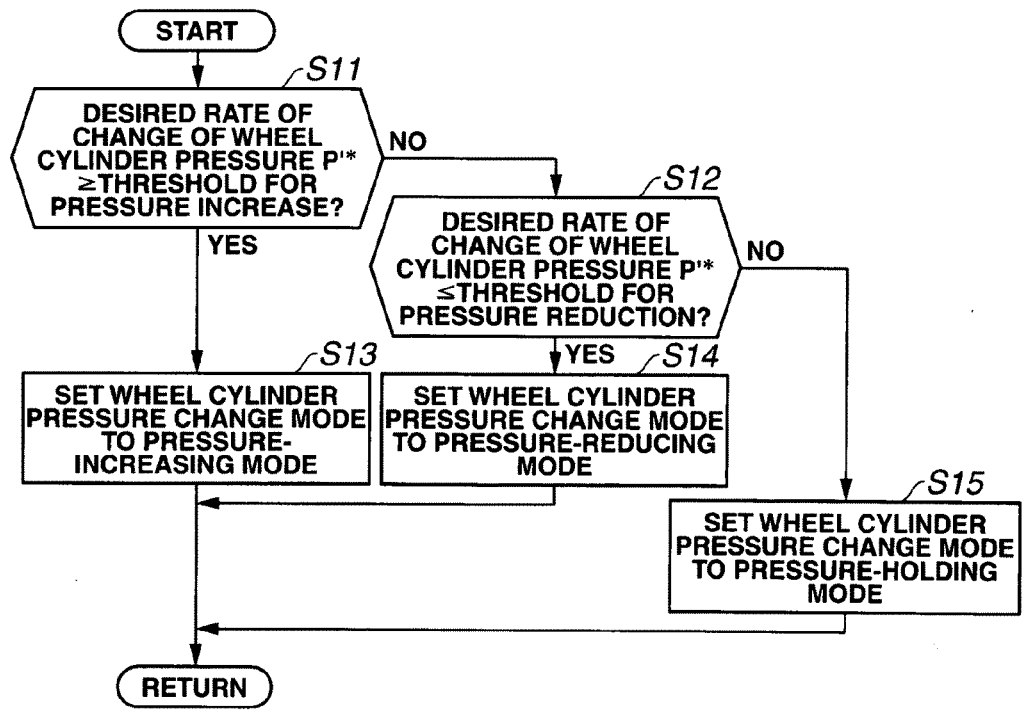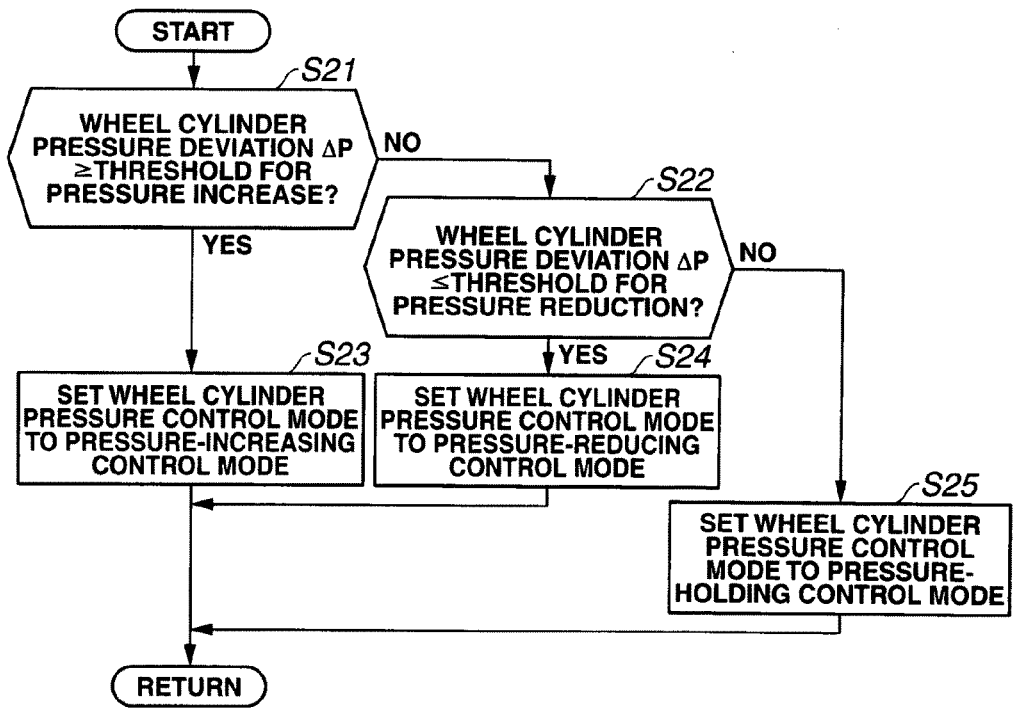

BRAKE CONTROL APPARATUS

BACKGROUND OF THE INVENTION

The present invention relates generally to brake control apparatuses for wheeled vehicles, and more particularly to brake control apparatuses with a brake-by-wire system for controlling the internal pressures of wheel cylinders to produce braking efforts.

Japanese Patent Application Publication No. 2000-159094 corresponding to Japanese Patent No. 3409721 discloses a brake control apparatus including a motor-driven pump, wheel cylinders, and electromagnetic valves hydraulically connected between the pump and respective ones of the wheel cylinders, in which the wheel cylinders are hydraulically separated from a master cylinder under normal operating conditions. This brake control apparatus is configured to compute desired wheel cylinder pressures on the basis of measured values from a stroke sensor and a master cylinder pressure sensor, and to control the motor-driven pump and the electromagnetic valves so as to attain the desired wheel cylinder pressures.

SUMMARY OF THE INVENTION

Generally, in such a brake control apparatus as disclosed in Japanese Patent Application Publication No. 2000-159094, the volumetric capacity of fluid passages extending from the discharge port of the pump to respective ones of the electromagnetic valves are designed to be relatively small for minimizing the size of the brake control apparatus. Under condition that the electromagnetic valves are closed, pump pulsing flow is to be absorbed within the fluid passages. When the hydraulic circuit of the brake control apparatus is precharged, the level of fluctuations in the hydraulic pressure on the discharge side of the pump is relatively large, because the fluid passages are relatively small so that the fluctuations are absorbed insufficiently. This adversely affects the controllability of the wheel cylinder pressures.

Therefore, it is desirable for a brake control apparatus to minimize the level of fluctuations in the hydraulic pressure on the discharge side of a pump so as to enhance the controllability of wheel cylinder pressures.

According to one aspect of the present invention, a brake control apparatus for a wheeled vehicle comprises: a plurality of wheel cylinders adapted to respective ones of wheels of the vehicle; a pump hydraulically connected to the wheel cylinders for pressurizing the wheel cylinders; a motor for driving the pump; a plurality of control valves hydraulically connected between the pump and respective ones of the wheel cylinders for allowing fluid communication therebetween with respective variable cross-sectional flow areas; a pressure sensor for measuring an internal pressure of each of the wheel cylinders; and a control unit for performing wheel cylinder pressure control of controlling the internal pressures of the wheel cylinders by the motor and the control valves so as to conform the measured internal pressures of the wheel cylinders to respective ones of desired internal pressures of the wheel cylinders, the control unit being configured to, during the wheel cylinder pressure control, constantly keep a condition that the cross-sectional flow area of at least one of the control valves is maximized. The control unit may be configured to implement the keeping the condition by: identifying one of the wheel cylinders that is the highest in the desired internal pressure among all the wheel cylinders; and maximizing the cross-sectional flow area of one of the control valves hydraulically connected between the pump and the identified one of the wheel cylinders. The control unit may be configured to implement the keeping the condition by: determining for each of the wheel cylinders whether or not it is desired to increase the internal pressure of the each of the wheel cylinders; identifying one of the wheel cylinders that is the highest in the desired internal pressure among at least one of the wheel cylinders, when determining that it is desired to increase the internal pressure of the at least one of the wheel cylinders; and maximizing the cross-sectional flow area of one of the control valves hydraulically connected between the pump and the identified one of the wheel cylinders. The brake control apparatus may further comprise: a plurality of unidirectional valves hydraulically connected between the pump and respective ones of the control valves for allowing fluid flow from the pump to the respective ones of the control valves and inhibiting fluid flow from the respective ones of the control valves to the pump, wherein the control unit may be configured to implement the keeping the condition by: identifying a first one of the wheel cylinders that is the highest in the desired internal pressure among all the wheel cylinders; maximizing the cross-sectional flow area of one of the control valves hydraulically connected between the pump and the first identified one of the wheel cylinders; determining for each of the wheel cylinders whether or not it is desired to increase the internal pressure of the each of the wheel cylinders; and when determining that it is desired to increase the internal pressure of at least one of the wheel cylinders, and that it is not desired to increase the first identified one of the wheel cylinders: identifying a second one of the wheel cylinders that is the highest in the desired internal pressure among the at least one of the wheel cylinders; and maximizing the cross-sectional flow area of one of the control valves hydraulically connected between the pump and the second identified one of the wheel cylinders.

According to another aspect of the invention, a brake control apparatus for a wheeled vehicle comprises: a plurality of wheel cylinders adapted to respective ones of wheels of the vehicle; a pump hydraulically connected to the wheel cylinders for pressurizing the wheel cylinders; drive means for driving the pump; a plurality of control valves hydraulically connected between the pump and respective ones of the wheel cylinders for allowing fluid communication therebetween with respective variable cross-sectional flow areas; means for measuring an internal pressure of each of the wheel cylinders; and control means for performing wheel cylinder pressure control of controlling the internal pressures of the wheel cylinders by the drive means and the control valves so as to conform the measured internal pressures of the wheel cylinders to respective ones of desired internal pressures of the wheel cylinders, the control means being configured to, during the wheel cylinder pressure control, constantly keep a condition that the cross-sectional flow area of at least one of the control valves is maximized. The control means may be configured to implement the keeping the condition by: identifying one of the wheel cylinders that is the highest in the desired internal pressure among all the wheel cylinders; and maximizing the cross-sectional flow area of one of the control valves hydraulically connected between the pump and the identified one of the wheel cylinders. The control means may be configured to implement the keeping the condition by: determining for each of the wheel cylinders whether or not it is desired to increase the internal pressure of the each of the wheel cylinders; identifying one of the wheel cylinders that is the highest in the desired internal pressure among at least one of the wheel cylinders, when determining that it is desired to increase the internal pressure of the at least one of the wheel cylinders; and maximizing the cross-sectional flow area of one of the control valves hydraulically connected between the pump and the identified one of the wheel cylinders. The brake control apparatus may further comprise: a plurality of unidirectional valves hydraulically connected between the pump and respective ones of the control valves for allowing fluid flow from the pump to the respective ones of the control valves and inhibiting fluid flow from the respective ones of the control valves to the pump, wherein the control means may be configured to implement the keeping the condition by: identifying a first one of the wheel cylinders that is the highest in the desired internal pressure among all the wheel cylinders; maximizing the cross-sectional flow area of one of the control valves hydraulically connected between the pump and the first identified one of the wheel cylinders; determining for each of the wheel cylinders whether or not it is desired to increase the internal pressure of the each of the wheel cylinders; and when determining that it is desired to increase the internal pressure of at least one of the wheel cylinders, and that it is not desired to increase the first identified one of the wheel cylinders: identifying a second one of the wheel cylinders that is the highest in the desired internal pressure among the at least one of the wheel cylinders; and maximizing the cross-sectional flow is area of one of the control valves hydraulically connected between the pump and the second identified one of the wheel cylinders.

BRIEF DESCRIPTION OF THE DRAWINGS

FIG. 4 is a flow chart showing a detailed process of selection for wheel cylinder pressure change mode according to the first embodiment (FIG. 3, Step S10).

FIG. 5 is a flow chart showing a detailed process of selection for wheel cylinder pressure control mode according to the first embodiment (FIG. 3, Step S20).

DETAILED DESCRIPTION OF THE INVENTION

Figure 1:
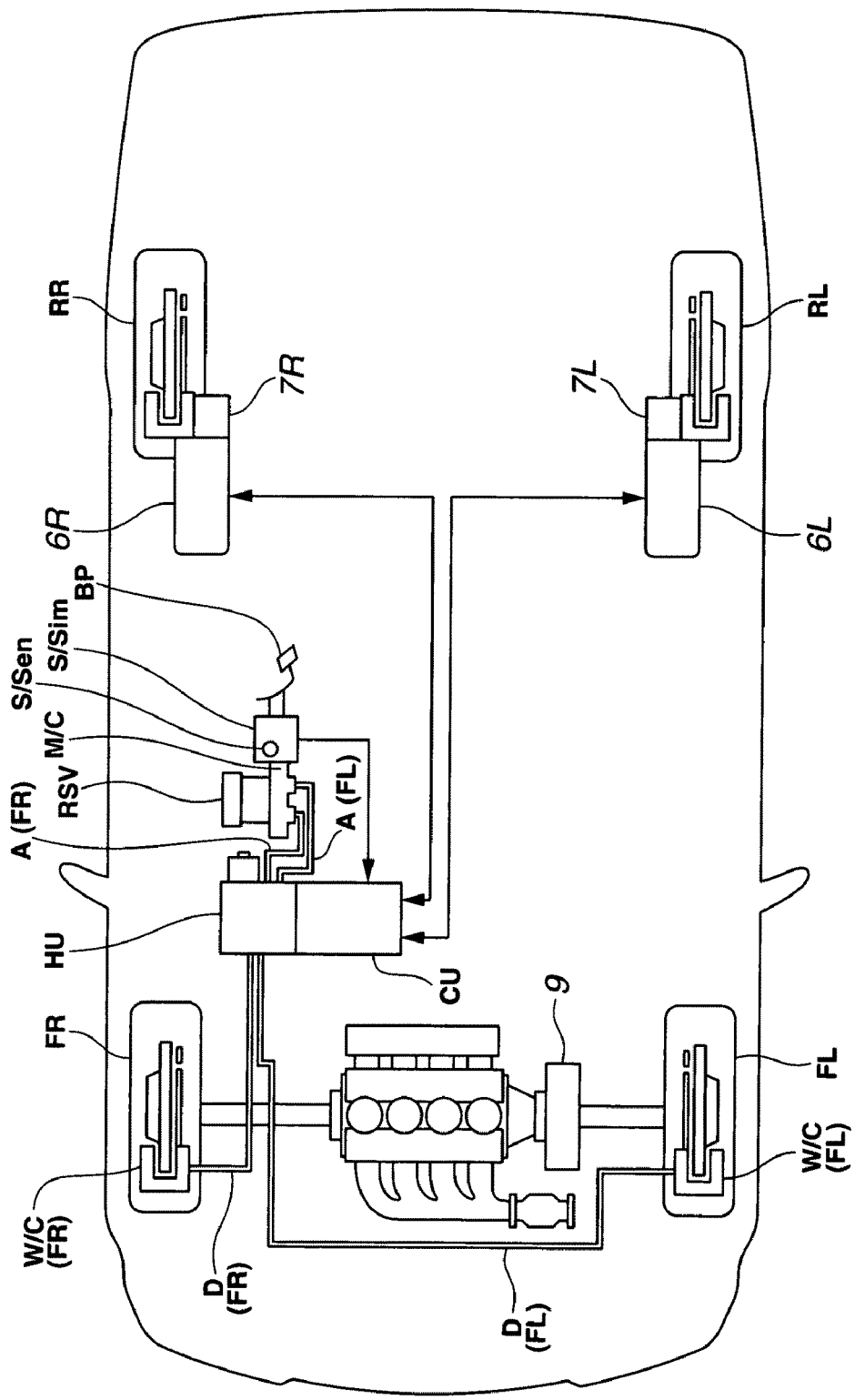
FIG. 1 is a system configuration diagram of a brake control apparatus according to a first embodiment of the present invention.

The following describes a brake control apparatus according to a first embodiment of the present invention with reference to FIGS. 1 to 15. As shown in FIG. 1, the brake control apparatus according to the first embodiment includes a hydraulic brake-by-wire system adapted only to front left and right wheels "FL" and "FR" for producing braking efforts based on a pump discharge pressure in which a single hydraulic unit "HU" controls front left and right wheel cylinder pressures "Pfl" and "Pfr". The brake control apparatus further includes a control unit "CU" for controlling the hydraulic unit HU. The brake-by-wire system includes a single piping system and a single electric system with a fail-safe function. Rear left and right wheels "RL" and "RR" are provided with an electric brake system with no hydraulic system for electrically producing braking efforts.

A master cylinder "M/C" is provided with a stroke sensor "S/Sen" and a stroke simulator "S/Sim". When depressed, a brake pedal "BP" generates a hydraulic pressure in master cylinder M/C. Simultaneously, stroke sensor S/Sen outputs a stroke signal "S" to control unit CU, where stroke signal S is indicative of the stroke of brake pedal BP. Master cylinder M/C supplies a hydraulic pressure to hydraulic unit HU through fluid passages "A(FL)" and "A(FR)". Control unit CU controls hydraulic unit HU so as to supply controlled hydraulic pressures through fluid passages "D(FL)" and "D(FR)" to front left and right wheel cylinders "W/C(FL)" and "W/C(FR)", respectively.

Control unit CU computes desired front left and right wheel cylinder pressures "P*fl" and "P*fr", and controls hydraulic unit HU so as to control the internal pressures of front left and right wheel cylinders W/C(FL) and W/C(FR). The brake control apparatus includes a regenerative braking unit 9 in addition to the hydraulic braking system, for applying additional or alternative braking efforts to front left and right wheels "FL" and "FR". The brake control apparatus includes rear left and right brake actuators "6L" and "6R" configured to receive control signals from control unit CU, and to control the braking efforts of rear left and right electric brake calipers "7L" and "7R", respectively.

When the brake-by-wire system is operating under normal operating conditions, control unit CU controls hydraulic unit HU to keep front left and right wheel cylinders W/C(FL) and W/C(FR) hydraulically separated from master cylinder M/C. Instead of master cylinder M/C, a hydraulic pump "P" provided in hydraulic unit HU supplies hydraulic pressures to front left and right wheel cylinders W/C(FL) and W/C(FR) so as to produce braking efforts. Hydraulic unit HU includes control valves for pressure reduction, and as appropriate, suitably controls the control valves so as to reduce the internal pressures of front left and right wheel cylinders W/C(FL) and W/C(FR), and thereby to prevent front left and right wheels FL and FR from locking. When the brake-by-wire system is failed, control unit CU controls hydraulic unit HU to supply the master cylinder pressure to front left and right wheel cylinders W/C(FL) and W/C(FR) so as to produce braking efforts.

Figure 2:
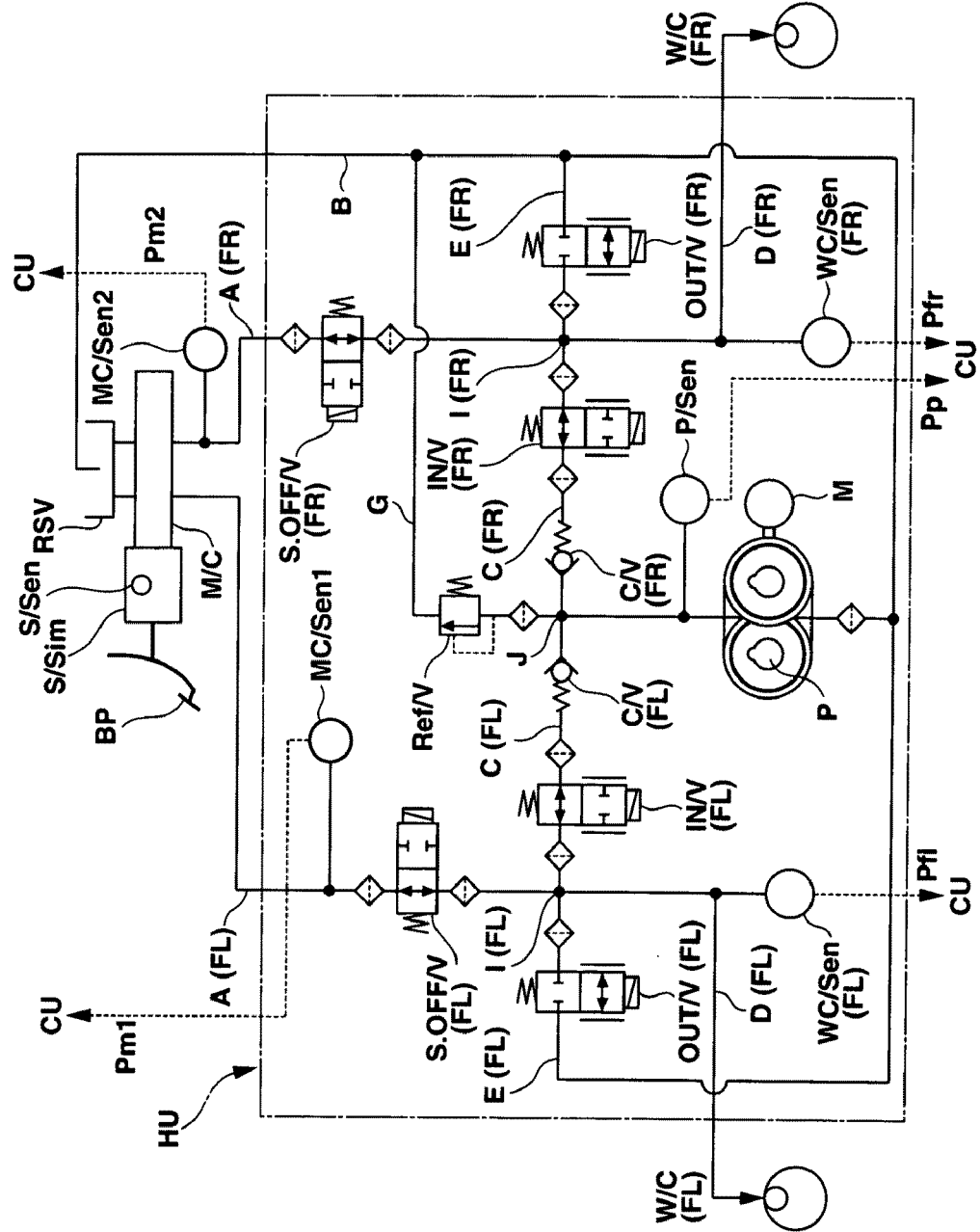
FIG. 2 is a hydraulic circuit diagram of a hydraulic unit according to the first embodiment.

The following describes the hydraulic circuit of hydraulic unit HU in detail with reference to FIG. 2. Hydraulic pump P includes a discharge port hydraulically connected through fluid passages "C(FL)" and "D(FL)" to front left wheel cylinder W/C(FL) and hydraulically connected through fluid passages "C(FR)" and "D(FR)" to front right wheel cylinder W/C(FR), and includes a suction port hydraulically connected through a fluid passage "B" to a reservoir "RSV". Fluid passages C(FL) and C(FR) are hydraulically connected to fluid passage B through fluid passages "E(FL)" and "E(FR)", respectively.

A node "I(FL)" between fluid passages C(FL) and E(FL) is hydraulically connected through fluid passage A(FL) to master cylinder M/C, while a node "I(FR)" between fluid passages C(FR) and E(FR) is hydraulically connected through fluid passage A(FR) to master cylinder M/C. A node "J" between fluid passages C(FL) and C(FR) is hydraulically connected through a fluid passage "G" to fluid passage B.

A shut-off valve "S.OFF/V(FL)" is disposed in fluid passage A(FL) for selectively allowing or shutting off fluid communication between master cylinder M/C and node I(FL), while a shut-off valve "S.OFF/V(FR)" is disposed in fluid passage A(FR) for selectively allowing or shutting off fluid communication between master cylinder M/C and node I(FR). Shut-off valves S.OFF/V(FL) and S.OFF/V(FR) are normally open electromagnetic valves.

A front left inlet valve "IN/V(FL)" is disposed in fluid passage C(FL) for continuously variably regulating the discharge pressure supplied from hydraulic pump P and supplying the regulated hydraulic pressure to front left wheel cylinder W/C(FL), while a front right inlet valve "IN/V(FR)" is disposed in fluid passage C(FR) for continuously variably regulating the discharge pressure supplied from hydraulic pump P and supplying the regulated hydraulic pressure to front right wheel cylinder W/C(FR). Front left and right inlet valves IN/V(FL) and IN/V(FR) are normally open linear electromagnetic valves for allowing fluid communication between hydraulic pump P and respective ones of front left and right wheel cylinders W/C(FL) and W/C(FR) with respective variable cross-sectional flow areas. A check valve (unidirectional valve) "C/V(FL)" is disposed in fluid passage C(FL) and hydraulically connected between front left inlet valve IN/V(FL) and node J for preventing brake fluid from inversely flowing from front left inlet valve IN/V(FL) to hydraulic pump P, while a check valve "C/V(FR)" is disposed in fluid passage C(FR) and hydraulically connected between front right inlet valve IN/V(FR) and node J for preventing brake fluid from inversely flowing from front right inlet valve IN/V(FR) to hydraulic pump P.

A front left outlet valve "OUT/V(FL)" is disposed in fluid passage E(FL) for continuously variably regulating the hydraulic pressure exiting from front left wheel cylinder W/C(FL), while a front right outlet valve "OUT/V(FR)" is disposed in fluid passage E(FR) for continuously variably regulating the hydraulic pressure exiting from front right wheel cylinder W/C(FR). Front left and right outlet valves OUT/V(FL) and OUT/V(FR) are normally closed linear electromagnetic valves. A relief valve "Ref/V" is disposed in fluid passage G between node J and fluid passage B.

A first master cylinder pressure sensor "MC/Sen1" is disposed in fluid passage A(FL) between master cylinder M/C and shut-off valve S.OFF/V(FL) for outputting a data signal to control unit CU, where the data signal is indicative of a first measured master cylinder pressure Pm1. Similarly, a second master cylinder pressure sensor "MC/Sen2" is disposed in fluid passage A(FR) between master cylinder M/C and shut-off valve S.OFF/V(FR) for outputting a data signal to control unit CU, where the data signal is indicative of a second measured master cylinder pressure Pm2.

A front left wheel cylinder pressure sensor "WC/Sen(FL)" is disposed in fluid passage D(FL) in hydraulic unit HU for measuring the internal pressure of front left wheel cylinder W/C(FL), and outputting a data signal to control unit CU, where the data signal is indicative of a front left wheel cylinder pressure "Pfl". Similarly, a front right wheel cylinder pressure sensor "WC/Sen(FR)" is disposed in fluid passage D(FR) in hydraulic unit HU for measuring the internal pressure of front right wheel cylinder W/C(FR), and outputting a data signal to control unit CU, where the data signal is indicative of a front right wheel cylinder pressure "Pfr". Moreover, a pump discharge pressure sensor "P/Sen" is disposed on the discharge side of hydraulic pump P for outputting a data signal to control unit CU, where the data signal is indicative of a pump discharge pressure "Pp".

Hydraulic pump P is driven by an electric motor "M" in accordance with a control signal outputted from control unit CU.

Control unit CU is basically configured to perform wheel cylinder pressure control of controlling the internal pressures of the wheel cylinders by electric motor M and the control valves so as to conform the measured internal pressures of the wheel cylinders to respective ones of desired internal pressures of the wheel cylinders.

Under normal operating conditions, the brake-by-wire system of the brake control apparatus operates basically as follows. When it is desired to increase the hydraulic pressure of front left wheel cylinder W/C(FL), control unit CU controls hydraulic unit HU by closing the shut-off valve S.OFF/V (FL), opening the front left inlet valve IN/V(FL), driving the electric motor M, and controlling the opening of front left inlet valve IN/V(FL), so as to increase the hydraulic pressure of front left wheel cylinder W/C(FL). When it is desired to reduce the hydraulic pressure of front left wheel cylinder W/C(FL), control unit CU controls hydraulic unit HU by closing the front left inlet valve IN/V(FL), opening the front left outlet valve OUT/V(FL), so as to drain the hydraulic pressure from front left wheel cylinder W/C(FL) to reservoir RSV. When it is desired to hold constant the hydraulic pressure of front left wheel cylinder W/C(FL), control unit CU controls hydraulic unit HU by closing the front left inlet valve IN/V(FL) and closing the front left outlet valve OUT/V(FL), so as to hold the hydraulic pressure of front left wheel cylinder W/C(FL). As described in detail below, in case front left inlet valve IN/V(FL) is controlled in a fully-opening mode, then front left inlet valve IN/V(FL) is kept fully opened, even when it is desired to reduce or hold constant the hydraulic pressure of front left wheel cylinder W/C(FL). The hydraulic pressure of front right wheel cylinder W/C(FR) is similarly controlled by control unit CU.

While the brake control apparatus is operating in manual braking mode, control unit CU controls hydraulic unit HU by allowing the shut-off valves S.OFF/V(FL) and S.OFF/V(FR) and front left and right inlet valves IN/V(FL) and IN/V(FR) to be normally open, and allowing the front left and right outlet valves OUT/V(FL) and OUT/V(FR) to be normally closed, so as to supply a master cylinder pressure "Pm" to front left and right wheel cylinders W/C(FL) and W/C(FR). This allows to control mechanically the braking efforts.

Henceforth, one of the wheel cylinders that is the highest in desired wheel cylinder pressure among all the wheel cylinders, is referred to as high-pressure wheel cylinder "W/C_H". One of the inlet valves hydraulically connected between hydraulic pump P and high-pressure wheel cylinder W/C_H, is referred to as high-pressure inlet valve "IN/V_H". When the number of wheel cylinders is equal to two, the other inlet valve is referred to as low-pressure inlet valve "IN/V_L", and the other wheel cylinder is referred to as low-pressure wheel cylinder "W/C_L". For example, when desired front left wheel cylinder pressure P*fl is higher than desired front right wheel cylinder pressure P*fr, then front left and right inlet valves IN/V(FL) and IN/V(FR) serve as a high-pressure inlet valve IN/V_H and a low-pressure inlet valve IN/V_L, respectively. The actual and desired hydraulic pressures of high-pressure wheel cylinder W/C_H are referred to as high-pressure wheel cylinder pressure P_H and desired high-pressure wheel cylinder pressure P*_H, respectively, while the actual and desired hydraulic pressures of low-pressure wheel cylinder W/C_L are referred to as low-pressure wheel cylinder pressure "P_L" and desired low-pressure wheel cylinder pressure "P*_L".

As described above, the single hydraulic pump P supplies a single hydraulic pressure through front left and right inlet valves IN/V(FL) and IN/V(FR) to both of front left and right wheel cylinders W/C(FL) and W/C(FR). Accordingly, when the hydraulic pressure of at least one of wheel cylinders is desired to increase, pump discharge pressure Pp is set to be at least higher than or equal to desired high-pressure wheel cylinder pressure P*_H. On the other hand, desired low-pressure wheel cylinder pressure P*_L is attained by continuously variably reducing the supplied pump discharge pressure Pp through low-pressure inlet valve IN/V_L.

In the first embodiment, control unit CU keeps high-pressure inlet valve IN/V_H fully opened, and controls and supplies pump discharge pressure Pp to high-pressure wheel cylinder W/C_H with no intentional pressure fall through high-pressure inlet valve IN/V_H. Because high-pressure inlet valve IN/V_H is fully opened, high-pressure inlet valve IN/V_H allows sufficient fluid communication between high-pressure wheel cylinder W/C_H and the discharge port of hydraulic pump P. This is effective for sufficiently absorbing and suppressing vibration of brake fluid on the discharge side of hydraulic pump P. Moreover, because pump discharge pressure Pp is supplied to high-pressure wheel cylinder W/C_H with no intentional pressure fall through high-pressure inlet valve IN/V_H, pump discharge pressure Pp may be as small as possible. Still moreover, because pump discharge pressure Pp is substantially equal to high-pressure wheel cylinder pressure P_H, pump discharge pressure Pp may be measured by a high-pressure wheel cylinder pressure sensor "WC/Sen_H" defined as one of front left and right wheel cylinder pressure sensors WC/Sen(FL) and WC/Sen(FR) that is provided for high-pressure wheel cylinder W/C_H. In such a case, pump discharge pressure sensor P/Sen is unnecessary.

Figure 3:
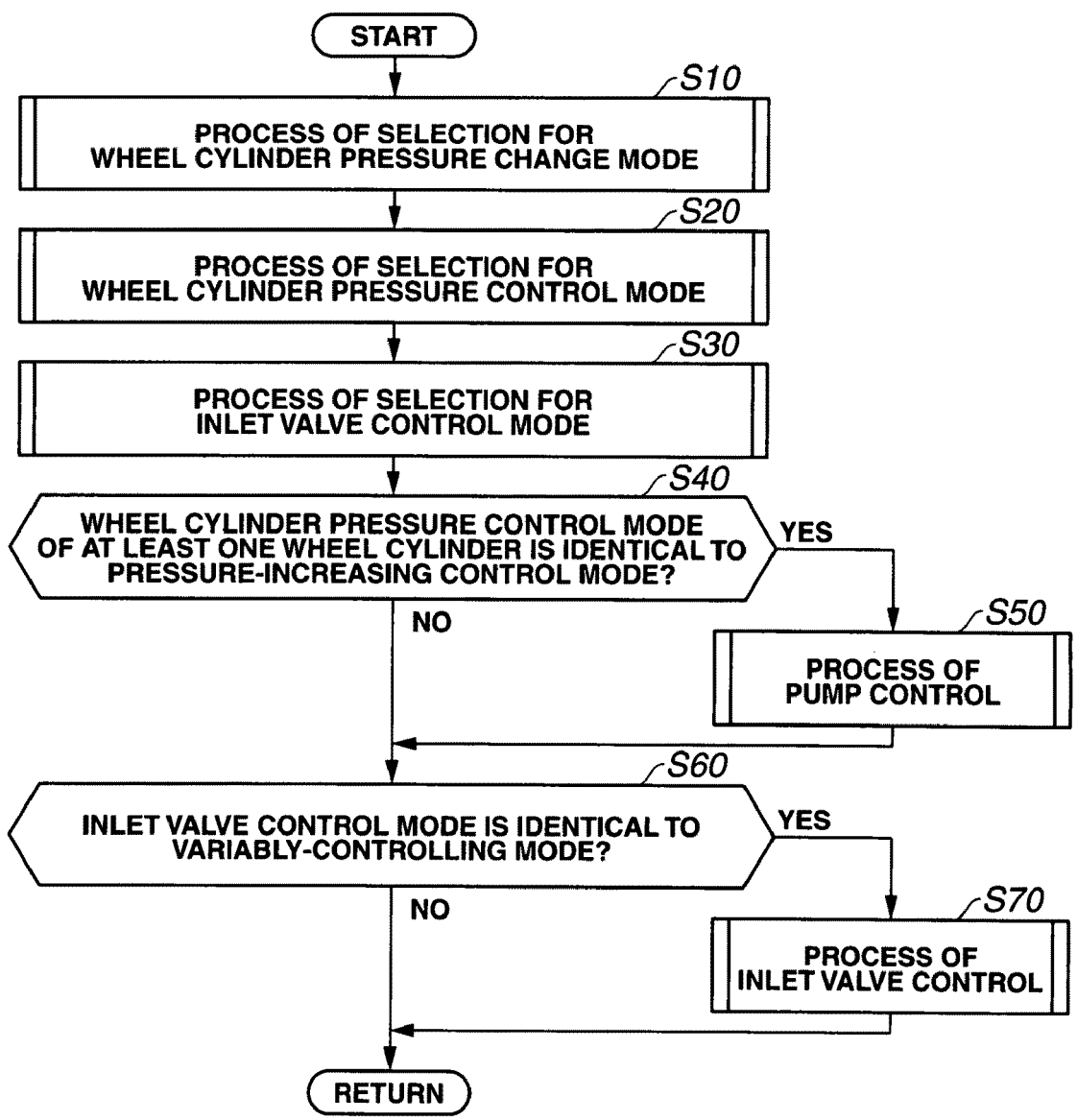
FIG. 3 is a flow chart showing a process of brake-by-wire control according to the first embodiment.

The following describes a control process of the brake-by-wire system of the brake control apparatus with reference to FIG. 3. Control unit CU operates as follows.

At Step S10, control unit CU sets a wheel cylinder pressure change mode for each wheel cylinder to one of a pressure-increasing mode, a pressure-reducing mode, and a pressure-holding mode, and then proceeds to Step S20.

At Step S20, control unit CU sets a wheel cylinder pressure control mode for each wheel cylinder to one of a pressure-increasing control mode, a pressure-reducing control mode, and a pressure-holding control mode, and then proceeds to Step S30.

At Step S30, control unit CU sets an inlet valve control mode for each wheel cylinder to one of a fully-opening mode, a fully-closing mode, and a variably-controlling mode (intermediately-opening mode), and then proceeds to Step S40.

At Step S40, control unit CU judges whether or not the wheel cylinder pressure control mode of at least one of the wheel cylinders is identical to the pressure-increasing control mode. When the answer to Step S40 is affirmative (YES), then control unit CU proceeds to Step S50. On the other hand, when the answer to step S40 is negative (NO), then control unit CU proceeds to Step S60.

At Step S50, control unit CU performs a pump control, and then proceeds to Step S60.

At Step S60, control unit CU judges whether or not the inlet valve control mode for each inlet valve is identical to the variably-controlling mode. When the answer to Step S60 is YES, then control unit CU proceeds to Step S70. On the other hand, when the answer to step S60 is NO, then control unit CU returns from this control process.

At Step S70, control unit CU performs an inlet valve control, and then returns from this control process.

The following describes Step S10 of FIG. 3 in detail with reference to FIG. 4. Control unit CU performs this control process for each wheel cylinder.

At Step S11, control unit CU judges whether or not a desired rate of change of wheel cylinder pressure P*' is higher than or equal to a predetermined threshold value for pressure increase. When the answer to Step S11 is YES, then control unit CU proceeds to Step S13. On the other hand, when the answer to step S11 is NO, then control unit CU proceeds to Step S12.

At Step S12, control unit CU judges whether or not desired rate of change of wheel cylinder pressure P*' is lower than a predetermined threshold value for pressure reduction. When the answer to Step S12 is YES, then control unit CU proceeds to Step S14. On the other hand, when the answer to step S12 is NO, then control unit CU proceeds to Step S15.

At Step S13, control unit CU sets the wheel cylinder pressure change mode to the pressure-increasing mode, and then returns form this control process.

At Step S14, control unit CU sets the wheel cylinder pressure change mode to the pressure-reducing mode, and then returns form this control process.

At Step S15, control unit CU sets the wheel cylinder pressure change mode to the pressure-holding mode, and then returns form this control process.

The following describes Step S20 of FIG. 3 in detail with reference to FIG. 5. Control unit CU performs this control process for each wheel cylinder.

At Step S21, control unit CU judges whether or not a wheel cylinder pressure deviation ΔP defined as a difference between desired wheel cylinder pressure and actual wheel cylinder pressure is higher than or equal to a predetermined threshold value for pressure increase. When the answer to Step S21 is YES, then control unit CU proceeds to Step S23. On the other hand, when the answer to step S21 is NO, then control unit CU proceeds to Step S22.

At Step S22, control unit CU judges whether or not wheel cylinder pressure deviation ΔP is lower than or equal to a predetermined threshold value for pressure reduction. When the answer to Step S22 is YES, then control unit CU proceeds to Step S24. On the other hand, when the answer to step S22 is NO, then control unit CU proceeds to Step S25.

At Step S23, control unit CU sets the wheel cylinder pressure control mode to the pressure-increasing control mode, and then returns from this control process.

At Step S24, control unit CU sets the wheel cylinder pressure control mode to the pressure-reducing control mode, and then returns from this control process.

At Step S25, control unit CU sets the wheel cylinder pressure control mode to the pressure-holding control mode, and then returns from this control process.

Figure 6:
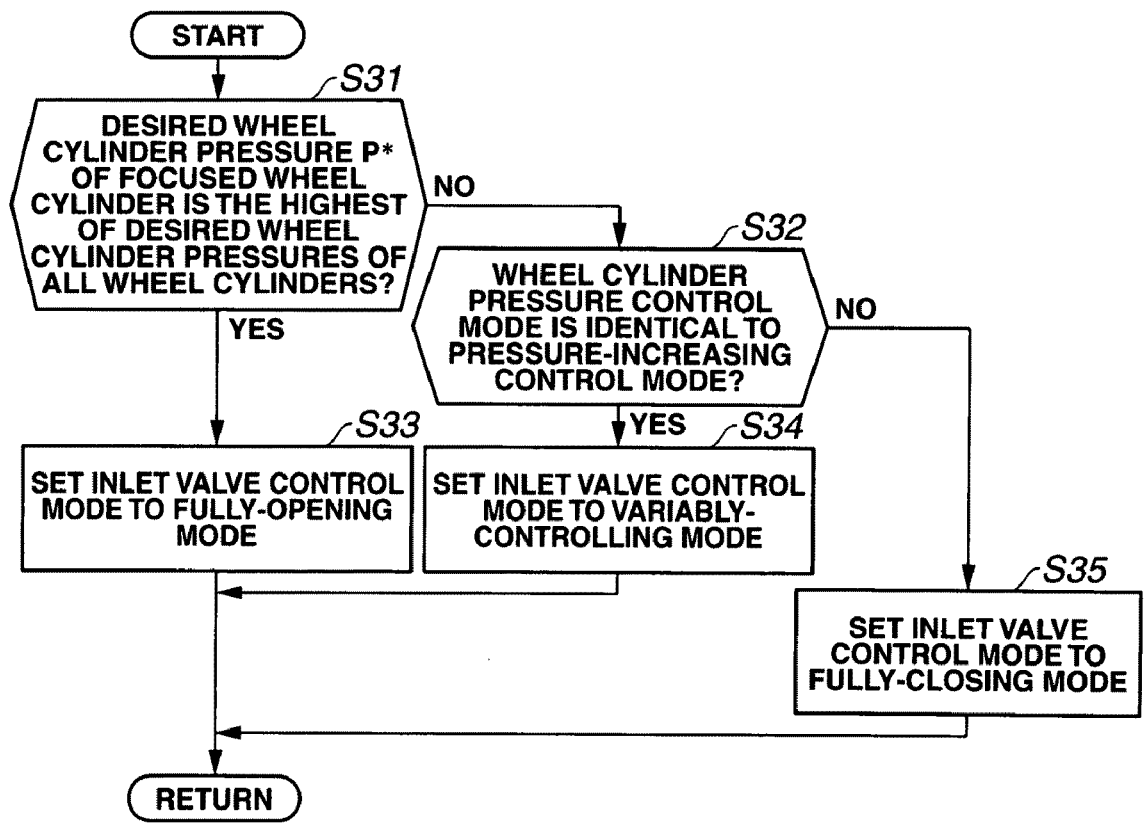
FIG. 6 is a flow chart showing a detailed process of selection for inlet valve control mode according to the first embodiment (FIG. 3, Step S30).

The following describes Step S30 of FIG. 3 in detail with reference to FIG. 6. Control unit CU performs this control process for each inlet valve. The inlet valve control modes include the fully-opening mode, the fully-closing mode, and the variably-controlling mode (intermediately-opening mode). The fully-opening mode is a mode in which control unit CU keeps a related inlet valve fully opened, or keeps the cross-sectional flow area of the inlet valve maximized. The fully-closing mode is a mode in which control unit CU keeps a related inlet valve fully closed, or keeps the cross-sectional flow area of the inlet valve minimized. The variably-controlling mode is a mode in which control unit CU continuously varies the cross-sectional flow area of a related inlet valve.

At Step S31, control unit CU judges whether or not desired wheel cylinder pressure P* (focused one of desired front left and right wheel cylinder pressures P*fl and P*fr) is the highest of all of desired front left and right wheel cylinder pressures P*fl and P*fr. For example, for front left wheel FL, control unit CU judges whether or not desired front left wheel cylinder pressure P*fl is the highest of desired front left and right wheel cylinder pressures P*fl and P*fr. When the answer to Step S31 is YES, then control unit CU proceeds to Step S33. On the other hand, when the answer to step S31 is NO, then control unit CU proceeds to Step S32.

At Step S32, control unit CU judges whether or not the wheel cylinder pressure control mode is identical to the pressure-increasing control mode. When the answer to Step S32 is YES, then control unit CU proceeds to Step S34. On the other hand, when the answer to step S32 is NO, then control unit CU proceeds to Step S35.

At Step S33, control unit CU sets the inlet valve control mode to the fully-opening mode, and then returns from this control process.

At Step S34, control unit CU sets the inlet valve control mode to the variably-controlling mode, and then returns from this control process.

At Step S35, control unit CU sets the inlet valve control mode to the fully-closing mode, and then returns from this control process.

Figure 7:
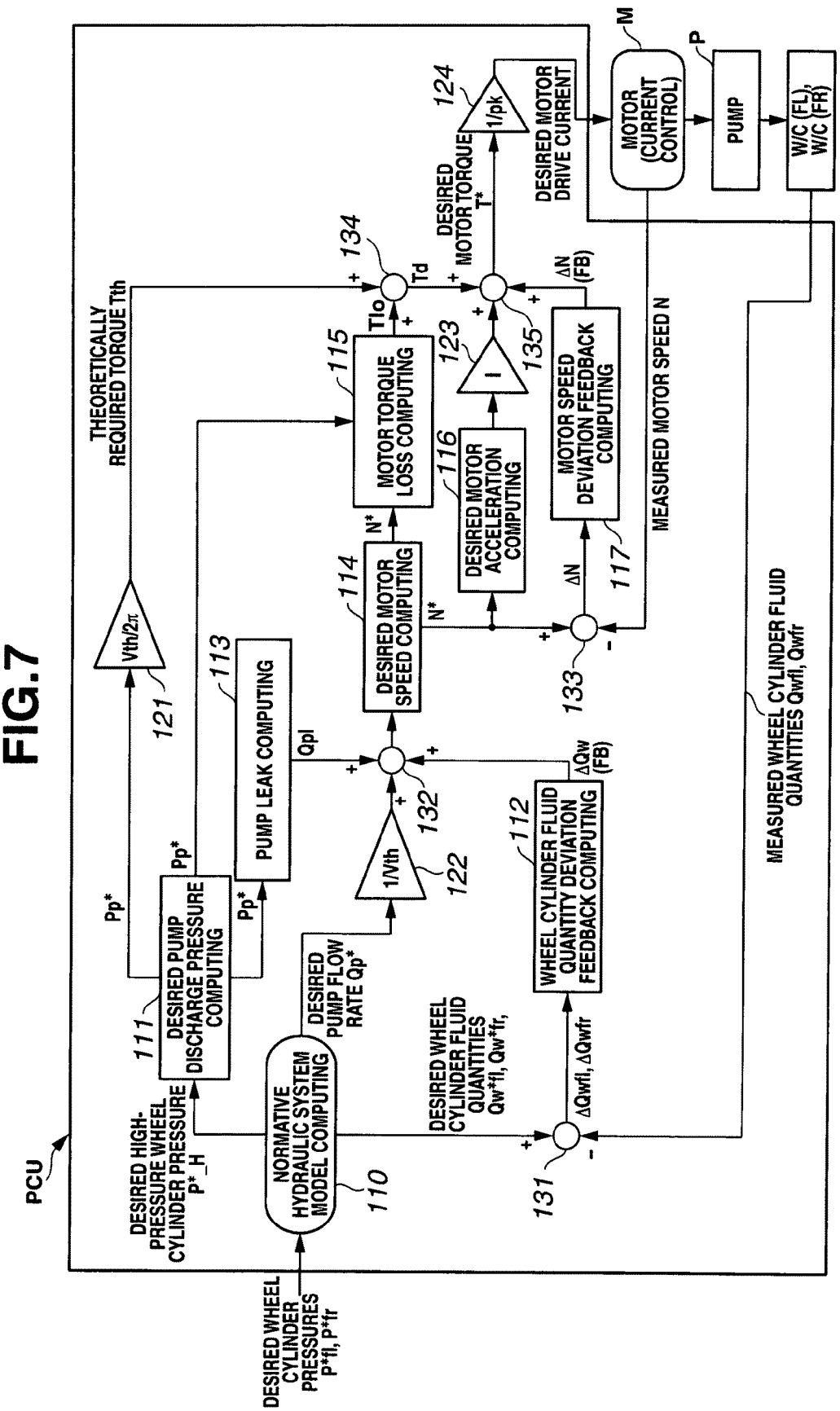
FIG. 7 is a block diagram showing a detailed process of pump control according to the first embodiment (FIG. 3, Step S50).

The following describes Step S50 of FIG. 3 in detail with reference to FIG. 7. Control unit CU includes a pump control unit "PCU" for implementing the control process described below.

Pump control unit PCU includes a section referred to as normative hydraulic system model computing section 110, a section referred to as desired pump discharge pressure computing section 111, a section referred to as wheel cylinder fluid quantity deviation feedback computing section 112, a section referred to as pump leak computing section 113, a section referred to as desired motor speed computing section 114, a section referred to as motor torque loss computing section 115, a section referred to as desired motor acceleration computing section 116, and a section referred to as motor speed deviation feedback computing section 117.

Normative hydraulic system model computing section 110 receives a data signal indicative of desired front left and right wheel cylinder pressures P*fl and P*fr, computes a desired pump flow rate "Qp*" of hydraulic pump P on the basis of desired front left and right wheel cylinder pressures P*fl and P*fr, and then outputs a data signal indicative of desired pump flow rate Qp* to a multiplier 122. Multiplier 122 multiplies desired pump flow rate Qp* by the reciprocal of a theoretical pump discharge fluid quantity "Vth" defined as a theoretically discharge quantity of hydraulic pump P per one rotation. Normative hydraulic system model computing section 110 further computes desired front left and right wheel cylinder fluid quantity "Qw*fl" and "Qw*fr" of front left and right wheel cylinders W/C(FL) and W/C(FR) on the basis of desired front left and right wheel cylinder pressures P*fl and P*fr, and then outputs a data signal indicative of desired front left and right wheel cylinder fluid quantity Qw*fl and Qw*fr to an adder 131. Moreover, normative hydraulic system model computing section 110 computes desired high-pressure wheel cylinder pressure P*_H on the basis of desired front left and right wheel cylinder pressures P*fl and P*fr, and then outputs a data signal indicative of desired high-pressure wheel cylinder pressure P*_H to desired pump discharge pressure computing section 111.

Desired pump discharge pressure computing section 111 computes a desired pump discharge pressure "Pp*" of hydraulic pump P on the basis of desired high-pressure wheel cylinder pressure P*_H, and then outputs a data signal indicative of desired pump discharge pressure Pp* to pump leak computing section 113, motor torque loss computing section 115, and a multiplier 121.

Multiplier 121 computes a theoretically required torque "Tth" of hydraulic pump P by multiplying the desired pump discharge pressure Pp* by a factor of Vth/2n, and then outputs a data signal indicative of theoretically required torque Tth to an adder 134.

Adder 131 computes deviations "ΔQwfl" and "ΔQwfr" by subtracting measured wheel cylinder fluid quantities "Qwfl" and "Qwfr" of front left and right wheel cylinders W/C(FL)

and W/C(FR) from desired front left and right wheel cylinder fluid quantity Qw*fl and Qw*fr. Wheel cylinder fluid quantity deviation feedback computing section 112 computes a feedback component "ΔQw(FB)" on the basis of deviations ΔQwfl and ΔQwfr, and then outputs a data signal indicative of feedback component ΔQw(FB) to an adder 132.

Pump leak computing section 113 computes a pump leak quantity "Qpl" of hydraulic pump P on the basis of desired pump discharge pressure Pp* with reference to experimental data, and then outputs a data signal indicative of pump leak quantity Qpl to adder 132.

Adder 132 adds pump leak quantity Qpl, feedback component ΔQw(FB), and the product of desired pump flow rate Qp* and the reciprocal of theoretical pump discharge fluid quantity Vth, and then outputs a data signal indicative of the sum to desired motor speed computing section 114.

Desired motor speed computing section 114 computes desired motor speed "N*" of electric motor M on the basis of the sum computed at adder 132, and then outputs a data signal indicative of desired motor speed N* to motor torque loss computing section 115, desired motor acceleration computing section 116, and an adder 133.

Motor torque loss computing section 115 computes a torque loss "Tlo" of electric motor M on the basis of desired motor speed N* and desired pump discharge pressure Pp* with reference to experimental data, and outputs a data signal indicative of torque loss Tlo to adder 134.

Desired motor acceleration computing section 116 computes a desired motor acceleration of electric motor M by differentiating the desired motor speed N*, and then outputs a data signal indicative of the desired motor acceleration to an inertia torque computing section 123.

Inertia torque computing section 123 computes an inertia torque of electric motor M to be cancelled for desired motor speed change by multiplying the desired motor acceleration by a moment of inertia, and then outputs a data signal indicative of the inertia torque to an adder 135.

Adder 133 computes a deviation "ΔN" by subtracting the actual motor speed N from desired motor speed N*. Motor speed deviation feedback computing section 117 computes a feedback component "ΔN(FB)" on the basis of deviation ΔN, and then outputs a data signal indicative of feedback component ΔN(FB) to adder 135.

Adder 134 computes a load torque "Td" of electric motor M by adding theoretically required torque Tth of electric motor M and torque loss Tlo of electric motor M, and then outputs a data signal indicative of load torque Td to adder 135.

Adder 135 computes a desired motor torque "T*" of electric motor M by adding the load torque Td of electric motor M, feedback component ΔN(FB), and the inertia torque to be cancelled, and then outputs a data signal indicative of desired motor torque T* to a motor drive section 124.

Motor drive section 124 computes a desired motor drive current on the basis of desired motor torque T*, and then outputs a data signal indicative of the desired motor drive current to electric motor M, so that electric motor M drives hydraulic pump P on the basis of the desired motor drive current.

Figure 8:
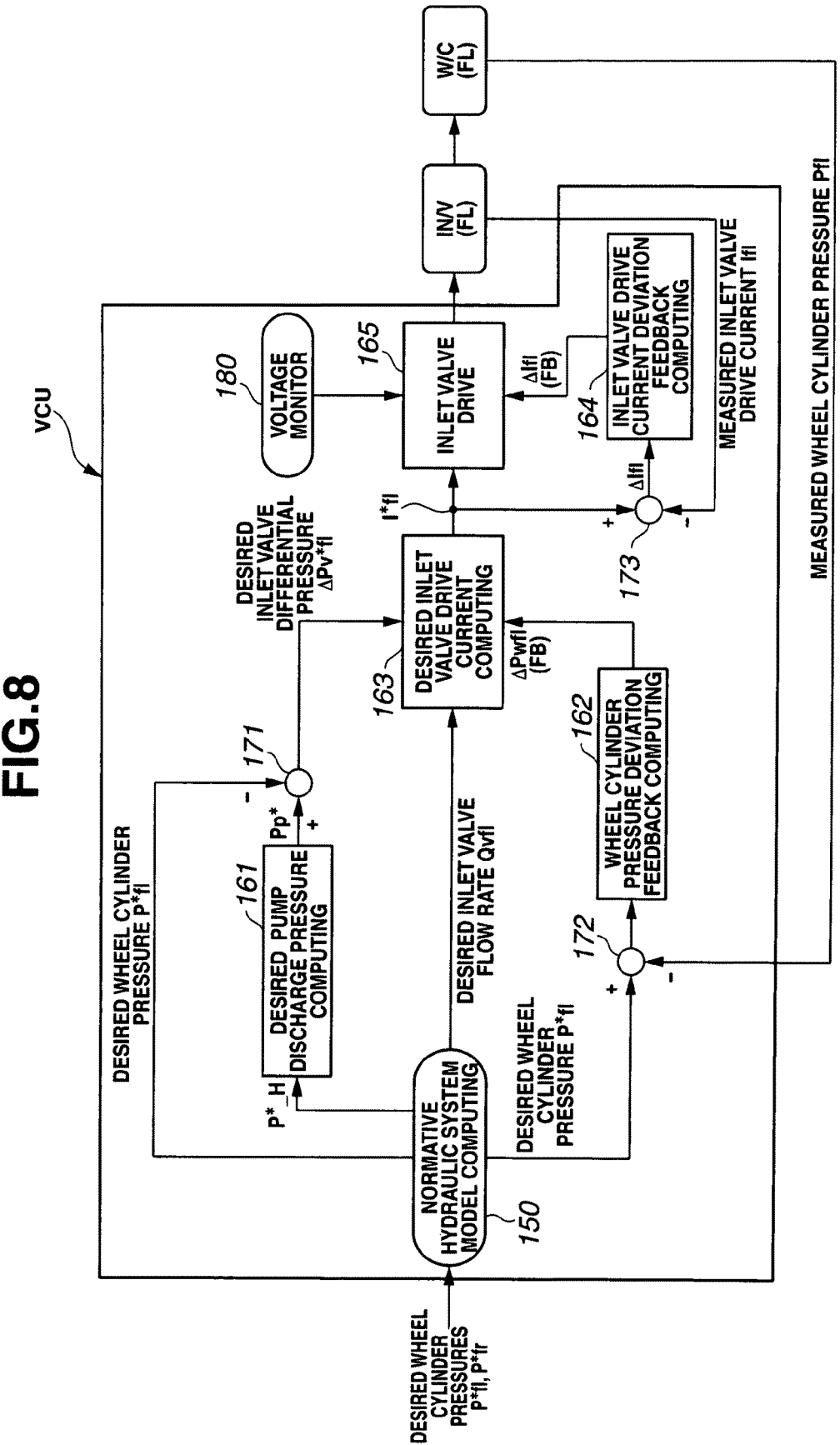
FIG. 8 is a block diagram showing a detailed process of inlet valve control according to the first embodiment (FIG. 3, Step S70).

The following describes Step S70 of FIG. 3 in detail with reference to FIG. 8. Control unit CU includes a valve control unit "VCU" for implementing the control process described below. Although the following relates to front left inlet valve IN/V(FL), the other inlet valves (front right inlet valve IN/V (FR) in this embodiment) are controlled similarly.

Valve control unit VCU includes a section referred to as normative hydraulic system model computing section 150, a section referred to as desired pump discharge pressure computing section 161, a section referred to as wheel cylinder pressure deviation feedback computing section 162, a section referred to as desired inlet valve drive current computing section 163, a section referred to as inlet valve drive current deviation feedback computing section 164, and a section referred to as inlet valve drive section 165.

Normative hydraulic system model computing section 150 receives a data signal indicative of desired front left and right wheel cylinder pressures P*fl and P*fr, computes desired high-pressure wheel cylinder pressure P*_H, and a desired inlet valve flow rate "Qvfl" of front left inlet valve IN/V(FL) on the basis of desired front left and right wheel cylinder pressures P*fl and P*fr, and then outputs a data signal indicative of desired high-pressure wheel cylinder pressure P*_H to desired pump discharge pressure computing section 161, a data signal indicative of desired inlet valve flow rate Qvfl to desired inlet valve drive current computing section 163, and a data signal indicative of desired front left wheel cylinder pressure P*fl to adders 171 and 172.

Desired pump discharge pressure computing section 161 computes a desired pump discharge pressure Pp* of hydraulic pump P on the basis of desired high-pressure wheel cylinder pressure P*_H, and then outputs a data signal indicative of desired pump discharge pressure Pp* to adder 171.

Adder 171 computes a desired inlet valve differential pressure "ΔPv*fl" by subtracting the desired front left wheel cylinder pressure P*fl from desired pump discharge pressure Pp*, and then outputs a data signal indicative of desired inlet valve differential pressure ΔPv*fl to desired inlet valve drive current computing section 163.

Adder 172 computes a deviation "ΔPwfl" by subtracting the measured front left wheel cylinder pressure Pfl from desired front left wheel cylinder pressure P*fl, and then outputs a data signal indicative of deviation ΔPwfl to wheel cylinder pressure deviation feedback computing section 162.

Wheel cylinder pressure deviation feedback computing section 162 computes a feedback component "ΔPwfl(FB)" on the basis of deviation ΔPwfl, and then outputs a data signal indicative of feedback component ΔPwfl(FB) to desired inlet valve drive current computing section 163.

Desired inlet valve drive current computing section 163 computes a desired front left wheel inlet valve drive current "I*fl" on the basis of desired inlet valve differential pressure ΔPv*fl, feedback component ΔPwfl(FB), and desired inlet valve flow rate Qvfl, and then outputs a data signal indicative of desired front left wheel inlet valve drive current I*fl to inlet valve drive section 165 and an adder 173.

Adder 173 computes a deviation "ΔIfl" by subtracting a measured front left wheel inlet valve drive current "Ifl" from desired front left wheel inlet valve drive current I*fl, and then outputs a data signal indicative of deviation ΔIfl to inlet valve drive current deviation feedback computing section 164.

Inlet valve drive current deviation feedback computing section 164 computes a feedback component "ΔIfl(FB)" on the basis of deviation ΔIfl, and then outputs a data signal indicative of feedback component ΔIfl(FB) to inlet valve drive section 165.

Inlet valve drive section 165 computes a desired duty ratio of front left inlet valve IN/V(FL) on the basis of a monitored state of voltage monitor 180, desired front left wheel inlet valve drive current I*fl, and feedback component ΔIfl(FB), and continuously variably regulates the opening of front left inlet valve IN/V(FL) on the basis of the computed duty ratio to continuously variably control front left wheel cylinder pressure Pfl.

Figure 9:
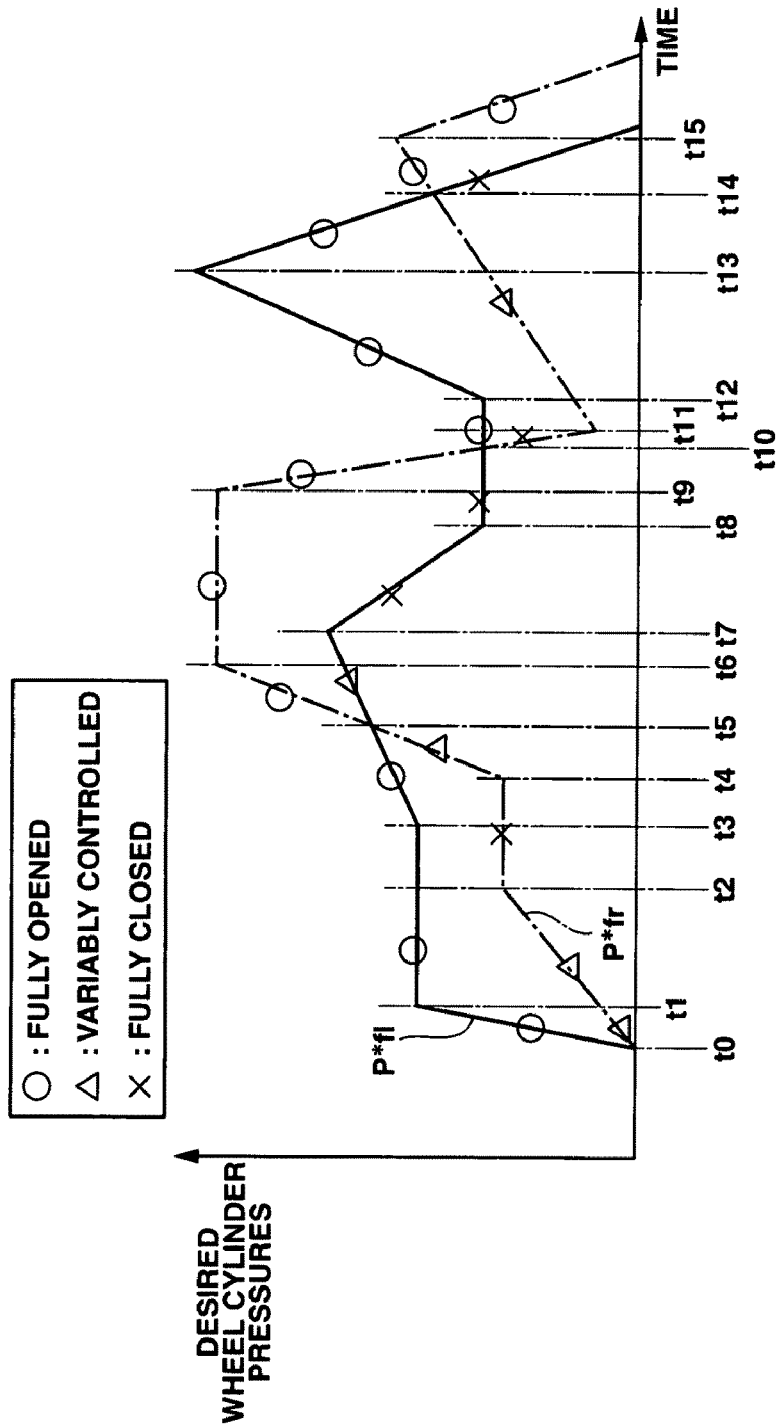
FIG. 9 is a time chart showing an example of how inlet valves are controlled depending on desired front left and right wheel cylinder pressures according to the first embodiment.

The following describes an example of how front left and right inlet valves IN/V(FL) and IN/V(FR) are controlled depending on desired front left and right wheel cylinder pressures P*fl and P*fr according to the first embodiment with reference to FIG. 9. In FIG. 9, solid lines represent desired front left wheel cylinder pressure P*fl, long dashed short dashed lines represent desired front right wheel cylinder pressure P*fr, each circle represents the fully-opening mode, each triangle represents the variably-controlling mode, and each cross represents the fully-closing mode.

At time t0, control unit CU issues such a control command that desired front left and right wheel cylinder pressures P*fl and P*fr start to increase from zero, and specifically that desired front left wheel cylinder pressure P*fl increases more rapidly than desired front right wheel cylinder pressure P*fr. Naturally, desired front left wheel cylinder pressure P*fl is higher than desired front right wheel cylinder pressure P*fr after time t0. The wheel cylinder pressure control mode of each of front left and right wheels FL and FR is set to the pressure-increasing control mode, because desired front left and right wheel cylinder pressures P*fl and P*fr are increasing. Since desired front left wheel cylinder pressure P*fl is higher than desired front right wheel cylinder pressure P*fr and the wheel cylinder pressure control mode of both of front left and right wheels FL and FR are identical to the pressure-increasing control mode, the inlet valve control mode of front left inlet valve IN/V(FL) is set to the fully-opening mode, while the inlet valve control mode of front right inlet valve IN/V(FR) is set to the variably-controlling mode.

At time t1, control unit CU issues such a control command that desired front left wheel cylinder pressure P*fl is held constant. Since desired front left wheel cylinder pressure P*fl is higher than desired front right wheel cylinder pressure P*fr, the inlet valve control mode of front left inlet valve IN/V(FL) is still set to the fully-opening mode. On the other hand, the inlet valve control mode of front right inlet valve IN/V(FR) is still set to the variably-controlling mode, because desired front right wheel cylinder pressure P*fr continues to increase. Check valve C/V(FL) is closed, because front left wheel cylinder pressure Pfl is higher than pump discharge pressure Pp. Accordingly, front left wheel cylinder pressure Pfl is maintained independently of the opening of front left inlet valve IN/V(FL).

At time t2, control unit CU issues such a control command that desired front right wheel cylinder pressure P*fr is held constant. Since desired front left wheel cylinder pressure P*fl is still higher than desired front right wheel cylinder pressure P*fr, the inlet valve control mode of front left inlet valve IN/V(FL) is still set to the fully-opening mode, while the inlet valve control mode of front right inlet valve IN/V(FR) is set to the fully-closing mode.

At time t3, control unit CU issues such a control command that desired front left wheel cylinder pressure P*fl starts to increase. Since desired front left wheel cylinder pressure P*fl is higher than desired front right wheel cylinder pressure P*fr, the inlet valve control mode of front left inlet valve IN/V(FL) is still set to the fully-opening mode. Front left wheel cylinder pressure Pfl is increased by increasing the pump discharge pressure Pp.

At time t4, control unit CU issues such a control command that desired front right wheel cylinder pressure P*fr starts to increase. Since desired front left wheel cylinder pressure P*fl is higher than desired front right wheel cylinder pressure P*fr, the inlet valve control mode of front left inlet valve IN/V(FL) is still set to the fully-opening mode. On the other hand, the inlet valve control mode of front right inlet valve IN/V(FR) is set to the variably-controlling mode. Desired front right wheel cylinder pressure P*fr increases more rapidly than desired front left wheel cylinder pressure P*fl. As a result, the difference between desired front left and right wheel cylinder pressures P*fl and P*fr decreases gradually after time t4.

At time t5, desired front right wheel cylinder pressure P*fr exceeds desired front left wheel cylinder pressure P*fl. Since desired front right wheel cylinder pressure P*fr is higher than desired front left wheel cylinder pressure P*fl after time t5, the inlet valve control mode of front left inlet valve IN/V(FL) is set to the variably-controlling mode, while the inlet valve control mode of front right inlet valve IN/V(FR) is set to the fully-opening mode.

At time t6, control unit CU issues such a control command that desired front right wheel cylinder pressure P*fr is held constant. Since desired front right wheel cylinder pressure P*fr is higher than desired front left wheel cylinder pressure P*fl, the inlet valve control mode of front left inlet valve IN/V(FL) is still set to the variably-controlling mode, while the inlet valve control mode of front right inlet valve IN/V(FR) is still set to the fully-opening mode.

At time t7, control unit CU issues such a control command that desired front left wheel cylinder pressure P*fl starts to decrease. Since desired front right wheel cylinder pressure P*fr is still higher than desired front left wheel cylinder pressure P*fl, the inlet valve control mode of front left inlet valve IN/V(FL) is set to the fully-closing mode, while the inlet valve control mode of front right inlet valve IN/V(FR) is set to the fully-opening mode.

At time t8, control unit CU issues such a control command that desired front left wheel cylinder pressure P*fl is held constant. Since desired front right wheel cylinder pressure P*fr is higher than desired front left wheel cylinder pressure P*fl, the inlet valve control mode of front left inlet valve IN/V(FL) is still set to the fully-closing mode, while the inlet valve control mode of front right inlet valve IN/V(FR) is still set to the fully-opening mode.

At time t9, control unit CU issues such a control command that desired front right wheel cylinder pressure P*fr starts to decrease. Since desired front right wheel cylinder pressure P*fr is still higher than desired front left wheel cylinder pressure P*fl, the inlet valve control mode of front left inlet valve IN/V(FL) is still set to the fully-closing mode, while the inlet valve control mode of front right inlet valve IN/V(FR) is still set to the fully-opening mode. After time t9, the difference between desired front left and right wheel cylinder pressures P*fl and P*fr decreases, because desired front right wheel cylinder pressure P*fr is held constant.

At time t10, desired front right wheel cylinder pressure P*fr decreases below desired front left wheel cylinder pressure P*fl. Since desired front left wheel cylinder pressure P*fl is higher than desired front right wheel cylinder pressure P*fr after time t10, the inlet valve control mode of front left inlet valve IN/V(FL) is set to the fully-opening mode, while the inlet valve control mode of front right inlet valve IN/V(FR) is set to the fully-closing mode.

At time t11, control unit CU issues such a control command that desired front right wheel cylinder pressure P*fr starts to increase. Since desired front left wheel cylinder pressure P*fl is higher than desired front right wheel cylinder pressure P*fr, the inlet valve control mode of front left inlet valve IN/V(FL) is still set to the fully-opening mode, while the inlet valve control mode of front right inlet valve IN/V(FR) is set to the variably-controlling mode.

At time t12, control unit CU issues such a control command that desired front left wheel cylinder pressure P*fl starts to increase. Since desired front left wheel cylinder pressure P*fl is still higher than desired front right wheel cylinder pressure P*fr, the inlet valve control mode of front left inlet valve IN/V(FL) is still set to the fully-opening mode, while the inlet valve control mode of front right inlet valve IN/V (FR) is still set to the variably-controlling mode.

At time t13, control unit CU issues such a control command that desired front left wheel cylinder pressure P*fl starts to decrease. Since desired front left wheel cylinder pressure P*fl is higher than desired front right wheel cylinder pressure P*fr, the inlet valve control mode of front left inlet valve IN/V(FL) is still set to the fully-opening mode, while the inlet valve control mode of front right inlet valve IN/V(FR) is still set to the variably-controlling mode.

At time t14, desired front right wheel cylinder pressure P*fr exceeds desired front left wheel cylinder pressure P*fl. Since desired front right wheel cylinder pressure P*fr is higher than desired front left wheel cylinder pressure P*fl after time t14, the inlet valve control mode of front left inlet valve IN/V(FL) is set to the fully-closing mode, while the inlet valve control mode of front right inlet valve IN/V(FR) is set to the fully-opening mode.

At time t15, control unit CU issues such a control command that desired front right wheel cylinder pressure P*fr starts to decrease. Since desired front right wheel cylinder pressure P*fr is higher than desired front left wheel cylinder pressure P*fl, the inlet valve control mode of front left inlet valve IN/V(FL) is still set to the fully-closing mode, while the inlet valve control mode of front right inlet valve IN/V(FR) is still set to the fully-opening mode.

When the wheel cylinder pressure control mode of both of front left and right wheels FL and FR are identical to the pressure-reducing control mode or the pressure-holding control mode, control unit CU stops to drive electric motor M, and thereby stops to drive hydraulic pump P, for reduction of power consumption. In the example shown in FIG. 9, control unit CU stops to drive electric motor M, over a period from time t2 to time t3, a period from time t7 to t11, and a period from time t15.

Figure 10:
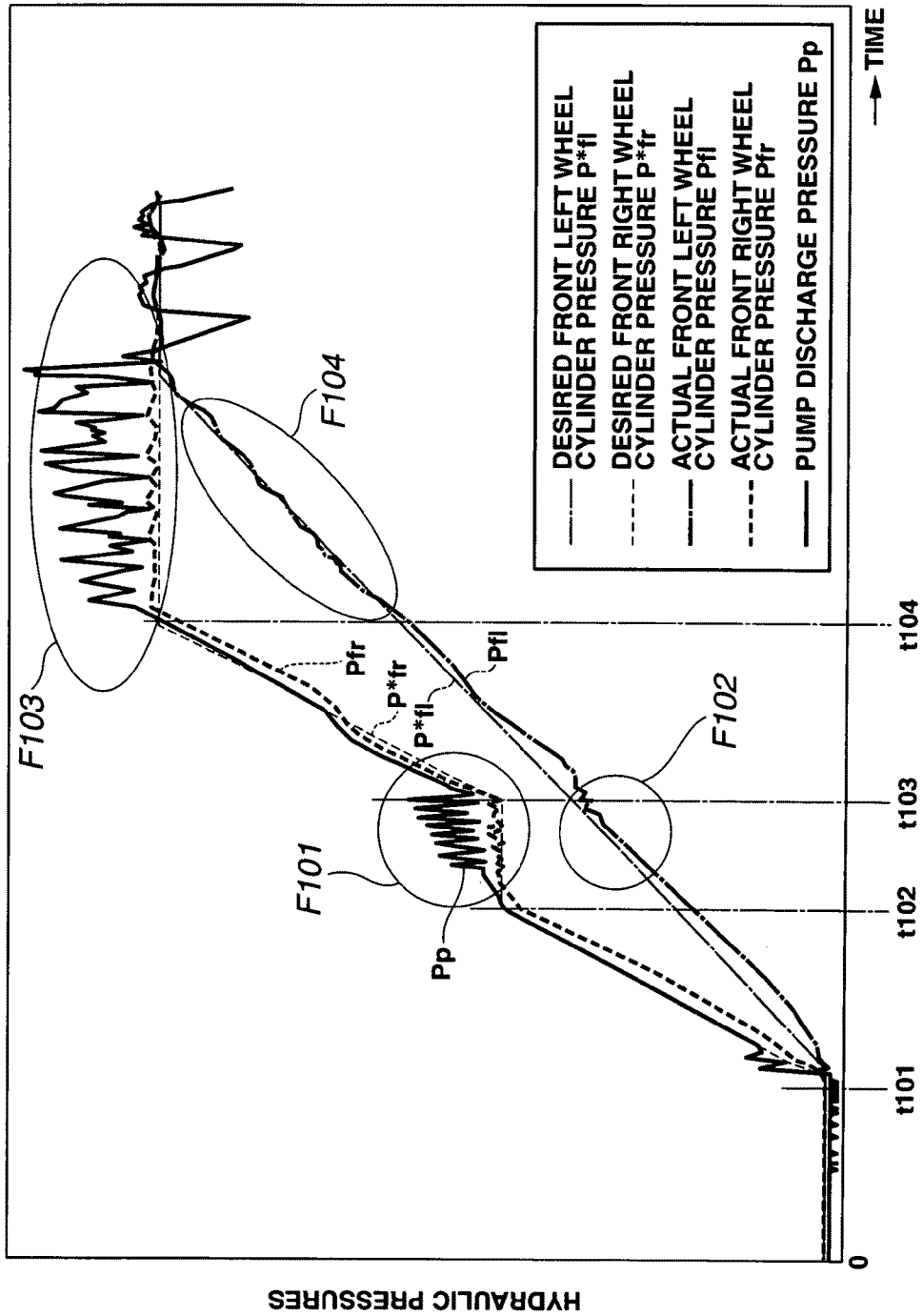
FIG. 10 is a time chart showing an example of how various hydraulic pressures change in a brake control apparatus according to a comparative example.
Figure 11:
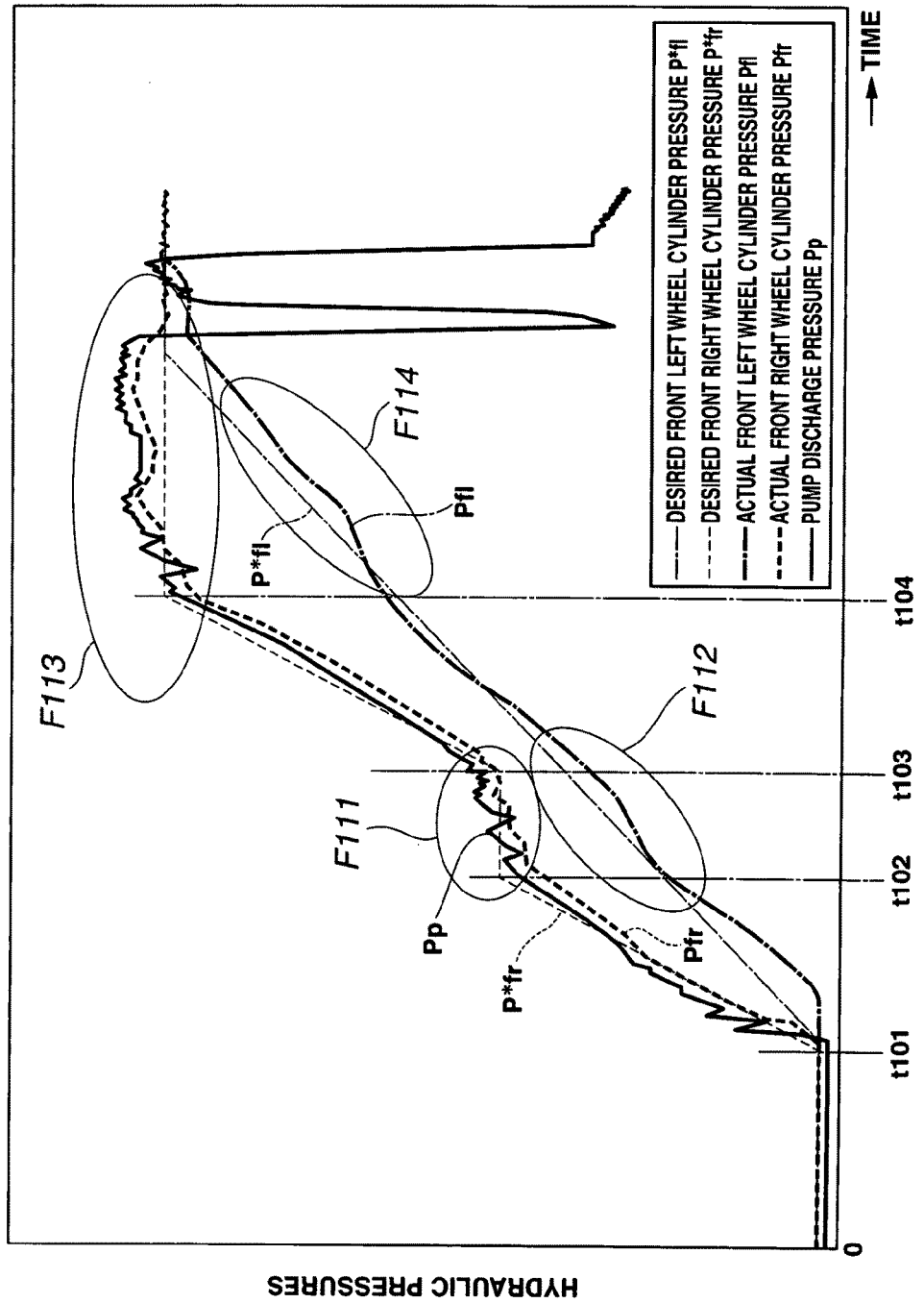
FIG. 11 is a time chart showing an example of how various hydraulic pressures change in the brake control apparatus according to the first embodiment.

FIG. 10 shows an example of how various hydraulic pressures change with time in a brake control apparatus according to a comparative example, while FIG. 11 shows an example of how various hydraulic pressures change with time in the brake control apparatus according to the first embodiment. Time instants t101 to t104 in FIG. 10 are identical to those in FIG. 11.

In both of the comparative example and the first embodiment, at time t101, a control command is issued so that desired front left and right wheel cylinder pressures P*fl and P*fr start to increase. Accordingly, pump discharge pressure Pp starts to increase so that front left and right wheel cylinder pressures Pfl and Pfr follow desired front left and right wheel cylinder pressures P*fl and P*fr, respectively. Desired front right wheel cylinder pressure P*fr increases more rapidly than desired front left wheel cylinder pressure P*fl.

At time t102, a control command is issued so that desired front right wheel cylinder pressure P*fr is held constant. On the other hand, desired front left wheel cylinder pressure P*fl continues to increase. According to the comparative example, front right inlet valve IN/V(FR) is fully closed to hold constant front right wheel cylinder pressure Pfr. Since hydraulic pump P operates under condition that front right inlet valve IN/V(FR) is fully closed, the level of fluctuations in front right wheel cylinder pressure Pfr is relatively high, as indicated by F101 in FIG. 10. Also, the brake fluid between front right inlet valve IN/V(FR) and hydraulic pump P fluctuates so as to cause fluctuations in front left wheel cylinder pressure Pfl, as indicated by F102 in FIG. 10. On the other hand, according to the first embodiment, high-pressure wheel cylinder pressure P_H of high-pressure wheel cylinder W/C_H (front right wheel cylinder W/C(FR) at time t102) is controlled by fully opening the high-pressure inlet valve IN/V_H (front right inlet valve IN/V(FR) at time t102), and controlling the pump discharge pressure Pp. Since fluid communication between high-pressure wheel cylinder W/C_H and hydraulic pump P is fully allowed so as to provide a large volume on the discharge side of hydraulic pump P, the level of fluctuations in the hydraulic pressure therebetween is suppressed, as indicated by F111 in FIG. 11. Moreover, pump discharge pressure Pp is directly supplied to front right wheel cylinder W/C(FR) with no intentional pressure fall through front right inlet valve IN/V(FR), because front right inlet valve IN/V(FR) is fully opened. Thus, the level of fluctuations in front right wheel cylinder pressure Pfr (higher pressure) in the first embodiment is lower than that in the comparative example, and also the level of fluctuations in front left wheel cylinder pressure Pfl (lower pressure) is suppressed, as indicated by F112 in FIG. 11.

At time t103, a control command is issued so that desired front right wheel cylinder pressure P*fr starts to increase again. On the other hand, desired front left wheel cylinder pressure P*fl continues to increase.

At time t104, a control command is issued so that desired front right wheel cylinder pressure P*fr is held constant. On the other hand, desired front left wheel cylinder pressure P*fl continues to increase. As in the case of time t102, according to the comparative example, the level of fluctuations in front left and right wheel cylinder pressures Pfl and Pfr are relatively high, because front right inlet valve IN/V(FR) is not fully opened, as indicated by F103 and F104 in FIG. 10. On the other hand, according to the first embodiment, the level of fluctuations in front left and right wheel cylinder pressures Pfl and Pfr are relatively low, because front right inlet valve IN/V(FR) is fully opened, as indicated by F113 and F114 in FIG. 11.

Figure 12:
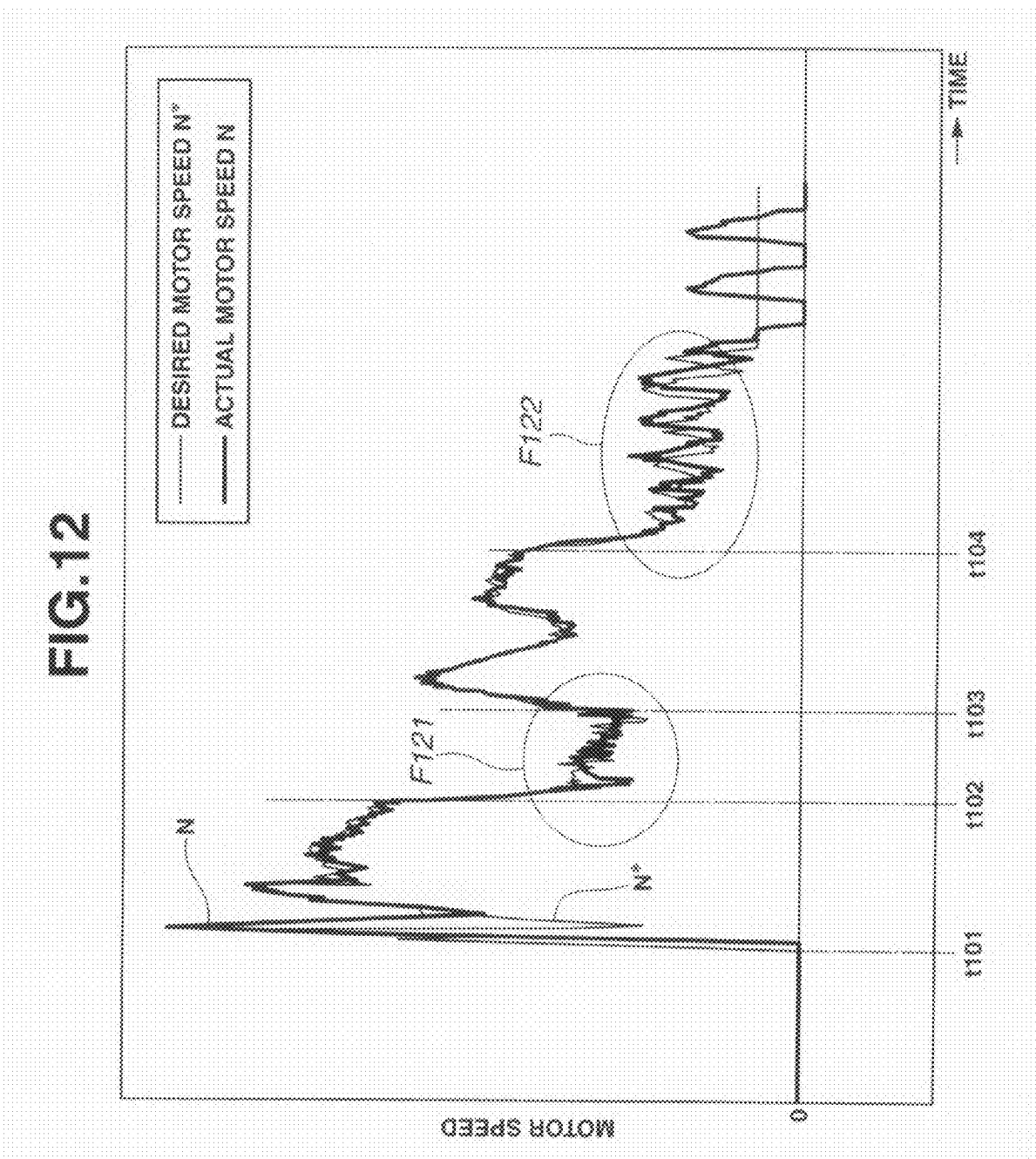
FIG. 12 is a time chart showing an example of how motor speed changes in a brake control apparatus according to a comparative example.
Figure 13:
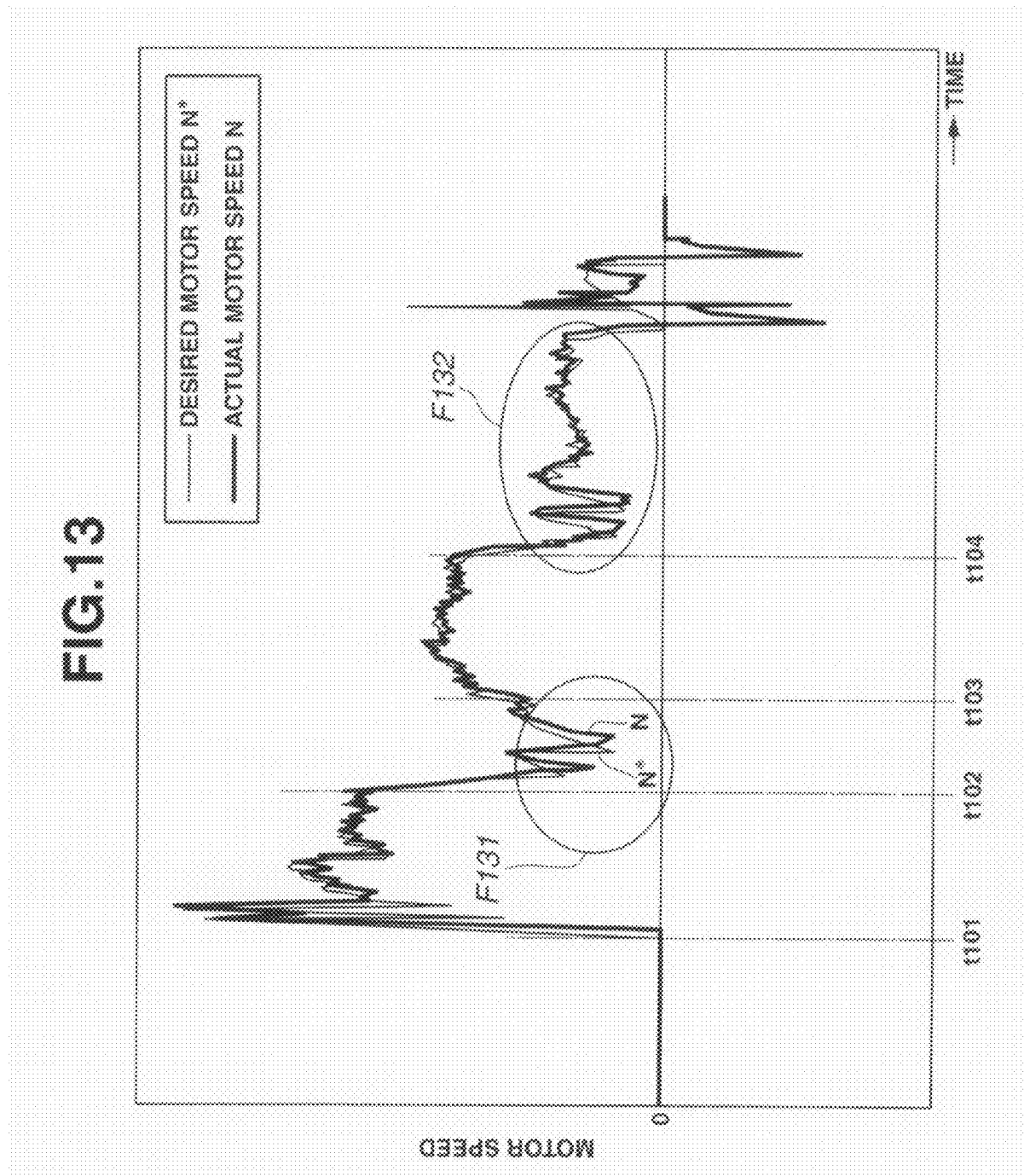
FIG. 13 is a time chart showing an example of how motor speed changes in the brake control apparatus according to the first embodiment.

FIG. 12 shows an example of how motor speed N changes with time in the brake control apparatus according to the comparative example, while FIG. 13 shows an example of how motor speed N changes with time in the brake control apparatus according to the first embodiment. Time instants t101 to t104 in FIGS. 12 and 13 are identical to those in FIGS. 10 and 11.

In both of the comparative example and the first embodiment, at time t101, a control command is issued so that desired front left and right wheel cylinder pressures P*fl and P*fr start to increase. Accordingly, desired motor speed N* starts to increase, and then actual motor speed N also starts to increase, following the desired motor speed N*.

At time t102, a control command is issued so that desired front right wheel cylinder pressure P*fr is held constant. On the other hand, desired front left wheel cylinder pressure P*fl continues to increase. Accordingly, desired motor speed N* decreases so that actual motor speed N decreases. According to the comparative example, front right inlet valve IN/V(FR) is fully closed to hold constant front right wheel cylinder pressure Pfr. Since hydraulic pump P operates under condition that front right inlet valve IN/V(FR) is fully closed, the level of fluctuations in front right wheel cylinder pressure Pfr is relatively high. This makes the rotation of hydraulic pump P (electric motor M) unstable, causing fluctuations in actual motor speed N, as indicated by F121 in FIG. 12. On the other hand, according to the first embodiment, high-pressure wheel cylinder pressure P_H of high-pressure wheel cylinder W/C_H (front right wheel cylinder W/C(FR) at time t102) is controlled by fully opening the high-pressure inlet valve IN/V_H (front right inlet valve IN/V(FR) at time t102), and regulating the pump discharge pressure Pp. Since fluid communication between high-pressure wheel cylinder W/C_H and hydraulic pump P is fully allowed so as to provide a large volume on the discharge side of hydraulic pump P, the level of fluctuations in the hydraulic pressure therebetween is suppressed. Thus, the level of fluctuations in front right wheel cylinder pressure Pfr (higher pressure) in the first embodiment is lower than that in the comparative example, so that the level of fluctuations in actual motor speed N in the first embodiment is lower than that in the comparative example, as indicated by F131 in FIG. 13.

At time t103, a control command is issued so that desired front right wheel cylinder pressure P*fr starts to increase again. On the other hand, desired front left wheel cylinder pressure P*fl continues to increase. Accordingly, desired motor speed N* increases so that actual motor speed N increases.

At time t104, a control command is issued so that desired front right wheel cylinder pressure P*fr is held constant. On the other hand, desired front left wheel cylinder pressure P*fl continues to increase. As in the case of time t102, according to the comparative example, the level of fluctuations in actual motor speed N is relatively high, because front right inlet valve IN/V(FR) is not fully opened, as indicated by F122 in FIG. 12. On the other hand, according to the first embodiment, the level of fluctuations in actual motor speed N is relatively low, because front right inlet valve IN/V(FR) is fully opened, as indicated by F132 in FIG. 13.

Figure 14:
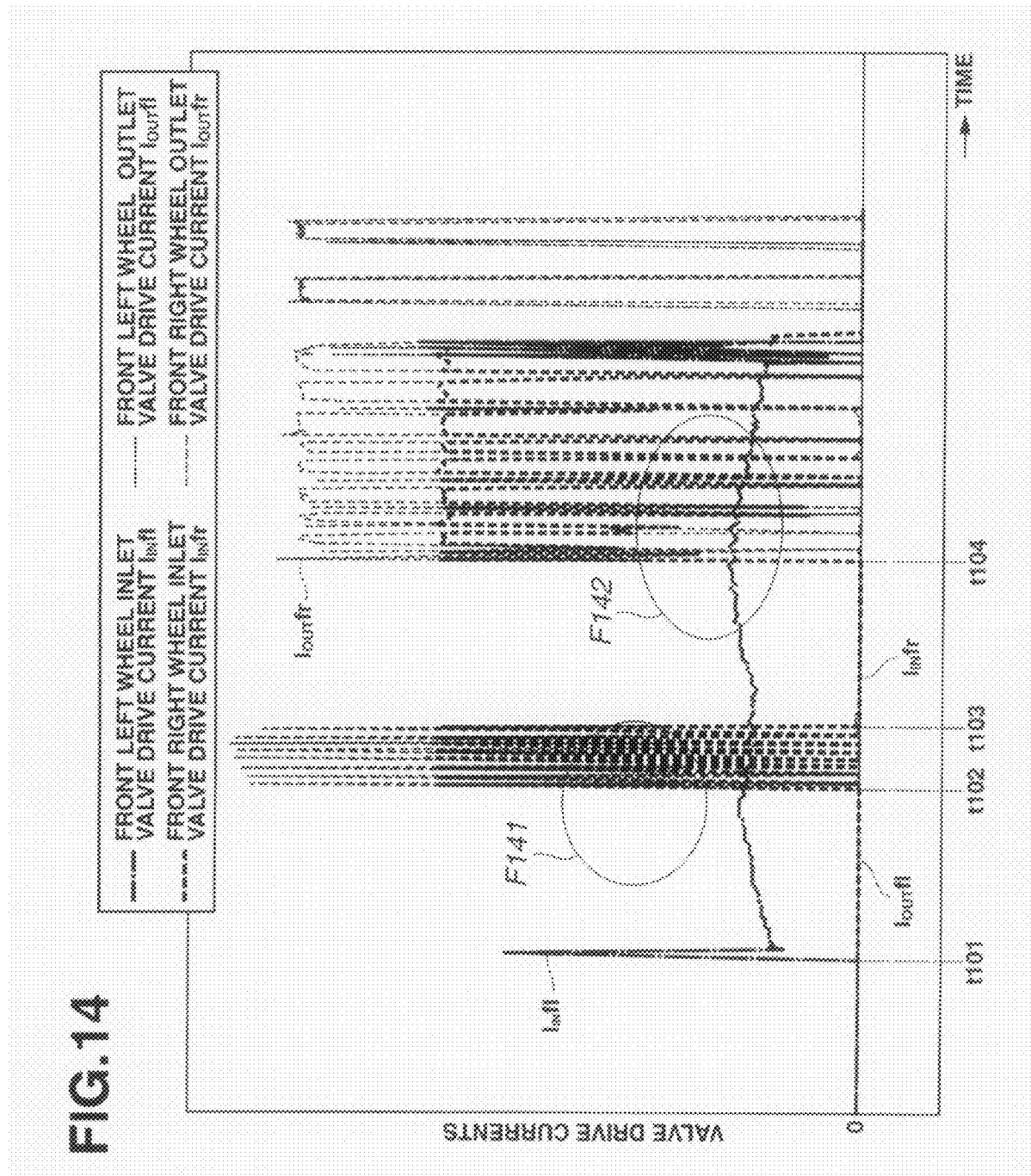
FIG. 14 is a time chart showing an example of how valve drive currents change in a brake control apparatus according to a comparative example.
Figure 15:
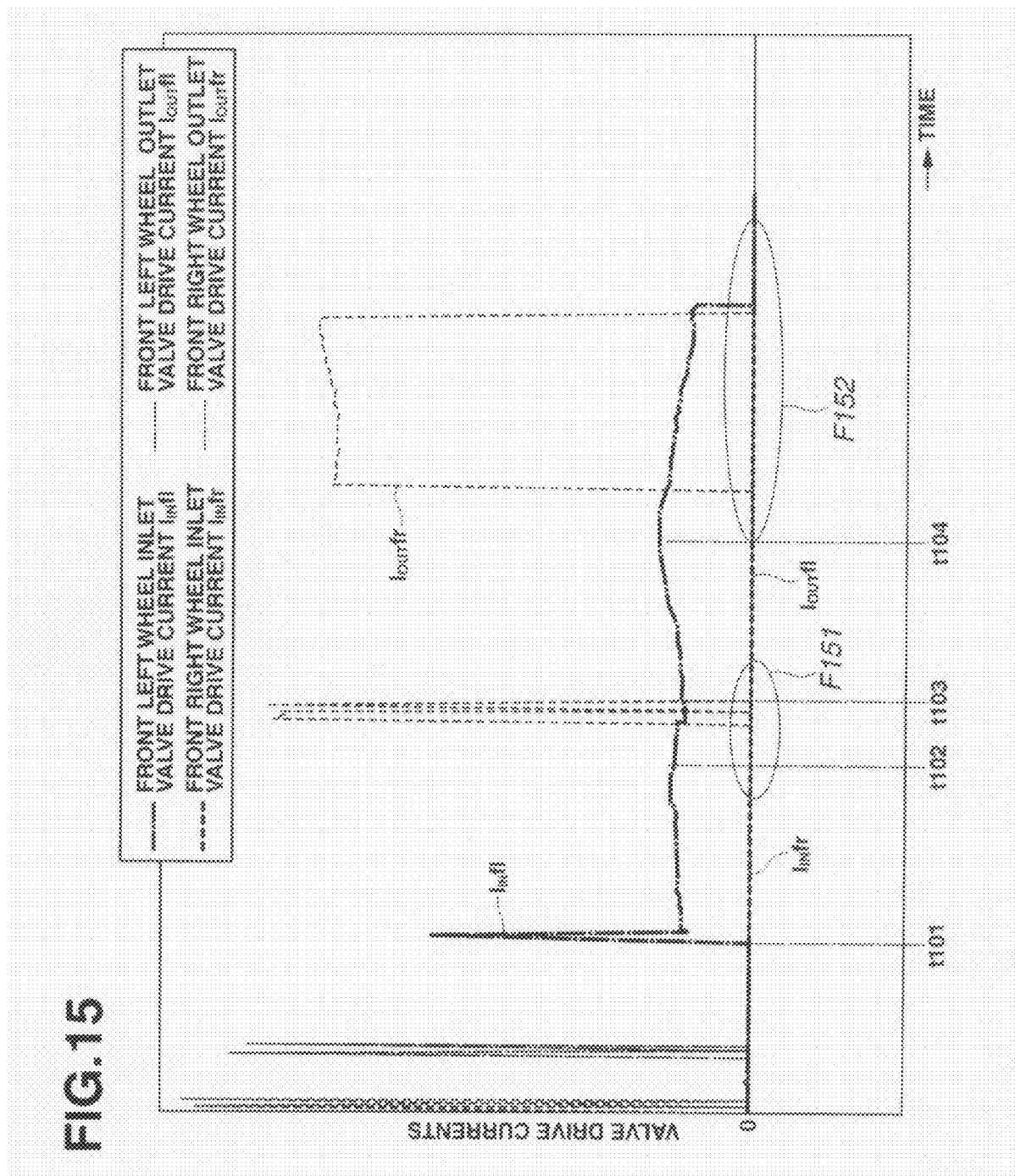
FIG. 15 is a time chart showing an example of how valve drive currents change in the brake control apparatus according to the first embodiment.

FIG. 14 shows an example of how valve drive currents change with time in the brake control apparatus according to the comparative example, while FIG. 15 shows an example of how valve drive currents change with time in the brake control apparatus according to the first embodiment. Time instants t101 to t104 in FIGS. 14 and 15 are identical to those in FIGS. 10 and 11.

In both of the comparative example and the first embodiment, at time t101, a control command is issued so that desired front left and right wheel cylinder pressures P*fl and P*fr start to increase. Desired front right wheel cylinder pressure P*fr increases more rapidly than desired front left wheel cylinder pressure P*fl. According to both of the comparative example and the first embodiment, for front right wheel FR, front right inlet valve IN/V(FR) is fully opened, while front right outlet valve OUT/V(FR) is fully closed. Both of front right inlet valve IN/V(FR) and front right outlet valve OUT/V(FR) are de-energized, because front right inlet valve IN/V(FR) is of the normally open type, and front right outlet valve OUT/V(FR) is of the normally closed type. On the other hand, for front left wheel FL, front left inlet valve IN/V(FL) is continuously variably controlled, while front left outlet valve OUT/V(FL) is fully closed. Front left inlet valve IN/V(FL) is energized, and front left outlet valve OUT/V(FL) is de-energized, because front left inlet valve IN/V(FL) is of the normally open type, and front left outlet valve OUT/V(FL) is of the normally closed type.

At time t102, a control command is issued so that desired front right wheel cylinder pressure P*fr is held constant. On the other hand, desired front left wheel cylinder pressure P*fl continues to increase. Accordingly, for front right wheel FR, front right outlet valve OUT/V(FR) is energized to suitably drain an excess of pump discharge pressure Pp in order to hold constant front right wheel cylinder pressure Pfr. On the other hand, front left outlet valve OUT/V(FL) is closed so that front left wheel cylinder pressure Pfl continues to increase. According to the comparative example, front right inlet valve IN/V(FR) is fully closed to hold front right wheel cylinder pressure Pfr. Since hydraulic pump P operates under condition that front right inlet valve IN/V(FR) is fully closed, the level of fluctuations in front right wheel cylinder pressure Pfr is relatively high. Also, the brake fluid between front right inlet valve IN/V(FR) and hydraulic pump P fluctuates so as to cause fluctuations in front left wheel cylinder pressure Pfl, and fluctuations in front left wheel inlet valve drive current Ifl, as indicated by F141 in FIG. 14. On the other hand, according to the first embodiment, high-pressure wheel cylinder pressure P_H of high-pressure wheel cylinder W/C_H (front right wheel cylinder W/C(FR) at time t102) is controlled by fully opening the high-pressure inlet valve IN/V_H (front right inlet valve IN/V(FR) at time t102), and regulating the pump discharge pressure Pp. Since fluid communication between high-pressure wheel cylinder W/C_H and hydraulic pump P is fully allowed so as to provide a large volume on the discharge side of hydraulic pump P, the level of fluctuations in the hydraulic pressure therebetween is suppressed. Thus, the level of fluctuations in front right wheel cylinder pressure Pfr (higher pressure) in the first embodiment is lower than that in the comparative example, and also, the level of fluctuations in front left wheel cylinder pressure Pfl in the first embodiment is lower than that in the comparative example so that front left wheel inlet valve drive current Ifl is more stable, as indicated by F151 in FIG. 15.

At time t103, a control command is issued so that desired front right wheel cylinder pressure P*fr starts to increase again. On the other hand, desired front left wheel cylinder pressure P*fl continues to increase. Accordingly, according to both of the comparative example and the first embodiment, for front right wheel FR, front right inlet valve IN/V(FR) is fully opened ($I_{IN}fr=0$), while front right outlet valve OUT/V(FR) is fully closed ($I_{OUT}fr=0$). On the other hand, for front left wheel FL, front left inlet valve IN/V(FL) is continuously variably controlled ($I_{IN}fl>0$), and front left outlet valve OUT/V(FL) is fully closed ($I_{OUT}fl=0$).

At time t104, a control command is issued so that desired front right wheel cylinder pressure P*fr is held constant. On the other hand, desired front left wheel cylinder pressure P*fl continues to increase. Accordingly, for front right wheel FR, front right outlet valve OUT/V(FR) is energized to suitably drain an excess of pump discharge pressure Pp in order to hold constant front right wheel cylinder pressure Pfr. As in the case of time t102, according to the comparative example, the level of fluctuations in front left and right wheel cylinder pressures Pfl and Pfr are relatively high so that the level of fluctuations in front left and right wheel inlet valve drive currents Ifl and Ifr are relatively high, because front right inlet valve IN/V(FR) is not fully opened, as indicated by F142 in FIG. 14. On the other hand, according to the first embodiment, the level of fluctuations in front left and right wheel cylinder pressures Pfl and Pfr is relatively low so that the level of fluctuations in front left and right wheel inlet valve drive currents Ifl and Ifr are relatively low, because front right inlet valve IN/V(FR) is fully opened, as indicated by F152 in FIG. 15.

If desired front left wheel cylinder pressure P*fl is equal to desired front right wheel cylinder pressure P*fr, control unit CU may fully open both of front left and right inlet valves IN/V(FL) and IN/V(FR). This is more effective for suppressing the level of fluctuations in the hydraulic pressures. As generally expressed, control unit CU determines whether or not at least two of the wheel cylinders are equal in the desired internal pressure to each other and are the highest in the desired internal pressure among all the wheel cylinders; and maximizes the cross-sectional flow area of at least two of the control valves hydraulically connected between the pump and respective ones of the at least two of the wheel cylinders, when determining that the at least two of the wheel cylinders are equal in the desired internal pressure to each other and are the highest in the desired internal pressure among all the wheel cylinders.

Figure 16:
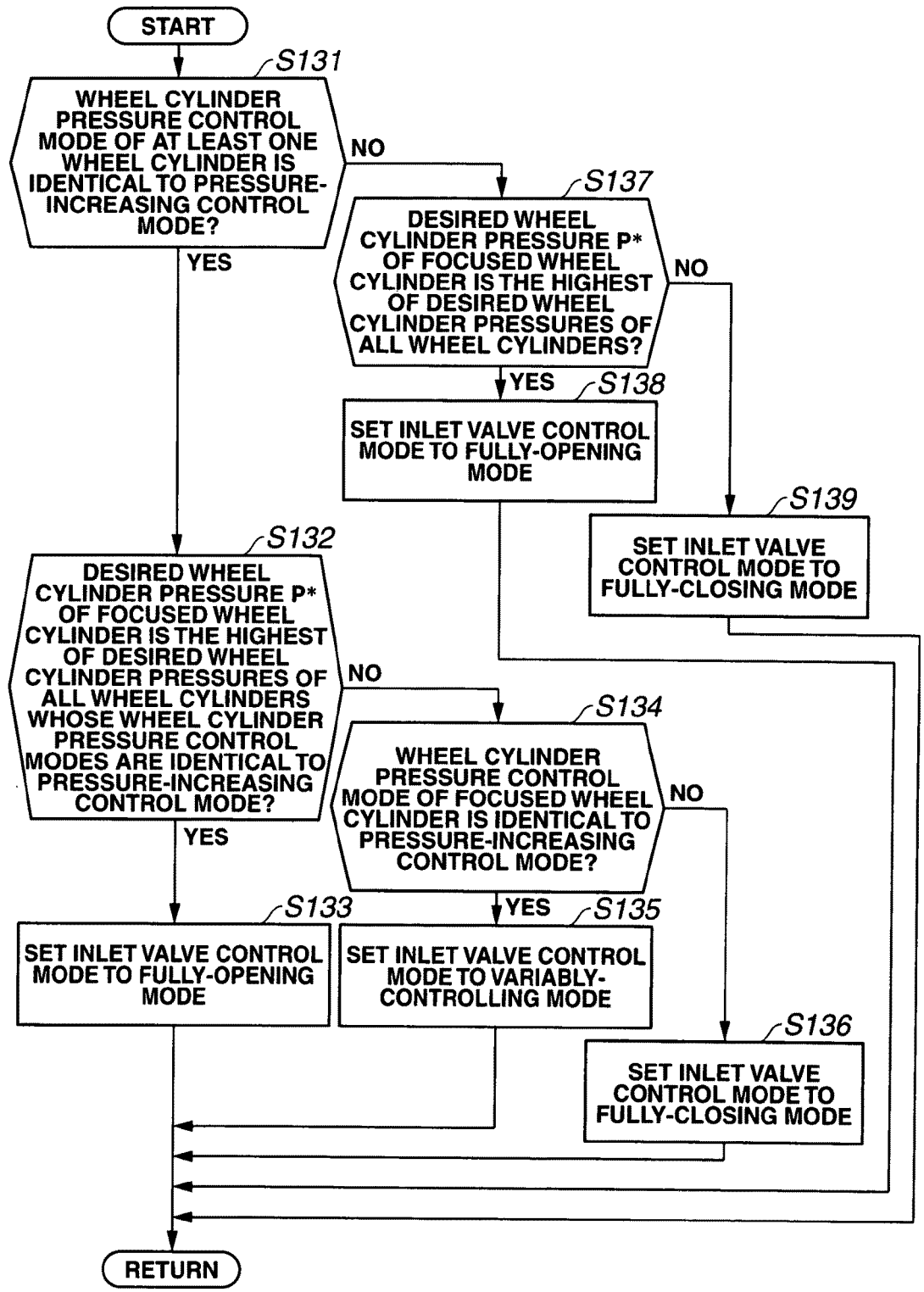
FIG. 16 is a flow chart showing a detailed process of selection for inlet valve control mode according to a second embodiment of the present invention (FIG. 3, Step S30).
Figure 17:
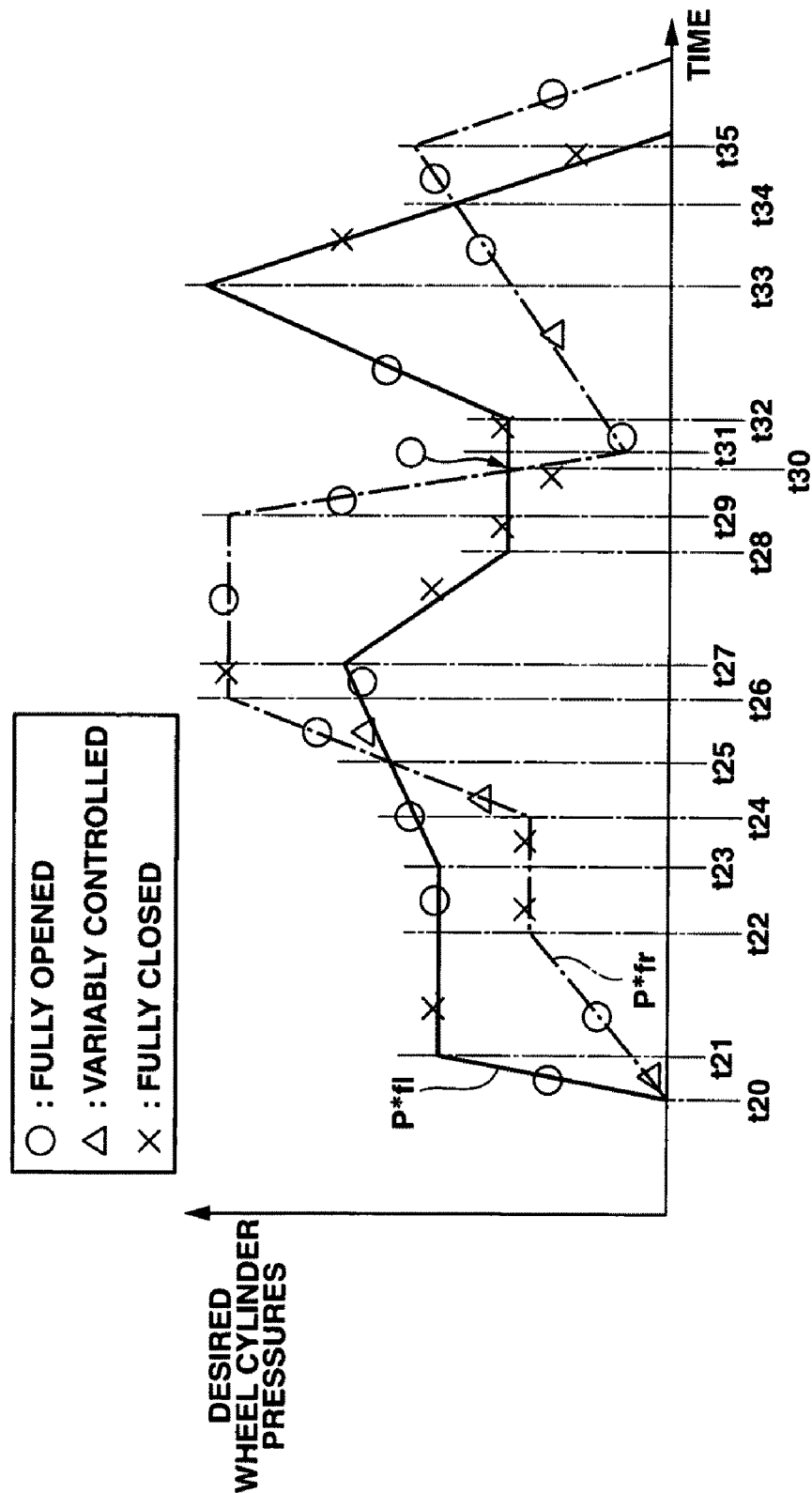
FIG. 17 is a time chart showing an example of how inlet valves are controlled depending on desired front left and right wheel cylinder pressures according to the second embodiment.

The following describes a brake control apparatus according to a second embodiment of the present invention with reference to FIGS. 16 and 17. The second embodiment is constructed based on the first embodiment. Although the brake control apparatus according to the first embodiment fully opens high-pressure inlet valve IN/V_H, the brake control apparatus according to the second embodiment controls the inlet valves depending on the wheel cylinder pressure control modes of the wheel cylinders as follows. When both of high-pressure wheel cylinder W/C_H and low-pressure wheel cylinder W/C_L are controlled in the pressure-increasing control mode, control unit CU according to the second embodiment fully opens high-pressure inlet valve IN/V_H. When both of high-pressure wheel cylinder W/C_H and low-pressure wheel cylinder W/C_L are controlled in the pressure-reducing control mode or the pressure-holding control mode, control unit CU fully opens high-pressure inlet valve IN/V_H. When high-pressure wheel cylinder W/C_H is controlled in one of the pressure-reducing control mode and the pressure-holding control mode and low-pressure wheel cylinder W/C_L is controlled in the pressure-increasing control mode, then control unit CU fully opens low-pressure inlet valve IN/V_L and fully closes high-pressure inlet valve IN/V_H.

In hydraulic unit HU according to the second embodiment, no pump discharge pressure sensor P/Sen is provided. Instead, pump discharge pressure Pp is measured by a high-pressure wheel cylinder pressure sensor WC/Sen_H defined as one of front left and right wheel cylinder pressure sensors WC/Sen(FL) and WC/Sen(FR) that is provided for high-pressure wheel cylinder W/C_H. Control unit CU implements the wheel cylinder pressure control by feedforward control based on the estimated pump discharge pressure Pp.

The following describes Step S30 of FIG. 3 for the case of the second embodiment in detail with reference to FIG. 16. Although the following relates to front left inlet valve IN/V(FL), the other inlet valves (front right inlet valve IN/V(FR) in this embodiment) are controlled similarly.

At Step S131, control unit CU judges whether or not the wheel cylinder pressure control mode of at least one of the wheel cylinders is identical to the pressure-increasing control mode. When the answer to Step S131 is YES, then control unit CU proceeds to Step S132. On the other hand, when the answer to step S131 is NO, then control unit CU proceeds to Step S137.

At Step S132, control unit CU judges whether or not front left wheel cylinder W/C(FL) is the highest in desired wheel cylinder pressure among the wheel cylinders whose wheel cylinder pressure control mode is identical to the pressure-increasing control mode. When the answer to Step S132 is YES, then control unit CU proceeds to Step S133. On the other hand, when the answer to step S132 is NO, then control unit CU proceeds to Step S134.

At Step S133, control unit CU sets the inlet valve control mode of front left inlet valve IN/V(FL) to the fully-opening mode, and then returns from this control process.

At Step S134, control unit CU judges whether or not the wheel cylinder pressure control mode of front left wheel cylinder W/C(FL) is identical to the pressure-increasing control mode. When the answer to Step S134 is YES, then control unit CU proceeds to Step S135. On the other hand, when the answer to step S134 is NO, then control unit CU proceeds to Step S136.

At Step S135, control unit CU sets the inlet valve control mode of front left inlet valve IN/V(FL) to the variably-controlling mode, and then returns from this control process.

At Step S136, control unit CU sets the inlet valve control mode of front left inlet valve IN/V(FL) to the fully-closing mode, and then returns from this control process.

At Step S137, control unit CU judges whether or not front left wheel cylinder W/C(FL) is the highest in desired wheel cylinder pressure among all the wheel cylinders. When the answer to Step S137 is YES, then control unit CU proceeds to Step S138. On the other hand, when the answer to step S137 is NO, then control unit CU proceeds to Step S139.

At Step S138, control unit CU sets the inlet valve control mode of front left inlet valve IN/V(FL) to the fully-opening mode, and then returns from this control process.

At Step S139, control unit CU sets the inlet valve control mode of front left inlet valve IN/V(FL) to the fully-closing mode, and then returns from this control process.

The following describes an example of how front left and right inlet valves IN/V(FL) and IN/V(FR) are controlled depending on desired front left and right wheel cylinder pressures P*fl and P*fr according to the second embodiment with reference to FIG. 17. In FIG. 17, solid lines represent desired front left wheel cylinder pressure P*fl, long dashed short dashed lines represent desired front right wheel cylinder pressure P*fr, each circle represents the fully-opening mode, each triangle represents the variably-controlling mode, and each cross represents the fully-closing mode.

At time t20, control unit CU issues such a control command that desired front left and right wheel cylinder pressures P*fl and P*fr start to increase from zero, and specifically that desired front left wheel cylinder pressure P*fl increases more rapidly than desired front right wheel cylinder pressure P*fr. Naturally, desired front left wheel cylinder pressure P*fl is higher than desired front right wheel cylinder pressure P*fr after time t20. The wheel cylinder pressure control mode of both of front left and right wheels FL and FR are set to the pressure-increasing control mode, because desired front left and right wheel cylinder pressures P*fl and P*fr are increasing. Since desired front left wheel cylinder pressure P*fl is higher than desired front right wheel cylinder pressure P*fr and the wheel cylinder pressure control mode of both of front left and right wheels FL and FR are identical to the pressure-increasing control mode, the inlet valve control mode of front left inlet valve IN/V(FL) is set to the fully-opening mode, while the inlet valve control mode of front right inlet valve IN/V(FR) is set to the variably-controlling mode.

At time t21, control unit CU issues such a control command that desired front left wheel cylinder pressure P*fl is held constant. Although desired front left wheel cylinder pressure P*fl is higher than desired front right wheel cylinder pressure P*fr, the inlet valve control mode of front left inlet valve IN/V(FL) is set to the fully-closing mode, and the inlet valve control mode of front right inlet valve IN/V(FR) is set to the fully-opening mode, because the wheel cylinder pressure control mode of front left wheel cylinder W/C(FL) is not identical to the pressure-increasing control mode and the wheel cylinder pressure control mode of front right wheel cylinder W/C(FR) is identical to the pressure-increasing control mode.

At time t22, control unit CU issues such a control command that desired front right wheel cylinder pressure P*fr is held constant. Since desired front left wheel cylinder pressure P*fl is still higher than desired front right wheel cylinder pressure P*fr and both of the wheel cylinder pressure control modes of front left and right wheel cylinders W/C(FL) and W/C(FR) are identical to the pressure-holding control mode, the inlet valve control mode of front left inlet valve IN/V(FL) is set to the fully-opening mode, while the inlet valve control mode of front right inlet valve IN/V(FR) is set to the fully-closing mode.

At time t23, control unit CU issues such a control command that desired front left wheel cylinder pressure P*fl starts to increase. Since desired front left wheel cylinder pressure P*fl is still higher than desired front right wheel cylinder pressure P*fr, the wheel cylinder pressure control mode of front left wheel cylinder W/C(FL) is identical to the pressure-increasing control mode, and the wheel cylinder pressure control mode of front right wheel cylinder W/C(FR) is identical to the pressure-holding control mode, the inlet valve control mode of front left inlet valve IN/V(FL) is set to the fully-opening mode, while the inlet valve control mode of front right inlet valve IN/V(FR) is set to the fully-closing mode. Front left wheel cylinder pressure Pfl is increased by increasing the pump discharge pressure Pp with front left inlet valve IN/V(FL) being fully open.

At time t24, control unit CU issues such a control command that desired front right wheel cylinder pressure P*fr starts to increase. Since desired front left wheel cylinder pressure P*fl is still higher than desired front right wheel cylinder pressure P*fr, the inlet valve control mode of front left inlet valve IN/V(FL) is still set to the fully-opening mode, and the inlet valve control mode of front right inlet valve IN/V(FR) is set to the variably-controlling mode. Desired front right wheel cylinder pressure P*fr increases more rapidly than desired front left wheel cylinder pressure P*fl. As a result, the difference between desired front left and right wheel cylinder pressures P*fl and P*fr decreases gradually.

At time t25, desired front right wheel cylinder pressure P*fr exceeds desired front left wheel cylinder pressure P*fl. Since desired front right wheel cylinder pressure P*fr is higher than desired front left wheel cylinder pressure P*fl after time t25, the inlet valve control mode of front left inlet valve IN/V(FL) is set to the variably-controlling mode, while the inlet valve control mode of front right inlet valve IN/V(FR) is set to the fully-opening mode.

At time t26, control unit CU issues such a control command that desired front right wheel cylinder pressure P*fr is held constant. Although desired front right wheel cylinder pressure P*fr is still higher than desired front left wheel cylinder pressure P*fl, the inlet valve control mode of front left inlet valve IN/V(FL) is set to the fully-opening mode, and the inlet valve control mode of front right inlet valve IN/V(FR) is set to the fully-closing mode, because the wheel cylinder pressure control mode of front left wheel cylinder W/C(FL) is identical to the pressure-increasing control mode and the wheel cylinder pressure control mode of front right wheel cylinder W/C(FR) is identical to the pressure-holding control mode.

At time t27, control unit CU issues such a control command that desired front left wheel cylinder pressure P*fl starts to decrease. Since desired front right wheel cylinder pressure P*fr is higher than desired front left wheel cylinder pressure P*fl, the wheel cylinder pressure control mode of front left wheel cylinder W/C(FL) is identical to the pressure-reducing control mode, and the wheel cylinder pressure control mode of front right wheel cylinder W/C(FR) is identical to the pressure-holding control mode, the inlet valve control mode of front left inlet valve IN/V(FL) is set to the fully-closing mode, while the inlet valve control mode of front right inlet valve IN/V(FR) is set to the fully-opening mode.

At time t28, control unit CU issues such a control command that desired front right wheel cylinder pressure P*fr is held constant. Since desired front right wheel cylinder pressure P*fr is higher than desired front left wheel cylinder pressure P*fl, and the wheel cylinder pressure control mode of both of front left and right wheel cylinders W/C(FL) and W/C(FR) are identical to the pressure-holding control mode, the inlet valve control mode of front left inlet valve IN/V(FL) is set to the fully-closing mode, while the inlet valve control mode of front right inlet valve IN/V(FR) is set to the fully-opening mode.

At time t29, control unit CU issues such a control command that desired front right wheel cylinder pressure P*fr starts to decrease. Since desired front right wheel cylinder pressure P*fr is higher than desired front left wheel cylinder pressure P*fl, the wheel cylinder pressure control mode of front left wheel cylinder W/C(FL) is identical to the pressure-holding control mode, and the wheel cylinder pressure control mode of front right wheel cylinder W/C(FR) is identical to the pressure-reducing control mode, the inlet valve control mode of front left inlet valve IN/V(FL) is set to the fully-closing mode, while the inlet valve control mode of front right inlet valve IN/V(FR) is set to the fully-opening mode. After time t29, the difference between desired front left and right wheel cylinder pressures P*fl and P*fr decreases, because desired front right wheel cylinder pressure P*fr is held constant.

At time t30, desired front right wheel cylinder pressure P*fr decreases below desired front left wheel cylinder pressure P*fl. Since desired front left wheel cylinder pressure P*fl is higher than desired front right wheel cylinder pressure P*fr after time t30, the inlet valve control mode of front left inlet valve IN/V(FL) is set to the fully-opening mode, while the inlet valve control mode of front right inlet valve IN/V(FR) is set to the fully-closing mode.

At time t31, control unit CU issues such a control command that desired front right wheel cylinder pressure P*fr starts to increase. Since the wheel cylinder pressure control mode of front right wheel cylinder W/C(FR) is identical to the pressure-increasing control mode and the wheel cylinder pressure control mode of front left wheel cylinder W/C(FL) is identical to the pressure-holding control mode, the inlet valve control mode of front left inlet valve IN/V(FL) is set to the fully-closing mode, while the inlet valve control mode of front right inlet valve IN/V(FR) is set to the fully-opening mode.

At time t32, control unit CU issues such a control command that desired front left wheel cylinder pressure P*fl starts to increase. Since desired front left wheel cylinder pressure P*fl is higher than desired front right wheel cylinder pressure P*fr, the inlet valve control mode of front left inlet valve IN/V(FL) is set to the fully-opening mode, while the inlet valve control mode of front right inlet valve IN/V(FR) is set to the variably-controlling mode.

At time t33, control unit CU issues such a control command that desired front left wheel cylinder pressure P*fl starts to decrease. Since the wheel cylinder pressure control mode of front left wheel cylinder W/C(FL) is identical to the pressure-reducing control mode and the wheel cylinder pressure control mode of front right wheel cylinder W/C(FR) is identical to the pressure-increasing control mode, the inlet valve control mode of front left inlet valve IN/V(FL) is set to the fully-closing mode, while the inlet valve control mode of front right inlet valve IN/V(FR) is set to the fully-opening mode.

At time t34, desired front right wheel cylinder pressure P*fr exceeds desired front left wheel cylinder pressure P*fl. Since the wheel cylinder pressure control mode of front left wheel cylinder W/C(FL) is still identical to the pressure-reducing control mode and the wheel cylinder pressure control mode of front right wheel cylinder W/C(FR) is still identical to the pressure-increasing control mode, the inlet valve control mode of front left inlet valve IN/V(FL) is set to the fully-closing mode, while the inlet valve control mode of front right inlet valve IN/V(FR) is set to the fully-opening mode.

At time t35, control unit CU issues such a control command that desired front right wheel cylinder pressure P*fr starts to decrease. Since desired front right wheel cylinder pressure P*fr is higher than desired front left wheel cylinder pressure P*fl, the inlet valve control mode of front left inlet valve IN/V(FL) is set to the fully-closing mode, while the inlet valve control mode of front right inlet valve IN/V(FR) is set to the fully-opening mode.

When the wheel cylinder pressure control mode of both of front left and right wheels FL and FR are identical to the pressure-reducing control mode or the pressure-holding control mode, control unit CU stops to drive electric motor M, and thereby stops to drive hydraulic pump P, for reduction of power consumption. In the example shown in FIG. 17, control unit CU stops to drive electric motor M, over a period from time t22 to time t23, a period from t27 to time t31, and a period from time t35.

According to the second embodiment, it is sufficient that hydraulic pump P supplies desired low-pressure wheel cylinder pressure P*_L, over a period from time t21 to time t22, a period from time t26 to time t27, a period from time t31 to time t32, and a period from time t33 to time t34, because low-pressure inlet valve IN/V_L is fully opened. This is effective for further reducing the power consumption.

If desired front left wheel cylinder pressure P*fl is equal to desired front right wheel cylinder pressure P*fr, control unit CU may fully open both of front left and right inlet valves IN/V(FL) and IN/V(FR). This is more effective for suppressing the level of fluctuations in the hydraulic pressures.

Figure 18:
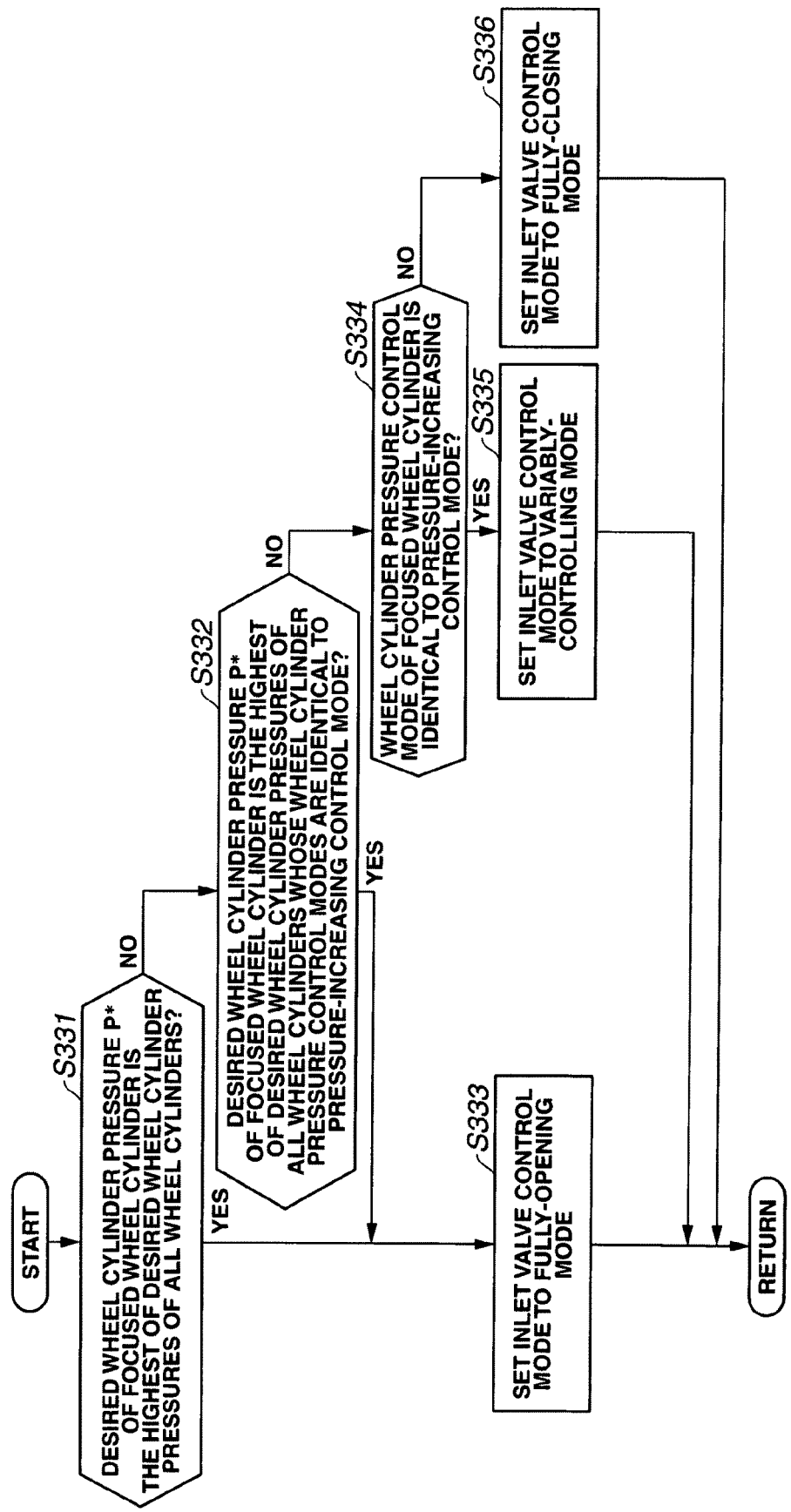
FIG. 18 is a flow chart showing a detailed process of selection for inlet valve control mode for a front left inlet valve according to a third embodiment of the present invention (FIG. 3, Step S30).
Figure 19:
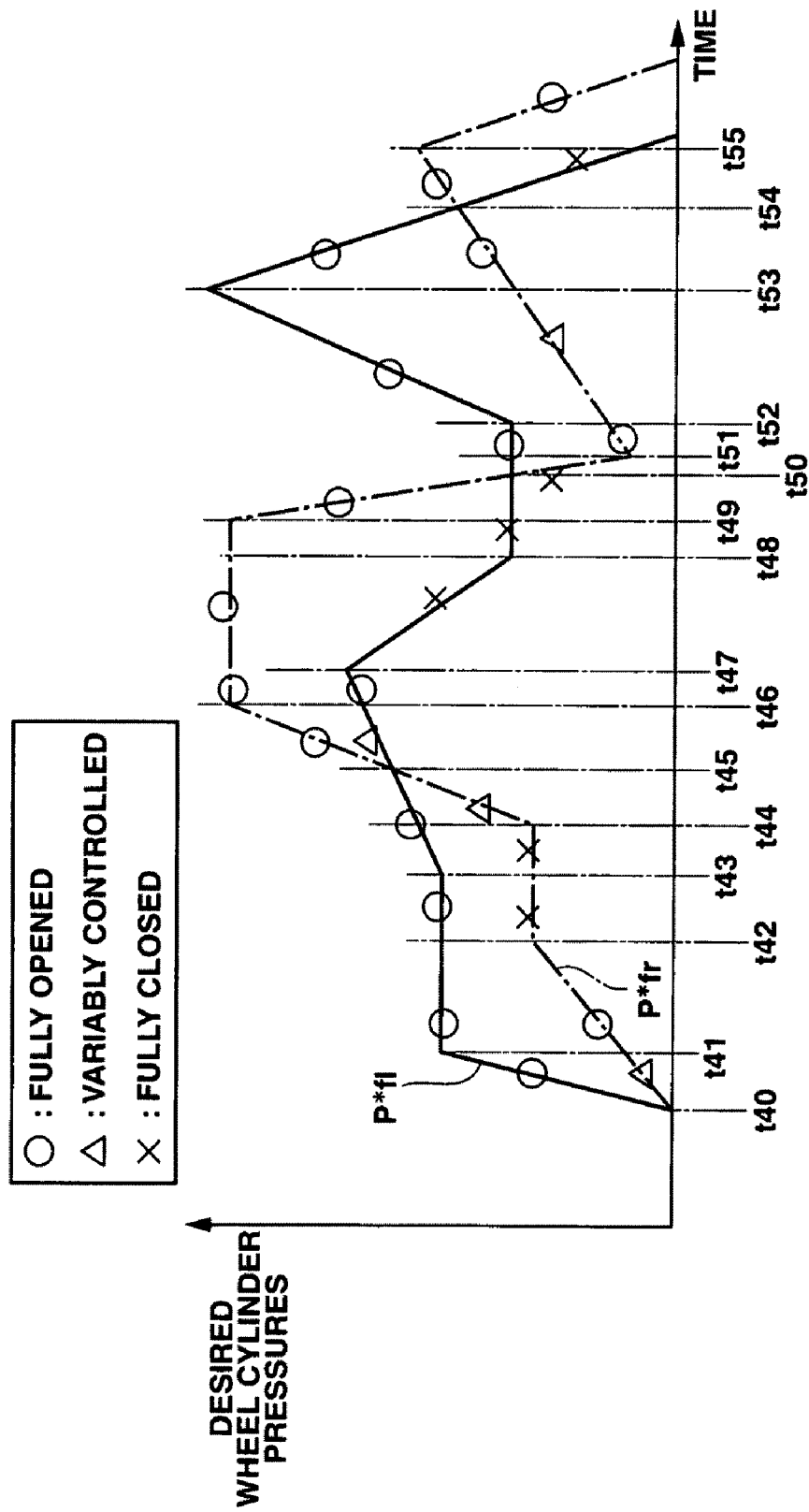
FIG. 19 is a time chart showing an example of how inlet valves are controlled depending on desired front left and right wheel cylinder pressures according to the third embodiment.

The following describes a brake control apparatus according to a third embodiment of the present invention with reference to FIGS. 18 and 19. The third embodiment is constructed based on the first embodiment. The brake control apparatus according to the third embodiment constantly controls high-pressure inlet valve IN/V_H to be fully opened. The brake control apparatus further controls low-pressure inlet valve IN/V_L to be fully opened, when high-pressure wheel cylinder W/C_H is being controlled in one of the pressure-reducing control mode and the pressure-holding control mode, and low-pressure wheel cylinder W/C_L is being controlled in the pressure-increasing control mode.

In hydraulic unit HU according to the third embodiment, no pump discharge pressure sensor P/Sen is provided. Instead, pump discharge pressure Pp is measured by a high-pressure wheel cylinder pressure sensor WC/Sen_H defined as one of front left and right wheel cylinder pressure sensors WC/Sen(FL) and WC/Sen(FR) that is provided for high-pressure wheel cylinder W/C_H.

The following describes Step S30 of FIG. 3 for the case of the third embodiment in detail with reference to FIG. 18. Although the following relates to front left inlet valve IN/V(FL), the other inlet valves (front right inlet valve IN/V(FR) in this embodiment) are controlled similarly.

At Step S331, control unit CU judges whether or not front left wheel cylinder W/C(FL) is the highest in desired wheel cylinder pressure among all the wheel cylinders. When the answer to Step S331 is YES, then control unit CU proceeds to Step S333. On the other hand, when the answer to step S331 is NO, then control unit CU proceeds to Step S332.

At Step S332, control unit CU judges whether or not front left wheel cylinder W/C(FL) is the highest in desired wheel cylinder pressure among the wheel cylinders whose wheel cylinder pressure control mode is identical to the pressure-increasing control mode. When the answer to Step S332 is YES, then control unit CU proceeds to Step S333. On the other hand, when the answer to step S332 is NO, then control unit CU proceeds to Step S334.

At Step S333, control unit CU sets the inlet valve control mode of front left inlet valve IN/V(FL) to the fully-opening mode, and then returns from this control process.

At Step S334, control unit CU judges whether or not the wheel cylinder pressure control mode of front left wheel cylinder W/C(FL) is identical to the pressure-increasing control mode. When the answer to Step S334 is YES, then control unit CU proceeds to Step S335. On the other hand, when the answer to step S334 is NO, then control unit CU proceeds to Step S336.

At Step S335, control unit CU sets the inlet valve control mode of front left inlet valve IN/V(FL) to the variably-controlling mode, and then returns from this control process.

At Step S336, control unit CU sets the inlet valve control mode of front left inlet valve IN/V(FL) to the fully-closing mode, and then returns from this control process.

The following describes an example of how front left and right inlet valves IN/V(FL) and IN/V(FR) are controlled depending on desired front left and right wheel cylinder pressures P*fl and P*fr according to the third embodiment with reference to FIG. 19. In FIG. 19, solid lines represent desired front left wheel cylinder pressure P*fl, long dashed short dashed lines represent desired front right wheel cylinder pressure P*fr, each circle represents the fully-opening mode, each triangle represents the variably-controlling mode, and each cross represents the fully-closing mode.

At time t40, control unit CU issues such a control command that desired front left and right wheel cylinder pressures P*fl and P*fr start to increase from zero, and specifically that desired front left wheel cylinder pressure P*fl increases more rapidly than desired front right wheel cylinder pressure P*fr. Naturally, desired front left wheel cylinder pressure P*fl is higher than desired front right wheel cylinder pressure P*fr after time t40. The wheel cylinder pressure control mode of both of front left and right wheels FL and FR are set to the pressure-increasing control mode, because desired front left and right wheel cylinder pressures P*fl and P*fr are increasing. Since desired front left wheel cylinder pressure P*fl is higher than desired front right wheel cylinder pressure P*fr and the wheel cylinder pressure control mode of both of front left and right wheels FL and FR are identical to the pressure-increasing control mode, the inlet valve control mode of front left inlet valve IN/V(FL) is set to the fully-opening mode, while the inlet valve control mode of front right inlet valve IN/V(FR) is set to the variably-controlling mode.

At time t41, control unit CU issues such a control command that desired front left wheel cylinder pressure P*fl is held constant. Since desired front left wheel cylinder pressure P*fl is higher than desired front right wheel cylinder pressure P*fr, the wheel cylinder pressure control mode of front left wheel cylinder W/C(FL) is identical to the pressure-holding control mode and the wheel cylinder pressure control mode of front right wheel cylinder W/C(FR) is identical to the pressure-increasing control mode, the inlet valve control mode of both of front left and right inlet valves IN/V(FL) and IN/V(FR) are set to the fully-opening mode. Check valve C/V(FL) is closed, because front left wheel cylinder pressure Pfl is higher than pump discharge pressure Pp. Accordingly, front left wheel cylinder pressure Pfl is maintained independently of the opening of front left inlet valve IN/V(FL).

At time t42, control unit CU issues such a control command that desired front right wheel cylinder pressure P*fr is held constant. Since desired front left wheel cylinder pressure P*fl is still higher than desired front right wheel cylinder pressure P*fr, the inlet valve control mode of front left inlet valve IN/V(FL) is set to the fully-opening mode, while the inlet valve control mode of front right inlet valve IN/V(FR) is set to the fully-closing mode.

At time t43, control unit CU issues such a control command that desired front left wheel cylinder pressure P*fl starts to increase. Since desired front left wheel cylinder pressure P*fl is still higher than desired front right wheel cylinder pressure P*fr, the inlet valve control mode of front left inlet valve IN/V(FL) is still set to the fully-opening mode. Front left wheel cylinder pressure Pfl is increased by increasing the pump discharge pressure Pp with front left inlet valve IN/V(FL) being fully open.

At time t44, control unit CU issues such a control command that desired front right wheel cylinder pressure P*fr starts to increase. Since desired front left wheel cylinder pressure P*fl is still higher than desired front right wheel cylinder pressure P*fr, the inlet valve control mode of front left inlet valve IN/V(FL) is still set to the fully-opening mode, while the inlet valve control mode of front right inlet valve IN/V(FR) is set to the variably-controlling mode. Desired front right wheel cylinder pressure P*fr increases more rapidly than desired front left wheel cylinder pressure P*fl. As a result, the difference between desired front left and right wheel cylinder pressures P*fl and P*fr decreases gradually.

At time t45, desired front right wheel cylinder pressure P*fr exceeds desired front left wheel cylinder pressure P*fl. Since desired front right wheel cylinder pressure P*fr is higher than desired front left wheel cylinder pressure P*fl after time t45, the inlet valve control mode of front left inlet valve IN/V(FL) is set to the variably-controlling mode, while the inlet valve control mode of front right inlet valve IN/V(FR) is set to the fully-opening mode.

At time t46, control unit CU issues such a control command that desired front right wheel cylinder pressure P*fr is held constant. Since desired front right wheel cylinder pressure P*fr is higher than desired front left wheel cylinder pressure P*fl, the wheel cylinder pressure control mode of front right wheel cylinder W/C(FR) is identical to the pressure-holding control mode and the wheel cylinder pressure control mode of front left wheel cylinder W/C(FL) is identical to the pressure-increasing control mode, the inlet valve control mode of both of front left and right inlet valves IN/V(FL) and IN/V(FR) are set to the fully-opening mode.

At time t47, control unit CU issues such a control command that desired front left wheel cylinder pressure P*fl starts to decrease. Since desired front right wheel cylinder pressure P*fr is still higher than desired front left wheel cylinder pressure P*fl, the wheel cylinder pressure control mode of front left wheel cylinder W/C(FL) is identical to the pressure-reducing control mode and the wheel cylinder pressure control mode of front right wheel cylinder W/C(FR) is identical to the pressure-holding control mode, the inlet valve control mode of front left inlet valve IN/V(FL) is set to the fully-closing mode, while the inlet valve control mode of front right inlet valve IN/V(FR) is set to the fully-opening mode.

At time t48, control unit CU issues such a control command that desired front right wheel cylinder pressure P*fr is held constant. Since desired front right wheel cylinder pressure P*fr is still higher than desired front left wheel cylinder pressure P*fl, the inlet valve control mode of front left inlet valve IN/V(FL) is set to the fully-closing mode, while the inlet valve control mode of front right inlet valve IN/V(FR) is set to the fully-opening mode.

At time t49, control unit CU issues such a control command that desired front right wheel cylinder pressure P*fr starts to decrease. Since desired front right wheel cylinder pressure P*fr is still higher than desired front left wheel cylinder pressure P*fl and there is no wheel cylinder whose wheel cylinder pressure control mode is identical to the pressure-increasing control mode, the inlet valve control mode of front left inlet valve IN/V(FL) is set to the fully-closing mode, while the inlet valve control mode of front right inlet valve IN/V(FR) is set to the fully-opening mode. After time t49, the difference between desired front left and right wheel cylinder pressures P*fl and P*fr decreases, because desired front right wheel cylinder pressure P*fr is held constant.

At time t50, desired front right wheel cylinder pressure P*fr decreases below desired front left wheel cylinder pressure P*fl. Since desired front left wheel cylinder pressure P*fl is higher than desired front right wheel cylinder pressure P*fr, the inlet valve control mode of front left inlet valve IN/V(FL) is set to the fully-opening mode, while the inlet valve control mode of front right inlet valve IN/V(FR) is set to the fully-closing mode.

At time t51, control unit CU issues such a control command that desired front right wheel cylinder pressure P*fr starts to increase. Since desired front left wheel cylinder pressure P*fl is higher than desired front right wheel cylinder pressure P*fr, the wheel cylinder pressure control mode of front left wheel cylinder W/C(FL) is identical to the pressure-holding control mode, and the wheel cylinder pressure control mode of front right wheel cylinder W/C(FR) is identical to the pressure-increasing control mode, the inlet valve control mode of both of front left and right inlet valves IN/V(FL) and IN/V(FR) are set to the fully-opening mode.

At time t52, control unit CU issues such a control command that desired front left wheel cylinder pressure P*fl starts to increase. Since desired front left wheel cylinder pressure P*fl is higher than desired front right wheel cylinder pressure P*fr and the wheel cylinder pressure control mode of front left wheel cylinder W/C(FL) is identical to the pressure-increasing control mode, the inlet valve control mode of front left inlet valve IN/V(FL) is set to the fully-opening mode, while the inlet valve control mode of front right inlet valve IN/V(FR) is set to the variably-controlling mode.

At time t53, control unit CU issues such a control command that desired front left wheel cylinder pressure P*fl starts to decrease. Since desired front left wheel cylinder pressure P*fl is higher than desired front right wheel cylinder pressure P*fr, the wheel cylinder pressure control mode of front left wheel cylinder W/C(FL) is identical to the pressure-reducing control mode, and the wheel cylinder pressure control mode of front right wheel cylinder W/C(FR) is identical to the pressure-increasing control mode, the inlet valve control mode of both of front left and right inlet valves IN/V(FL) and IN/V(FR) are set to the fully-opening mode.

At time t54, desired front right wheel cylinder pressure P*fr exceeds desired front left wheel cylinder pressure P*fl. Since desired front right wheel cylinder pressure P*fr is higher than desired front left wheel cylinder pressure P*fl after time t54, the inlet valve control mode of front left inlet valve IN/V(FL) is set to the fully-closing mode, while the inlet valve control mode of front right inlet valve IN/V(FR) is set to the fully-opening mode.

At time t55, control unit CU issues such a control command that desired front right wheel cylinder pressure P*fr starts to decrease. Since desired front right wheel cylinder pressure P*fr is higher than desired front left wheel cylinder pressure P*fl, the inlet valve control mode of front left inlet valve IN/V(FL) is still set to the fully-closing mode, while the inlet valve control mode of front right inlet valve IN/V(FR) is set to the fully-opening mode.

According to the third embodiment, it is sufficient that hydraulic pump P supplies desired low-pressure wheel cylinder pressure P*_L, over a period from time t41 to time t42, a period from time t46 to time t47, a period from time t51 to time t52, and a period from time t53 to time t54, because low-pressure inlet valve IN/V_L is fully opened. This is effective for further reducing the power consumption.

When the wheel cylinder pressure control mode of both of front left and right wheels FL and FR are identical to the pressure-reducing control mode or the pressure-holding control mode, control unit CU stops to drive electric motor M, and thereby stops to drive hydraulic pump P, for reduction of power consumption. Check valves C/V(FL) and C/V(FR) serve to inhibit fluid flow from front left and right wheel cylinders W/C(FL) and W/C(FR) to the discharge side of hydraulic pump P. In the example shown in FIG. 19, control unit CU stops to drive electric motor M, over a period from time t42 to time t43, a period from time t47 to time t51, and a period from time t55.

The third embodiment is more effective than the second embodiment with regard to reduction of power consumption of the inlet valves.

If desired front left wheel cylinder pressure P*fl is equal to desired front right wheel cylinder pressure P*fr, control unit CU may fully open both of front left and right inlet valves IN/V(FL) and IN/V(FR). This is more effective for suppressing the level of fluctuations in the hydraulic pressures.

Figure 20:
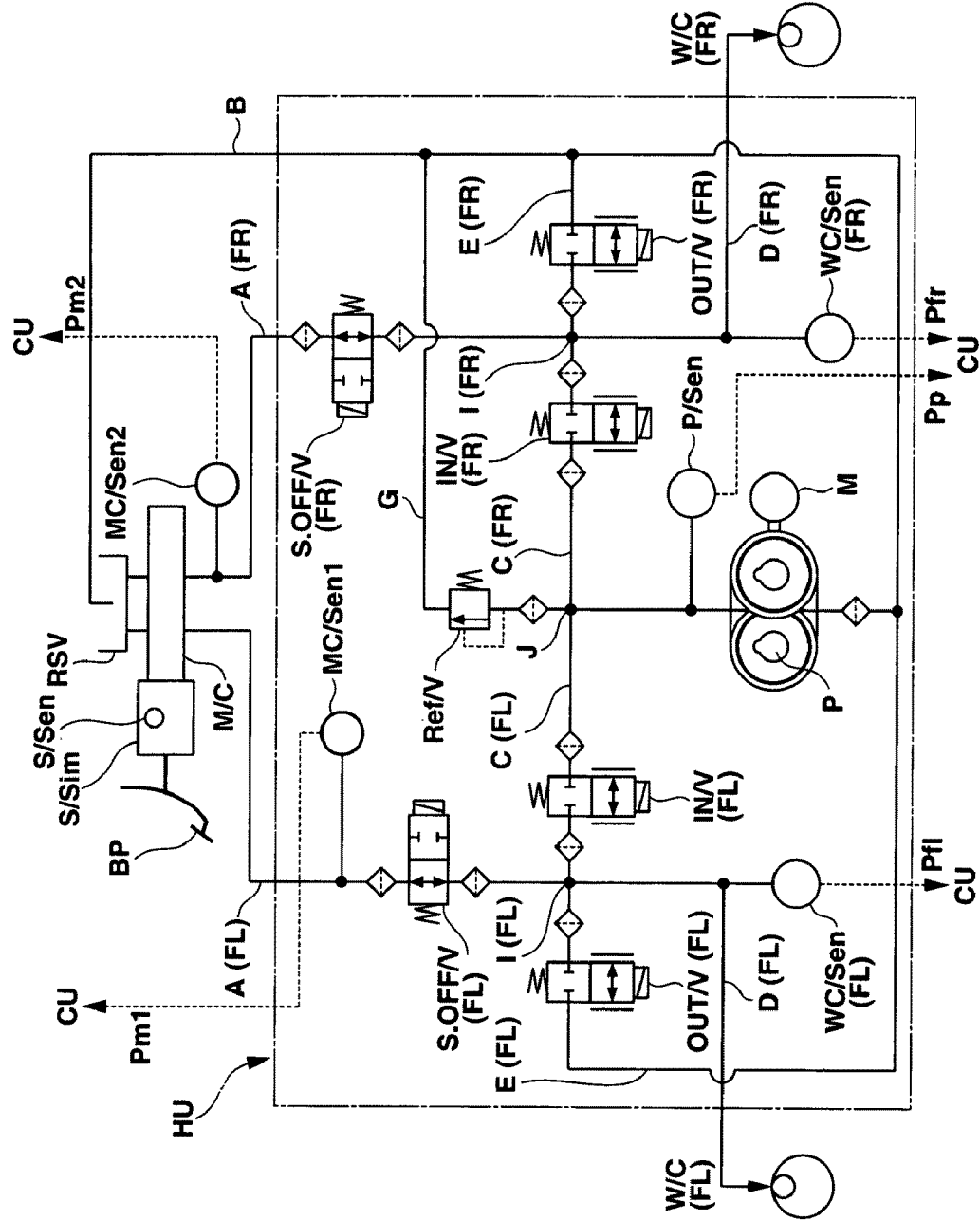
FIG. 20 is a hydraulic circuit diagram of a hydraulic unit according to a fourth embodiment of the present invention.
Figure 21:
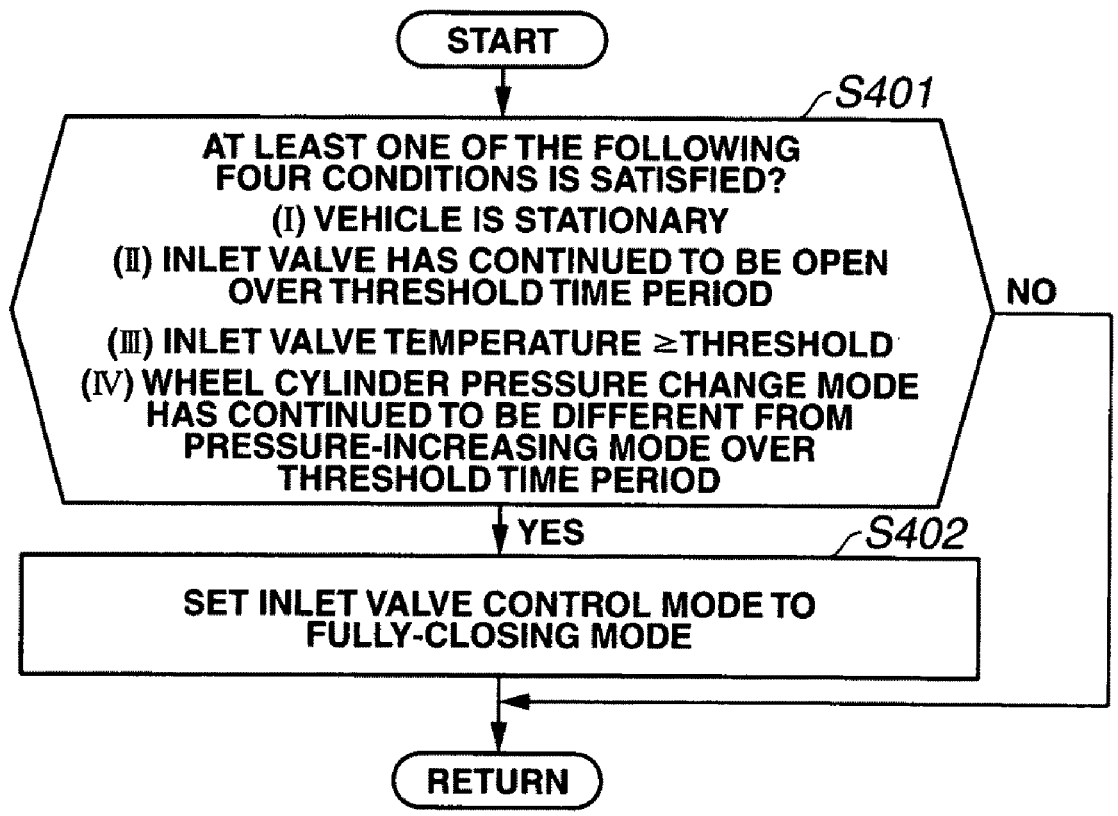
FIG. 21 is a flow chart showing a process of selection for inlet valve control mode according to the fourth embodiment.

The following describes a brake control apparatus according to a fourth embodiment of the present invention with reference to FIGS. 20 and 21. The fourth embodiment is constructed based on the first embodiment. Although front left and right inlet valves IN/V(FL) and IN/V(FR) according to the first embodiment are normally open electromagnetic valves, those according to the fourth embodiment are normally closed electromagnetic valves.

FIG. 20 shows a hydraulic circuit diagram of hydraulic unit HU according to the fourth embodiment. Hydraulic unit HU includes front left and right inlet valves IN/V(FL) and IN/V(FR) in the form of normally closed electromagnetic valves. Accordingly, check valves C/V(FL) and D/V(FR) are not provided in fluid passages C(FL) and C(FR).

The fourth embodiment employs one of the process for selection of inlet valve control mode according to the first embodiment shown in FIG. 6 and the process for selection of inlet valve control mode according to the second embodiment shown in FIG. 16.

When front left and right inlet valves IN/V(FL) and IN/V(FR) continue to be energized to be open for a long period of time, there is a possibility that front left and right inlet valves IN/V(FL) and IN/V(FR) are heated and the power consumption is increased. According to the fourth embodiment, even when front left and right inlet valves IN/V(FL) and IN/V(FR) are to be opened basically, control unit CU temporarily closes front left and right inlet valves IN/V(FL) and IN/V(FR) as described in detail below.

The following describes an additional process of selection for inlet valve control mode according to the fourth embodiment with reference to FIG. 21. This process of selection is prioritized more highly than the process for selection of inlet valve control mode according to the first embodiment shown in FIG. 6 or the process for selection of inlet valve control mode according to the second embodiment shown in FIG. 16. Control unit CU operates as follows.

At Step S401, control unit CU judges whether or a predetermined precondition is satisfied. Control unit CU judges that the predetermined precondition is satisfied, when determining that at least one of the following four conditions is satisfied:

(I) The vehicle is stationary.

(II) A focused inlet valve has continued to be fully open over a predetermined threshold time period.

(III) The temperature of the inlet valve is higher than or equal to a predetermined threshold temperature value.

(IV) The wheel cylinder pressure change mode of a focused wheel cylinder has continued to be different from the pressure-increasing mode over a predetermined threshold time period.

When the answer to Step S401 is YES, then control unit CU proceeds to Step S402. On the other hand, when the answer to Step S401 is NO, then control unit CU returns from this control process.

At Step S402, control unit CU sets the inlet valve control mode of the focused inlet valve to the fully-closing mode, and then returns from this control process. Thus, control unit CU according to the fourth embodiment temporarily inhibits keeping constantly a condition that the cross-sectional flow area of at least one of inlet valves IN/V(FL), IN/V(FR), IN/V(RL) and IN/V(RR) is maximized.

Figure 22:
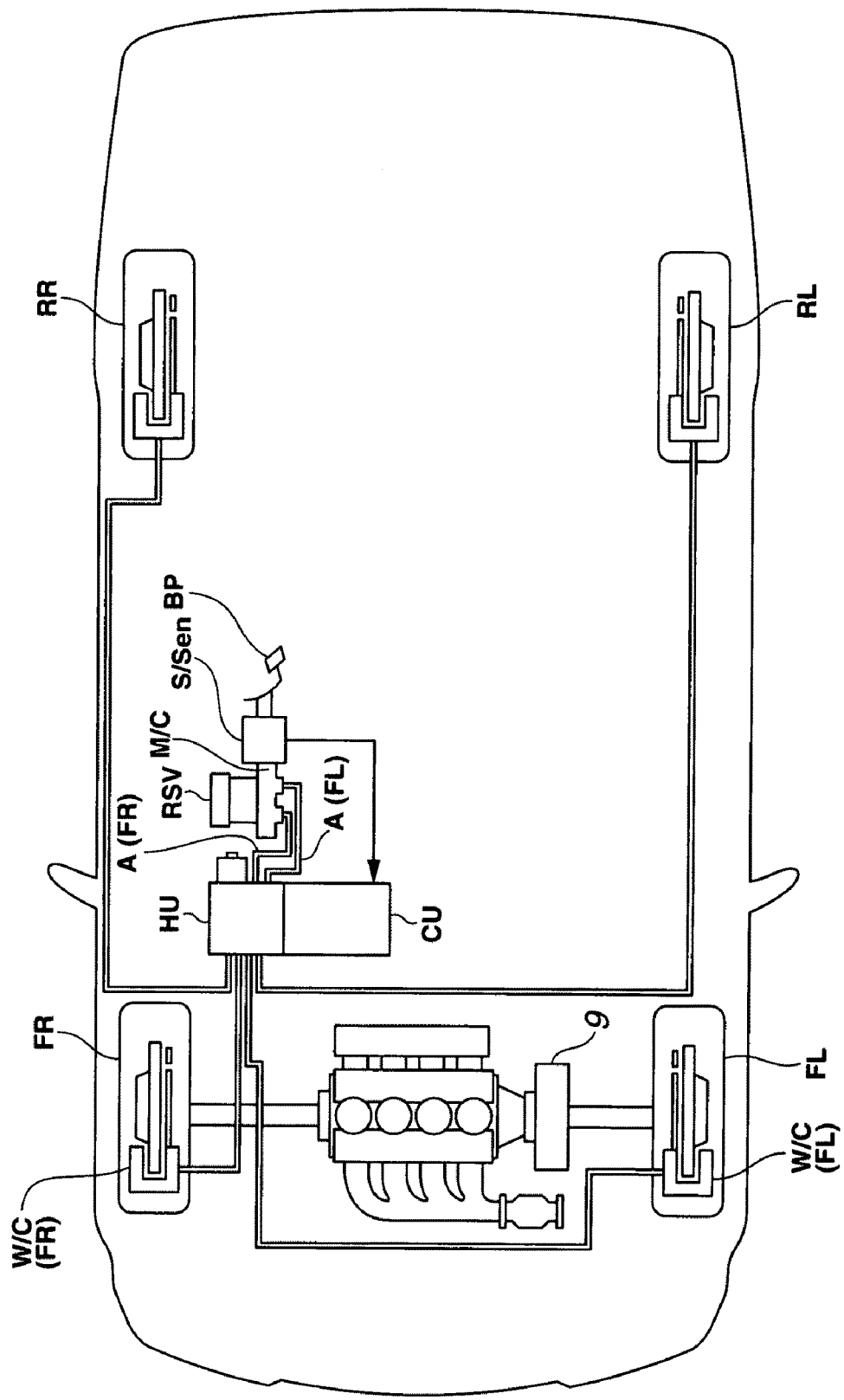
FIG. 22 is a system configuration diagram of a brake control apparatus according to a fifth embodiment of the present invention.
Figure 23:
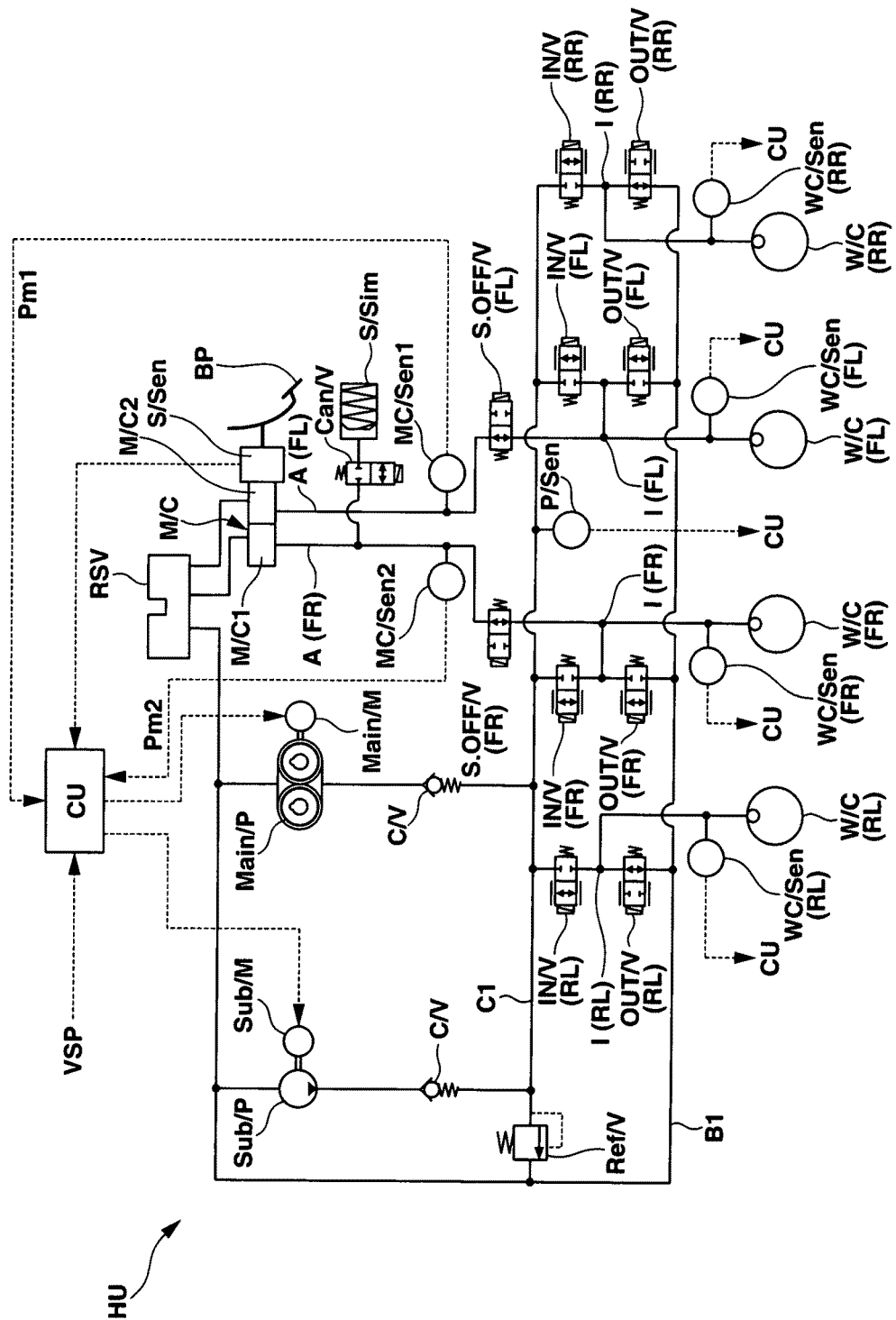
FIG. 23 is a hydraulic circuit diagram of a hydraulic unit according to the fifth embodiment.

The following describes a brake control apparatus according to a fifth embodiment of the present invention with reference to FIGS. 22 and 23. The fifth embodiment is constructed based on the first embodiment. Although the brake-by-wire system of the brake control apparatus according to the first embodiment does not include the rear wheels, the brake-by-wire system of the brake control apparatus according to the fifth embodiment includes all the four wheels.

Under normal operating conditions, control unit CU controls hydraulic unit HU to drive a main hydraulic pump "Main/P" to supply hydraulic pressures to all the four wheel cylinders W/C(FL), W/C(FR), "W/C(RL)" and "W/C(RR)". Master cylinder M/C in the form of a so-called tandem type master cylinder includes a first master cylinder "M/C1" and a second master cylinder "M/C2". Master cylinder M/C is hydraulically connected through fluid passages A(FL) and A(FR) and hydraulic unit HU to front left and right wheel cylinders W/C(FL) and W/C(FR).

Master cylinder M/C is hydraulically connected to reservoir RSV. The electromagnetic valves in hydraulic unit HU are controlled by control unit CU. A sub hydraulic pump "Sub/P" is provided in parallel with main hydraulic pump Main/P for supporting the operation of main hydraulic pump Main/P. Control unit CU drives a main electric motor "Main/M" and a sub electric motor "Sub/M" to control main hydraulic pump Main/P and sub hydraulic pump Sub/P, respectively.

Shut-off valve S.OFF/V(FL), which is a normally open electromagnetic ON/OFF valve, is disposed in fluid passage A(FL) for selectively allowing or inhibiting fluid communication between second master cylinder M/C2 and front left wheel cylinder W/C(FL). Similarly, shut-off valve S.OFF/V(FR), which is a normally open electromagnetic ON/OFF valve, is disposed in fluid passage A(FR) for selectively allowing or inhibiting fluid communication between first master cylinder M/C1 and front right wheel cylinder W/C(FR).

Stroke simulator S/Sim is disposed in fluid passage A(FR) between first master cylinder M/C1 and shut-off valve S.OFF/V(FR). Stroke simulator S/Sim is hydraulically connected to fluid passage A(FR) through a cancel valve "Can/V". Cancel valve Can/V is a normally closed electromagnetic ON/OFF valve.

Under condition that shut-off valve S.OFF/V(FR) is closed and cancel valve Can/V is opened, the brake fluid is supplied from first master cylinder M/C1 to stroke simulator S/Sim for allowing the stroke of brake pedal BP.

Main and sub hydraulic pumps Main/P and Sub/P include respective discharge ports hydraulically connected though a fluid passage "C1" and nodes "I(FL)", "I(FR)", "I(RL)" and "I(RR)" to wheel cylinders W/C(FL), W/C(FR), W/C(RL) and W/C(RR). On the other hand, main and sub hydraulic pumps Main/P and Sub/P include respective suction ports hydraulically connected to a fluid passage "B1".

Inlet valves IN/V(FL), IN/V(FR), "IN/V(RL)" and "IN/V(RR)", which are normally closed linear electromagnetic valves, are provided in fluid passage C1 for selectively allowing or inhibiting fluid communication between fluid passage C1 and respective ones of wheel cylinders W/C(FL), W/C(FR), W/C(RL) and W/C(RR).

Wheel cylinders W/C(FL), W/C(FR), W/C(RL) and W/C(RR) are hydraulically connected to fluid passage B1 through nodes I(FL), I(FR), I(RL) and I(RR), respectively. Outlet valves are provided in fluid passage B1 for selectively allowing or inhibiting fluid communication between reservoir RSV and respective ones of wheel cylinders W/C(FL), W/C(FR), W/C(RL) and W/C(RR). Outlet valves OUT/V(FL) and OUT/V(FR) are normally closed linear electromagnetic valves, and other outlet valves OUT/V(RL) and OUT/V(RR) are normally opened.

Two check valves C/V are provided on the discharge side of main and sub hydraulic pumps Main/P and Sub/P, respectively, for preventing the brake fluid from inversely flowing from fluid passage C1 to fluid passage B1. Relief valve Ref/V is hydraulically connected between fluid passages B1 and C1 for allowing the brake fluid to flow from fluid passage C1 to fluid passage B1 when the hydraulic pressure in fluid passage C1 is above a predetermined threshold pressure value.

First master cylinder pressure sensor MC/Sen1 is disposed in fluid passage A(FL) between shut-off valve S.OFF/V(FL) and master cylinder M/C. Similarly, second master cylinder pressure sensor MC/Sen2 is disposed in fluid passage A(FR) between shut-off valve S.OFF/V(FR) and master cylinder M/C. Wheel cylinder pressure sensors WC/Sen(FL), WC/Sen(FR), "WC/Sen(RL)" and "WC/Sen(RR)" are provided at wheel cylinders W/C(FL), W/C(FR), W/C(RL) and W/C(RR), respectively. Pump discharge pressure sensor P/Sen is disposed in fluid passage C1.

Control unit CU receives data signals indicative of first measured master cylinder pressure Pm1, second measured master cylinder pressure Pm2, wheel cylinder pressures Pfl, Pfr, "Prl" and "Prr", and stroke signal S.

On the basis of those data signals, control unit CU computes desired wheel cylinder pressures P*fl, P*fr, "P*rl" and "P*rr", and controls main and sub electric motors Main/M and Sub/M, inlet valves IN/V(FL), IN/V(FR), IN/V(RL) and IN/V(RR), and outlet valves OUT/V(FL), OUT/V(FR), OUT/V(RL) and OUT/V(RR). Under normal operating conditions, control unit CU keeps shut-off valves S.OFF/V(FL) and S.OFF/V(FR) closed and keeps cancel valve Can/V opened.

Control unit CU compares desired wheel cylinder pressures P*fl, P*fr, P*rl and P*rr with wheel cylinder pressures Pfl, Pfr, Prl and Prr, and when judging that at least one of wheel cylinder pressures Pfl, Pfr, Prl and Prr responses abnormally to a related one of desired wheel cylinder pressures P*fl, P*fr, P*rl and P*rr, then outputs a data signal indicative of abnormality to a warning lamp "WL". Control unit CU further receives a data signal indicative of a wheel speed "VSP", and judges whether or not the vehicle is stationary.

Under normal operating conditions, the brake control apparatus operates generally as follows. Control unit CU computes desired wheel cylinder pressures P*fl, P*fr, P*rl and P*rr of wheel cylinders W/C(FL), W/C(FR), W/C(RL) and W/C(RR) on the basis of the degree of depression of brake pedal BP detected by stroke sensor S/Sen, while opening the cancel valve Can/V and closing the shut-off valves S.OFF/V(FL) and S.OFF/V(FR). When it is desired to increase the hydraulic pressure in hydraulic unit HU, control unit CU drives electric motor M and sub electric motor Sub/M to allow main and sub hydraulic pumps Main/P and Sub/P to pressurize fluid passage C1. On the basis of the computed desired wheel cylinder pressures P*fl, P*fr, P*rl and P*rr, control unit CU controls inlet valves IN/V(FL), IN/V(FR), IN/V(RL) and IN/V(RR) so as to supply hydraulic pressures to wheel cylinders W/C(FL), W/C(FR), W/C(RL) and W/C(RR) for producing braking efforts.

When it is desired to reduce wheel cylinder pressures Pfl, Pfr, Prl and Prr, control unit CU controls outlet valves OUT/V(FL), OUT/V(FR), OUT/V(RL) and OUT/V(RR) so as to drain the brake fluid from wheel cylinders W/C(FL), W/C(FR), W/C(RL) and W/C(RR) through fluid passage B1 to reservoir RSV.

When it is desired to hold constant wheel cylinder pressures Pfl, Pfr, Prl and Prr, control unit CU closes inlet valves IN/V(FL), IN/V(FR), IN/V(RL) and IN/V(RR) and outlet valves OUT/V(FL), OUT/V(FR), OUT/V(RL) and OUT/V(RR) so as to inhibit fluid communication among wheel cylinders W/C(FL), W/C(FR), W/C(RL) and W/C(RR), and fluid passages C1 and B1. As in the first to fourth embodiments, at least one of the inlet valves is fully opened in the fifth embodiment.

While the brake control apparatus is operating in manual braking mode, control unit CU controls hydraulic unit HU by allowing the shut-off valves S.OFF/V(FL) and S.OFF/V(FR) to be normally open, and allowing the front left and right inlet valves IN/V(FL) and IN/V(FR) and front left and right outlet valves OUT/V(FL) and OUT/V(FR) to be normally closed, so as to supply master cylinder pressure Pm to front left and right wheel cylinders W/C(FL) and W/C(FR). This allows to control mechanically the braking efforts. With regard to rear left and right wheel cylinders W/C(RL) and W/C(RR), rear left and right wheel cylinder pressures Prl and Prr are set equal to about zero for preventing rear left and right wheel cylinders W/C(RL) and W/C(RR) from locking.

The brake control apparatus according to the fifth embodiment performs Step S30 in FIG. 3 in which the inlet valve control mode of each inlet valve is determined. Specifically, the brake control apparatus performs one of the process for selection of inlet valve control mode according to the first embodiment shown in FIG. 6 and the process for selection of inlet valve control mode according to the second embodiment shown in FIG. 16, and the process for selection of inlet valve control mode according to the fourth embodiment shown in FIG. 21.

Figure 24:
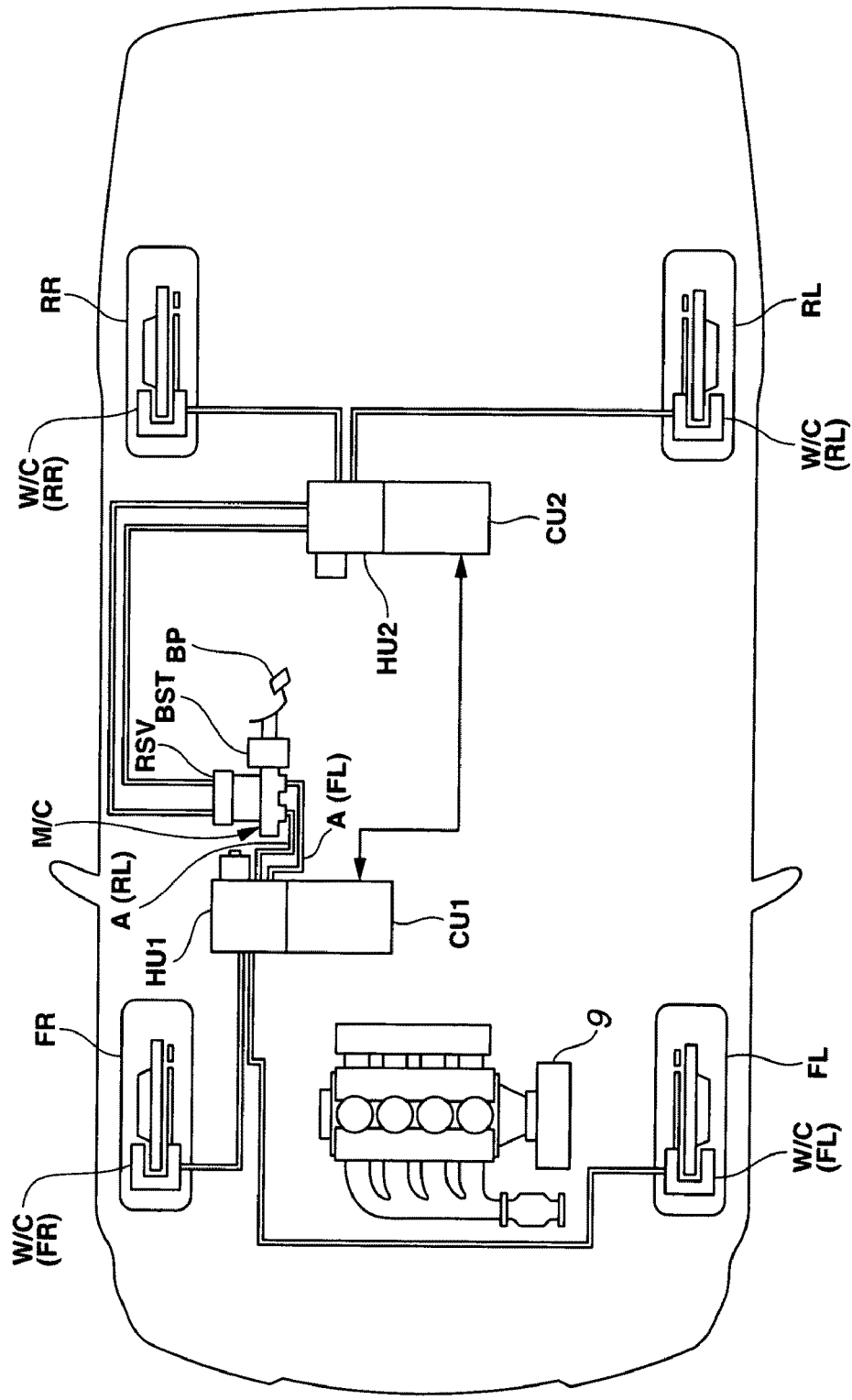
FIG. 24 is a system configuration diagram of a brake control apparatus according to a sixth embodiment of the present invention.
Figure 25:
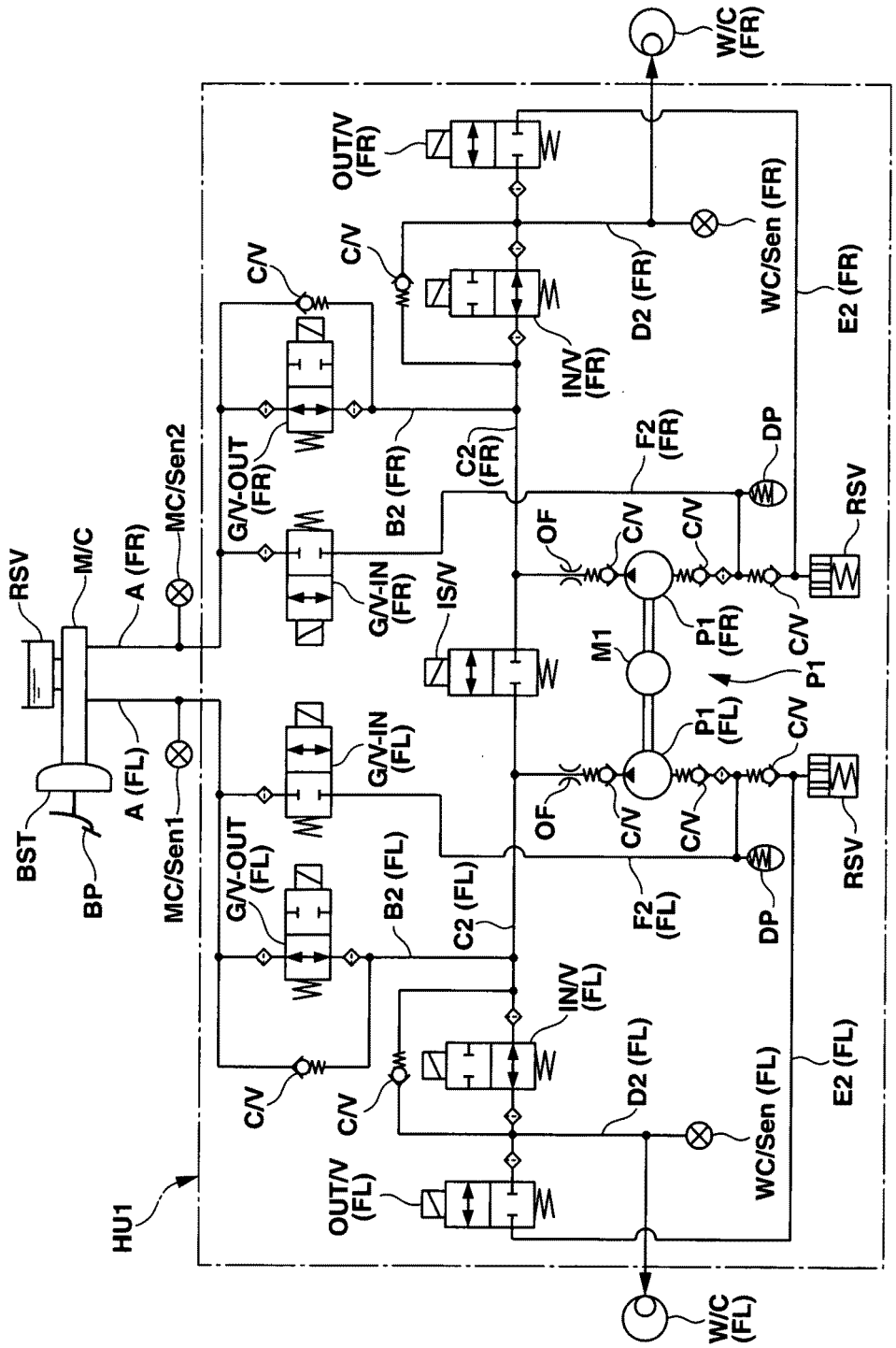
FIG. 25 is a hydraulic circuit diagram of a first hydraulic unit according to the sixth embodiment.
Figure 26:
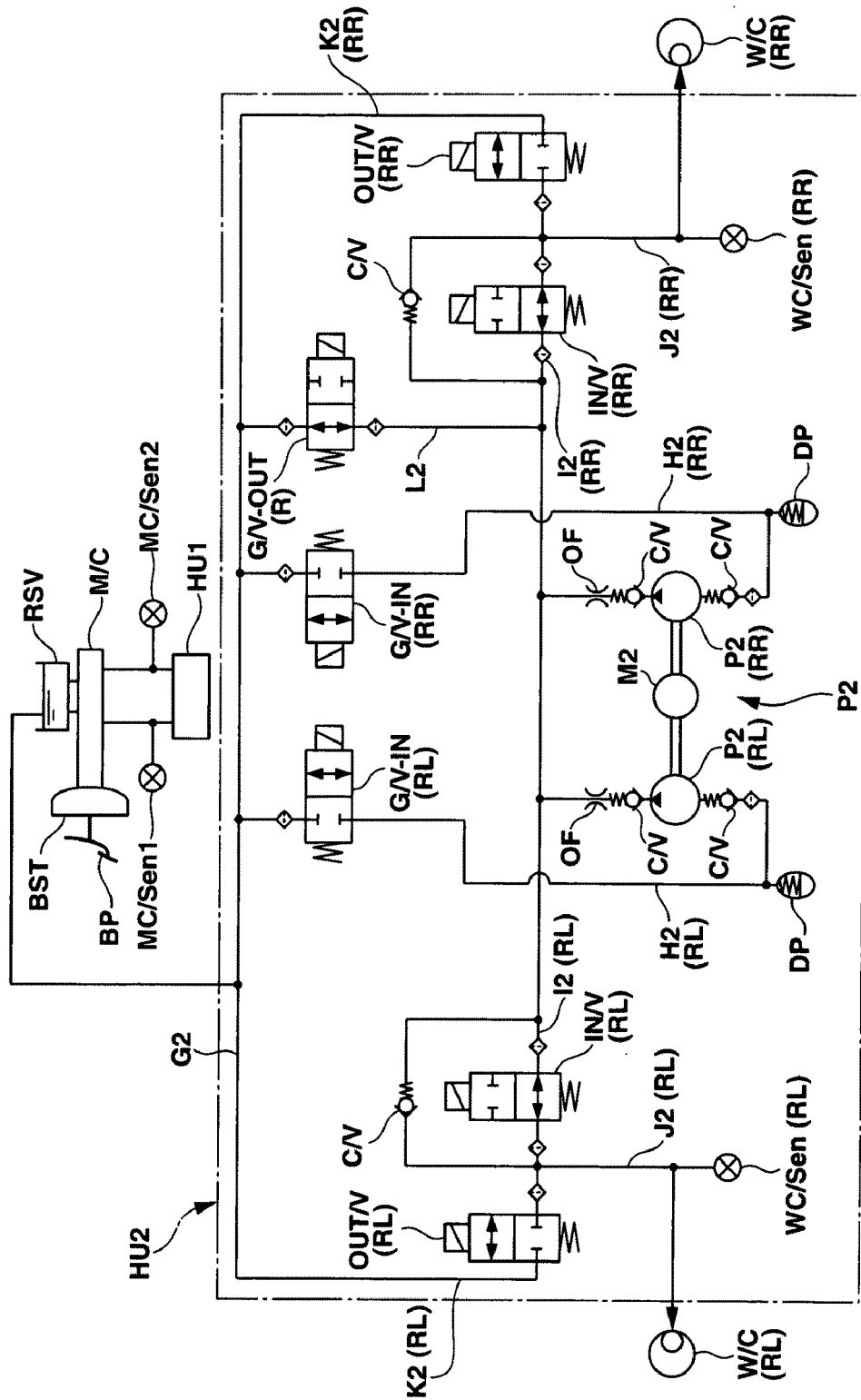
FIG. 26 is a hydraulic circuit diagram of a second hydraulic unit according to the sixth embodiment.

The following describes a brake control apparatus according to a sixth embodiment of the present invention with reference to FIGS. 24 to 26. Although hydraulic unit HU according to the fifth embodiment controls all the four wheels, the brake control apparatus according to the sixth embodiment includes a first hydraulic unit "HU1" for controlling the front wheels and a second hydraulic unit "HU2" for controlling the rear wheels.

According to the sixth embodiment, front left and right wheel cylinders W/C(FL) and W/C(FR) are normally pressurized by master cylinder pressure Pm (increased by a brake booster "BST"), and only as necessary, is pressurized by pump discharge pressures. The brake-by-wire system of the brake control apparatus includes only rear wheels.

As shown in FIG. 24, first and second hydraulic units HU1 and HU2 are controlled by first and second control units "CU1" and "CU2", respectively. First and second control units CU1 and CU2 communicate and cooperate with each other to perform a braking control.

Front left and right wheel cylinders W/C(FL) and W/C(FR) are hydraulically connected to master cylinder M/C through first hydraulic unit HU1, where first hydraulic unit HU1 controls front left and right wheel cylinder pressures Pfl and Pfr. Rear left and right wheel cylinders W/C(RL) and W/C(RR) are not hydraulically connected to master cylinder M/C, and are controlled by second hydraulic unit HU2.

The following describes first hydraulic unit HU1 with reference to FIG. 25. The force of depressing the brake pedal BP is boosted by brake booster BST so as to pressurize master cylinder M/C. Control valves and a first electric motor M1 in first hydraulic unit HU1 are controlled according to control signals outputted from first control unit CU1.

First and second master cylinder pressure sensors MC/Sen1 and MC/Sen2 measures first and second measured master cylinder pressures Pm1 and Pm2, respectively, and then outputs data signals indicative of first and second measured master cylinder pressures Pm1 and Pm2, respectively, to first control unit CU1. Front left and right wheel cylinder pressure sensors WC/Sen(FL) and WC/Sen(FR) measures front left and right wheel cylinder pressures Pfl and Pfr, respectively, and then outputs data signals indicative of front left and right wheel cylinder pressures Pfl and Pfr, respectively, to first control unit CU1.

Master cylinder M/C of a tandem type is hydraulically connected to front left and right wheel cylinders W/C(FL) and W/C(FR) through fluid passages A(FL), A(FR), "B2(FL)", "B2(FR)", "C2(FL)", "C2(FR)", "D2(FL)", "D2(FR)", "E2 (FL)" and "E2(FR)".

Outlet gate valves "G/V-OUT(FL)" and "G/V-OUT(FR)" are disposed in fluid passages B2(FL) and B2(FR), respectively. Front left and right inlet valves IN/V(FL) and IN/V(FR) are disposed in fluid passages D2(FL) and D2(FR), respectively. Outlet gate valves G/V-OUT(FL) and G/V-OUT(FR), and front left and right inlet valves IN/V(FL) and IN/V(FR) are normally open electromagnetic valves. When it is desired to increase front left wheel cylinder pressure Pfl under normal operating conditions, outlet gate valve G/V-OUT(FL) and front left inlet valve IN/V(FL) are controlled to be open for allowing fluid communication between master cylinder M/C and front left wheel cylinder W/C(FL). With regard to front right wheel cylinder pressure Pfr, outlet gate valve G/V-OUT(FR) and front right inlet valve IN/V(FR) are controlled similarly.

Fluid passages D2(FL) and D2(FR) are hydraulically connected to the suction port of a first hydraulic pump unit "P1" and reservoir RSV through fluid passages E2(FL) and E2(FR), respectively. Front left and right outlet valves OUT/V(FL) and OUT/V(FR), which are normally closed electromagnetic valves, are disposed in fluid passages E2(FL) and E2(FR), respectively. When opened, front left and right outlet valves OUT/V(FL) and OUT/V(FR) allow the brake fluid to flow from front left and right wheel cylinders W/C(FL) and W/C(FR), respectively, to the suction port of first hydraulic pump unit P1 and reservoir RSV.

Fluid passages A(FL) and A(FR) are hydraulically connected to the suction port of first hydraulic pump unit P1 through fluid passages F2(FL) and F2(FR), respectively. Inlet gate valves "G/V-IN(FL)" and "G/V-IN(FR)", which are normally closed electromagnetic valves, are disposed in fluid passages F2(FL) and F2(FR). When opened, inlet gate valves G/V-IN(FL) and G/V-IN(FR) allows the brake fluid to flow from master cylinder M/C to first hydraulic pump unit P1. A diaphragm "DP" is provided in each of fluid passages F2(FL) and F2(FR) for stabilizing the suction flow.

First hydraulic pump unit P1 includes a first hydraulic pump "P1(FL)" and a first hydraulic pump "P1(FR)" which are plunger pumps. First hydraulic pump unit P1 is driven by first electric motor M1. First hydraulic pump unit P1 includes discharge ports hydraulically connected to fluid passages C2(FL) and C2(FR) for pressurizing the fluid passages C2(FL) and C2(FR). Check valves C/V are disposed on both sides of each of first hydraulic pumps P1(FL) and P1(FR). Orifices "OF" are disposed on the discharge side of each of first hydraulic pumps P1(FL) and P1(FR) for reducing the level of fluctuations in the hydraulic pressures.

Fluid passages C2(FL) and C2(FR) are hydraulically connected to each other through an isolation valve "IS/V" which is a normally closed electromagnetic valve. When opened, isolation valve IS/V allows fluid communication between the discharge port of first hydraulic pump P1(FL) and the discharge port of first hydraulic pump P1(FR). When closed, isolation valve IS/V allows to supply the hydraulic pressures from first hydraulic pumps P1(FL) and P1(FR) to front left and right wheel cylinders W/C(FL) and W/C(FR) independently of each other.

Therefore, it is possible to supply a fluid pressure to one of front left and right wheel cylinders W/C(FL) and W/C(FR), even when one of a system related to front left wheel cylinder W/C(FL) and a system related to front right wheel cylinder W/C(FR) is failed.

Check valves C/V are disposed in parallel to outlet gate valves G/V-OUT(FL) and G/V-OUT(FR) and front left and right inlet valves IN/V(FL) and IN/V(FR) for preventing the brake fluid from inversely flowing from front left and right wheel cylinders W/C(FL) and W/C(FR) to master cylinder M/C.

When it is desired to increase the wheel cylinder pressures under normal operating conditions, control unit CU1 opens outlet gate valves G/V-OUT(FL) and G/V-OUT(FR) and front left and right inlet valves IN/V(FL) and IN/V(FR), and closes the other valves, so as to allow master cylinder pressure Pm, which are boosted by brake booster BST, to flow from master cylinder M/C to front left and right wheel cylinders W/C(FL) and W/C(FR).

When it is desired to further increase the wheel cylinder pressures by the pump discharge pressures, control unit CU1 opens inlet gate valves G/V-IN(FL) and G/V-IN(FR) and front left and right inlet valves IN/V(FL) and IN/V(FR), closes the other valves, and drives first electric motor M1. The brake fluid supplied from master cylinder M/C flows through fluid passages F2(FL) and F2(FR), enters first hydraulic pumps P1(FL) and P1(FR). Then, first hydraulic pumps P1(FL) and P1(FR) supply the discharge pressures to front left and right wheel cylinders W/C(FL) and W/C(FR).

When it is desired to hold the wheel cylinder pressures constant, control unit CU1 closes front left and right inlet valves IN/V(FL) and IN/V(FR) and front left and right outlet valves OUT/V(FL) and OUT/V(FR), so as to hold constant front left and right wheel cylinder pressures Pfl and Pfr. As in the first to fifth embodiments, at least one of the inlet valves is fully opened in the sixth embodiment.

When it is desired to reduce the wheel cylinder pressures, control unit CU1 opens front left and right outlet valves OUT/V(FL) and OUT/V(FR) so as to allow the brake fluid to flow from front left and right wheel cylinders W/C(FL) and W/C(FR) through fluid passages E2(FL) and E2(FR) to reservoir RSV. The brake fluid flows from reservoir RSV through first hydraulic pumps P1(FL) and P1(FR), fluid passages B2(FL) and B2(FR), and outlet gate valves G/V-OUT (FL) and G/V-OUT(FR) to master cylinder M/C.

The following describes second hydraulic unit HU2 with reference to FIG. 26. Second hydraulic unit HU2 is hydraulically independent from master cylinder M/C, and serves for the brake-by-wire system for rear left and right wheels RL and RR.

Control valves and a second electric motor "M2" in second hydraulic unit HU2 are controlled according to control signals outputted from second control unit CU2. A second hydraulic pump unit "P2" is constructed similarly as first hydraulic pump unit P1. Second hydraulic pump unit P2 includes a second hydraulic pump "P2(RL)" and a second hydraulic pump "P2(RR)" which are plunger pumps. Second hydraulic pump unit P2 is driven by second electric motor M2. Check valves C/V are disposed on both sides of each of second hydraulic pumps P2(RL) and P2(RR). Orifices OF are disposed on the discharge side of each of second hydraulic pumps P2(RL) and P2(RR) for reducing the level of fluctuations in the hydraulic pressure.

Reservoir RSV is hydraulically connected to fluid passage "G2". Fluid passage G2 is hydraulically connected through fluid passage "H2(RL)" and "H2(RR)" to the suction ports of second hydraulic pump unit P2. Inlet gate valves "G/V-IN(RL)" and "G/V-IN(RR)", which are normally closed electromagnetic valves, are disposed in fluid passages "H2(RL)" and "H2(RR)", respectively. When opened, inlet gate valves G/V-IN(RL) and G/V-IN(RR) allows fluid communication between the suction ports of second hydraulic pump unit P2 and reservoir RSV. A diaphragm DP is provided in each of fluid passages H2(FL) and H2(FR) for stabilizing the suction flow.

Second hydraulic pump unit P2 includes discharge ports hydraulically connected to fluid passages "I2(RL)" and "I2(RR)", respectively. Fluid passages I2(RL) and I2(RR) are hydraulically connected through fluid passages "J2(RL)" and "J2(RR)" to rear left and right wheel cylinders W/C(RL) and W/C(RR), respectively. Rear left and right inlet valves IN/V(RL) and IN/V(RR), which are normally open electromagnetic valves, are disposed in fluid passages I2(RL) and I2(RR), respectively.

When opened, rear left and right inlet valves IN/V(RL) and IN/V(RR) allow fluid communication between the discharge side of second hydraulic pump unit P2 and rear left and right wheel cylinders W/C(RL) and W/C(RR), respectively. Check valves C/V are disposed in parallel to rear left and right inlet valves IN/V(RL) and IN/V(RR).

Fluid passages I2(RL) and J2(RL) are hydraulically connected through a fluid passage "K2(RL)" to fluid passage G2. Similarly, fluid passages I2(RR) and J2(RR) are hydraulically connected through a fluid passage "K2(RR)" to fluid passage G2. Rear left and right outlet valves OUT/V(RL) and OUT/V(RR), which are normally closed electromagnetic valves, are disposed in fluid passages K2(RL) and K2(RR), respectively. When opened, rear left and right outlet valves OUT/V(RL) and OUT/V(RR) allows fluid communication between fluid passage G2 and rear left and right wheel cylinders W/C(RL) and W/C(RR), respectively. An outlet gate valve "G/V-OUT(R)", which is a normally open electromagnetic valve, is disposed in a fluid passages "L2" hydraulically connected between fluid passages G2 and I2(RR).

When it is desired to increase the wheel cylinder pressures under normal operating conditions, control unit CU2 drives second hydraulic pump unit P2 for pressures increase, because second hydraulic unit HU2 employs no master cylinder pressure Pm. Control unit CU2 opens inlet gate valves G/V-IN(RL) and G/V-IN(RR) and rear left and right inlet valves IN/V(RL) and IN/V(RR), closes the other valves, and drives second hydraulic pump unit P2, so that the brake fluid flows from reservoir RSV through fluid passages G2 and H2(RL) and H2(RR) to second hydraulic pump unit P2. The pump discharge pressure is supplied through fluid passages I2(RL) and I2(RR) and fluid passages J2(RL) and J2(RR) to rear left and right wheel cylinders W/C(RL) and W/C(RR).

When it is desired to hold the wheel cylinder pressures constant, control unit CU2 closes rear left and right inlet valves IN/V(RL) and IN/V(RR) and rear left and right outlet valves OUT/V(RL) and OUT/V(RR), so as to hold constant rear left and right wheel cylinder pressures Prl and Prr. As in the first to sixth embodiments, at least one of the inlet valves is fully opened in the seventh embodiment.

When it is desired to reduce the wheel cylinder pressures, control unit CU2 opens rear left and right outlet valves OUT/V(RL) and OUT/V(RR) so as to allow the brake fluid to flow from rear left and right wheel cylinders W/C(RL) and W/C(RR) through fluid passages K2(RL) and K2(RR) and fluid passage G2 to reservoir RSV.

The brake control apparatus according to the sixth embodiment performs Step S30 in FIG. 3 in which the inlet valve control mode of each inlet valve is determined. Specifically, for the front wheel system in which front left and right wheel cylinders W/C(FL) and W/C(FR) are isolated from each other by isolation valve IS/V in first hydraulic unit HU1, the brake control apparatus performs one of the process for selection of inlet valve control mode according to the first embodiment shown in FIG. 6, the process for selection of inlet valve control mode according to the second embodiment shown in FIG. 16, and the process for selection of inlet valve control mode according to the third embodiment shown in FIG. 18. For the rear wheel system in which rear left and right wheel cylinders W/C(RL) and W/C(RR) are not isolated from each other in second hydraulic unit HU2, the brake control apparatus performs one of the process for selection of inlet valve control mode according to the first embodiment shown in FIG. 6, and the process for selection of inlet valve control mode according to the second embodiment shown in FIG. 16.

Figure 27:
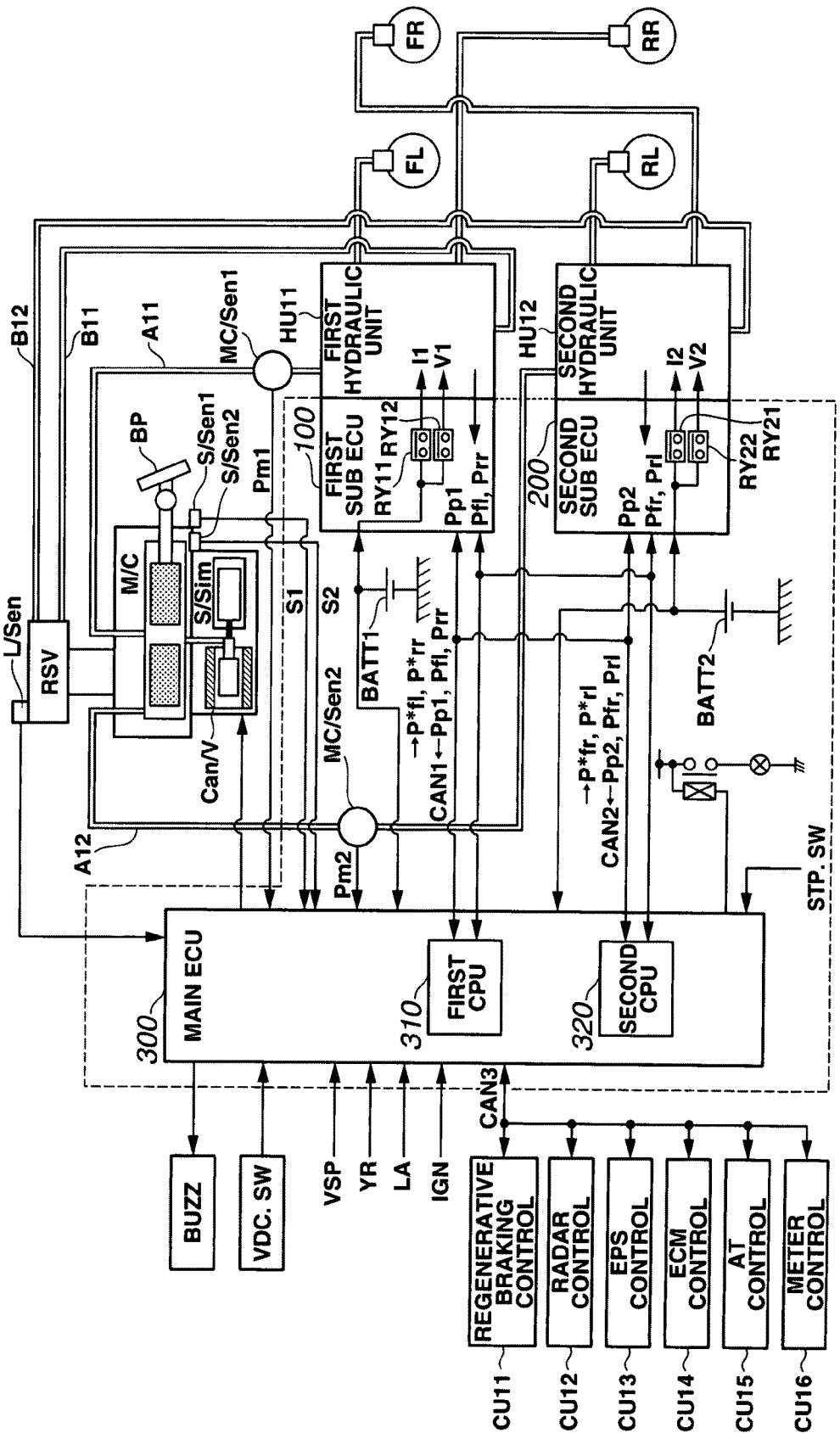
FIG. 27 is a system configuration diagram of a brake control apparatus according to a seventh embodiment of the present invention.
Figure 28:
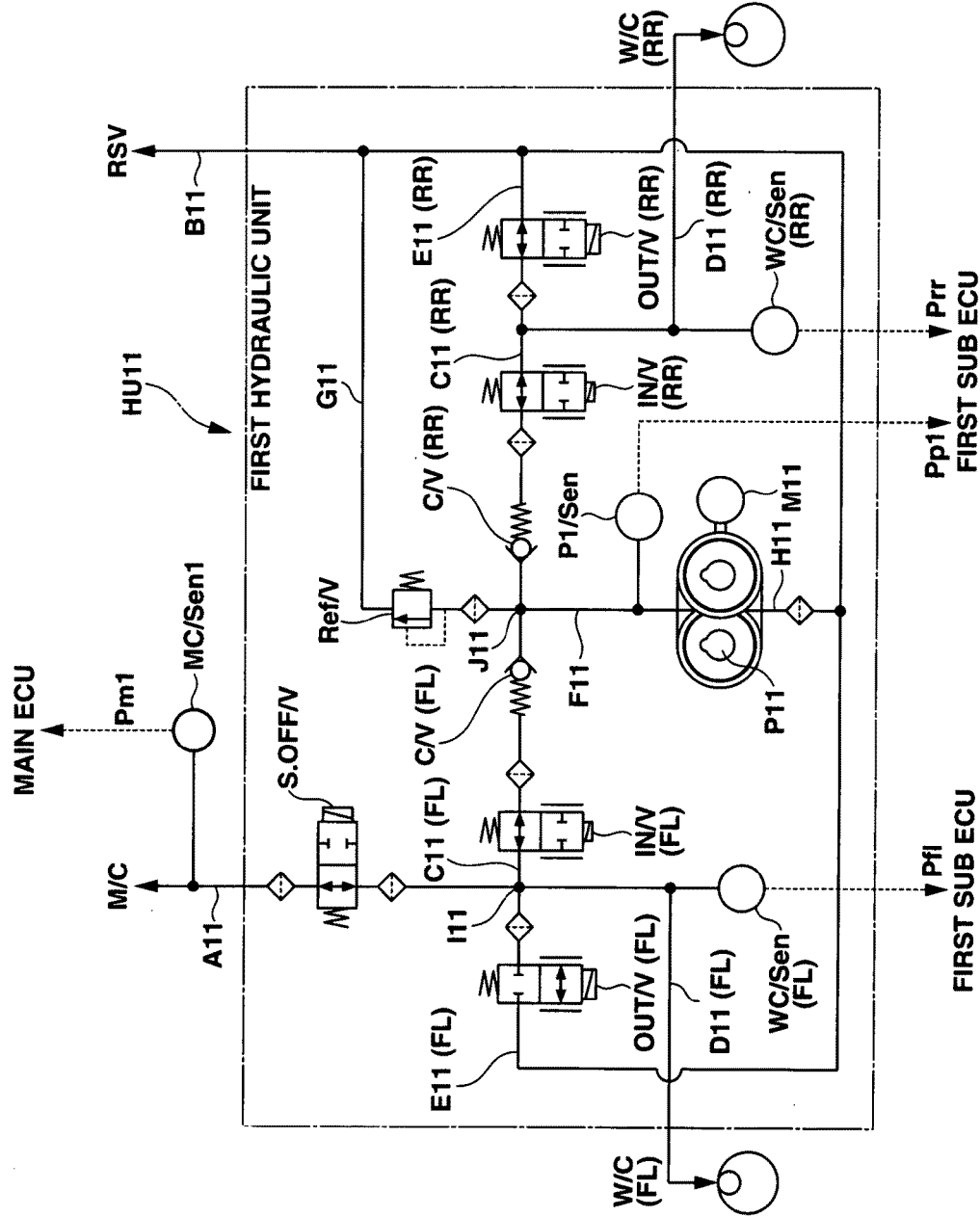
FIG. 28 is a hydraulic circuit diagram of a first hydraulic unit according to the seventh embodiment.
Figure 29:
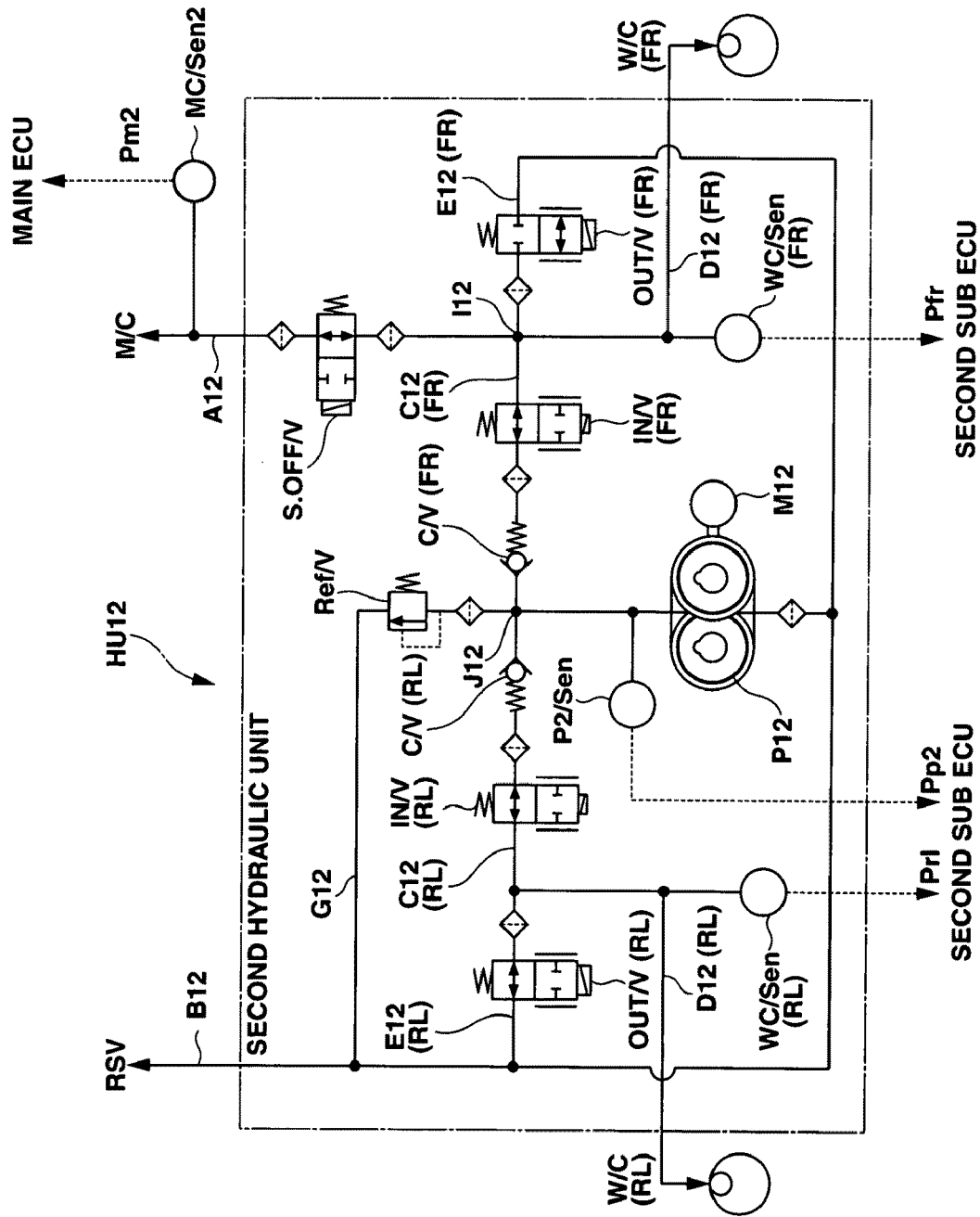
FIG. 29 is a hydraulic circuit diagram of a second hydraulic unit according to the seventh embodiment.

The following describes a brake control apparatus according to a seventh embodiment of the present invention with reference to FIGS. 27 to 29. Although first and second hydraulic units HU1 and HU2 according to the sixth embodiment control a set of front left and right wheels FL and FR and a set of rear left and right wheels RL and RR, respectively, first and second hydraulic units "HU11" and "HU12" according to the seventh embodiment control a set of front left and rear right wheels FL and RR and a set of front right and rear left wheels FR and RL, respectively. That is, the brake control apparatus is based on so-called X-pipe arrangement.

Under normal operating conditions, the brake control apparatus according to the seventh embodiment pressurizes all the four wheel cylinders by pump discharge pressures. Under abnormal operating conditions, the brake control apparatus supplies master cylinder pressure Pm to front left and right wheels FL and FR.

The following describes system configuration of the brake control apparatus according to the seventh embodiment with reference to FIG. 27. First and second hydraulic units HU11 and HU12 are driven by first and second sub ECUs 100 and 200 in accordance with control commands outputted from main ECU 300. Stroke simulator S/Sim, which is hydraulically connected to master cylinder M/C, applies a feedback force to brake pedal BP.

First and second hydraulic units HU11 and HU12 are hydraulically connected to master cylinder M/C through fluid passages "A11" and "A12", respectively, and hydraulically connected to reservoir RSV through fluid passages "B11" and "B12", respectively. First and second master cylinder pressure sensors MC/Sen1 and MC/Sen2 are provided in fluid passages A11 and A12, respectively.

Each of first and second hydraulic units HU11 and HU12 is a hydraulic actuator for generating fluid pressures independently of each other, including a hydraulic pump "P11", "P12", an electric motor "M11", "M12", and electromagnetic valves. First hydraulic unit HU11 performs a fluid pressure control for front left and rear right wheels FL and RR, while second hydraulic unit HU12 performs a fluid pressure control for front right and rear left wheels FR and RL.

Specifically, hydraulic pumps P11 and P12, as two hydraulic sources, directly pressurize wheel cylinders W/C(FL) to W/C(RR). Since wheel cylinders W/C(FL) to W/C(RR) are pressurized directly by hydraulic pumps P11 and P12 with no accumulator, there is no possibility that a gas in such an accumulator leaks into a fluid passage under a failed condition. Hydraulic pump P11 serves for pressure increase for front left and rear right wheels FL and RR, and hydraulic pump P12 serves for pressure increase for front right and rear left wheels FR and RL, constituting so called an X-pipe arrangement.

First and second hydraulic units HU11 and HU12 are provided separately from each other. The separate provision allows one hydraulic unit to generate a braking effort, even when the other hydraulic unit is subject to leaking. However, first and second hydraulic units HU11 and HU12 are not so limited, but may be provided as a unit so as to collect electric circuit configurations at one place, shorten harnesses, etc., and thus simplify the layout.

A small number of hydraulic sources are desired for the compactness of the brake control apparatus. However, in the case of a single hydraulic source, there is no backup when the hydraulic source is failed. On the other hand, in the case of four hydraulic sources for respective wheels, it is advantageous against failures, but the device is large-sized, and difficult to control. A brake-by-wire control requires a redundant system. Such a system may diverge with an increase in the number of hydraulic sources.

Currently, brake fluid passages of vehicles are generally in the form of X-pipe arrangement in which a pair of diagonally opposite wheels (FL-RR or FR-RL) are connected to each other through a fluid passage, and each system is pressurized by a separate hydraulic source (tandem-type master cylinder, etc.). Thus, even when one pair of diagonally opposite wheels are failed, the other pair of diagonally opposite wheels can generate a braking effort while preventing the braking effort from leaning to one of the left and right sides. Therefore, the number of hydraulic sources is assumed to be two in general.

Naturally, in the case of a single hydraulic source, no X-pipe arrangement is possible. Also, in the case of three or four hydraulic sources, each pair of diagonally opposite wheels are not connected by a single hydraulic source, no X-pipe arrangement is possible.

Therefore, in order to improve anti-fail performance while employing widely-used X-pipe arrangement with no modification, the brake control apparatus according to the seventh embodiment includes two hydraulic units HU11 and HU12 having hydraulic pumps P11 and P12 as hydraulic sources.

When a vehicle is under braking, it is difficult to depend largely on the braking effort of rear wheels, because a larger load is applied to front wheels. A large braking effort of rear wheels may cause a spin. Accordingly, in general, braking effort is distributed relatively largely to front wheels, for example, 2 part to front wheels and 1 part to rear wheels.

When a plurality of hydraulic systems are provided in a vehicle in order to enhance anti-fail performance, it is desired that the hydraulic systems have identical specifications in view of manufacturing cost. In case four hydraulic systems are provided to four wheels, respectively, two sets of hydraulic systems having different specifications are necessary in consideration of front-rear braking effort distribution as described above. This increases the total manufacturing cost. This is true for cases where three hydraulic systems are provided in a vehicle.

According to the seventh embodiment, first and second hydraulic units HU11 and HU12 in X-pipe arrangement are each configured to supply 2 part to front wheels and 1 part to rear wheels. The ratio of distribution is set by adjusting valve openings in each of first and second hydraulic units HU11 and HU12. First and second hydraulic units HU11 and HU12 are identical to each other. This is effective for reduction in manufacturing cost.

Main ECU 300 is a high-level CPU for computing desired wheel cylinder pressures P*fl to P*rr which are to be generated by first and second hydraulic units HU11 and HU12. Main ECU 300 is electrically connected to first and second power supplies "BATT1" and "BATT2" so that main ECU 300 is capable of operating when at least one of BATT1 and BATT2 is normal. Main ECU 300 is started in response to an ignition signal "IGN" or in response to a start request from other control units "CU11", "CU12", "CU13", "CU14", "CU15" and "CU16".

First and second stroke sensors S/Sen1 and S/Sen2 outputs stroke signals S1 and S2 to main ECU 300. First and second master cylinder pressure sensors MC/Sen1 and MC/Sen2 outputs data signals indicative of master cylinder pressures Pm1 and Pm2 to main ECU 300.

Main ECU 300 receives data signals indicative of wheel speed VSP, a yaw rate YR and a vehicle longitudinal acceleration LA. Moreover, main ECU 300 receives a data signal from a fluid amount sensor L/Sen provided in reservoir RSV. Main ECU 300 judges whether or not it is possible to perform a brake-by-wire control based on hydraulic pump drive. Operation of brake pedal BP is detected based on a signal from a stop lamp switch "STP.SW", not based on stroke signals S1 and S2 and first and second measured master cylinder pressures Pm1 and Pm2.

Main ECU 300 includes first and second CPUs 310 and 320. First and second CPUs 310 and 320 are respectively electrically connected to first and second sub ECUs 100 and 200 through CAN communication lines CAN1 and CAN2. First and second sub ECUs 100 and 200 output data signals indicative of hydraulic pump discharge pressures Pp1 and Pp2, and actual wheel cylinder pressures Pfl to Prr, to first and second CPUs 310 and 320. CAN communication lines CAN1 and CAN2 are electrically connected to each other for bidirectional communication, and are each in the form of a redundant system for backup.

On the basis of the inputted stroke signals S1 and S2, first and second measured master cylinder pressures Pm1 and Pm2, and actual wheel cylinder pressures Pfl to Prr, first and second CPUs 310 and 320 compute desired wheel cylinder pressures P*fl to P*rr, and then output them to sub ECUs 100 and 200 through CAN communication lines CAN1 and CAN2.

Alternatively, desired wheel cylinder pressures P*fl to P*rr for first and second hydraulic units HU11 and HU12 may be computed only by first CPU 310, while second CPU 320 may serve as a backup for first CPU 310.

Main ECU 300 starts sub ECUs 100 and 200 by issuing respective starting signals to first and second sub ECUs 100 and 200 through CAN communication lines CAN1 and CAN2. Main ECU 300 may be configured to issue a single starting signal to first and second sub ECUs 100 and 200 so that both of first and second sub ECUs 100 and 200 start up. First and second sub ECUs 100 and 200 may be started by an ignition switch.

During vehicle behavior controls such as ABS (control of increase and reduction in braking effort for preventing vehicle wheels from locking up), VDC (control of increase and reduction in braking effort for preventing side slips under disturbance of vehicle behavior), and TCS (control of preventing driving wheels from slipping), main ECU 300 computes desired wheel cylinder pressures P*fl to P*rr also on the basis of wheel speed VSP, yaw rate YR and vehicle longitudinal acceleration LA. During the VDC control, a buzzer "BUZZ" warns a driver. A driver can operate a VDC switch "VDC.SW" to turn on or off the VDC control.

Main ECU 300 is electrically connected to other control units CU11, CU12, CU13, CU14, CU15 and CU16 through CAN communication line CAN3 so that main ECU 300 performs a cooperative control. Regenerative braking control unit CU11 regenerates braking effort into electric energy. Radar control unit CU12 controls vehicle-to-vehicle distance. EPS control unit CU13 is a control unit of an electric power steering system.

ECM control unit CU14 is a control unit of an engine. AT control unit CU15 is a control unit of an automatic transmission. Meter control unit CU16 controls meters. Main ECU 300 relays a data signal indicative of wheel speed VSP through CAN communication line CAN3 to ECM control unit CU14, AT control unit CU15 and meter control unit CU16.

ECUs 100, 200 and 300 receive electric power from first and second power supplies BATT1 and BATT2. First power supply BATT1 is electrically connected to main ECU 300 and first sub ECU 100. Second power supply BATT2 is electrically connected to main ECU 300 and second sub ECU 200.

First and second sub ECUs 100 and 200 are formed integrally with first and second hydraulic units HU11 and HU12, respectively. Alternatively, first and second sub ECUs 100 and 200 may be formed separately from first and second hydraulic units HU11 and HU12, respectively, in order to conform to the layout of the vehicle.

First and second sub ECUs 100 and 200 receive data signals indicative of desired wheel cylinder pressures P*fl to P*rr from main ECU 300, and receive data signals indicative of hydraulic pump discharge pressures Pp1 and Pp2 of first and second hydraulic pumps P11 and P12 and actual wheel cylinder pressures Pfl and Prr, and Pfr and Prl from first and second hydraulic units HU11 and HU12.

First and second sub ECUs 100 and 200 perform fluid pressure control by operating hydraulic pumps P11 and P12, electric motors M11 and M12, and the electromagnetic valves in first and second hydraulic units HU11 and HU12, based on the inputted pump discharge pressures Pp1 and Pp2 and actual wheel cylinder pressures Pfl to Prr, in order to attain desired wheel cylinder pressures P*fl to P*rr. First and second pump discharge pressures Pp1 and Pp2 may be estimated by front left and right wheel cylinder pressure sensors WC/Sen (FL) and WC/Sen(FR) as described in the preceding embodiments.

Until the current values of desired wheel cylinder pressures P*fl to P*rr are replaced by new values of desired wheel cylinder pressures P*fl to P*rr, first and second sub ECUs 100 and 200 perform a servo control of converging wheel cylinder pressures Pfl, Pfr, Prl and Prr to the current values of desired wheel cylinder pressures P*fl, P*fr, P*rl and P*rr.

First and second sub ECUs 100 and 200 convert the electric power supplied from power supplies BATT1 and BATT2 into valve drive currents I1 and I2 and motor drive currents Im1 and Im2 for first and second hydraulic units HU11 and HU12, and then outputs them to first and second hydraulic units HU11 and HU12 through relays RY11 and RY12, and relays RY21 and RY22, respectively.

Main ECU 300 according to the seventh embodiment computes desired wheel cylinder pressures P*fl, P*fr, P*rl and P*rr, but does not control first and second hydraulic units HU1 and HU2. However, it is considered that main ECU 300 is configured to compute desired wheel cylinder pressures P*fl, P*fr, P*rl and P*rr, and directly control first and second hydraulic units HU1 and HU2. In such a case, main ECU 300 cooperates with the other control units CU11, CU12, CU13, CU14, CU15 and CU16 through CAN communication line CAN3 to output drive commands to first and second hydraulic units HU11 and HU12. Thus, main ECU 300 outputs drive commands to first and second hydraulic units HU11 and HU12 after completion of signal communication through CAN communication line CAN3 and computation in control units CU11, CU12, CU13, CU14, CU15 and CU16. Therefore, if signal communication through CAN communication line CAN3 and computation in control units CU11, CU12, CU13, CU14, CU15 and CU16 take much time, the braking control is subject to delays. Increase in communication speed of CAN communication line CAN3 tends to increase the cost thereof, and to affect adversely the anti-fail performance against noise.

For the reasons described above, main ECU 300 according to the seventh embodiment serves only to compute desired wheel cylinder pressures P*fl to P*rr for first and second hydraulic units HU11 and HU12, while the drive control of first and second hydraulic units HU11 and HU12 are performed by first and second sub ECUs 100 and 200 having the servo control system. Thus, first and second sub ECUs 100 and 200 handle the control of first and second hydraulic units HU11 and HU12, while main ECU 300 handles cooperative control between control units CU11, CU12, CU13, CU14, CU15 and CU16. This is effective for bring operation of first and second hydraulic units HU11 and HU12 under no influence of speed of signal communication through CAN communication line CAN3 and computation in control units CU11, CU12, CU13, CU14, CU15 and CU16.

According to the foregoing configuration in which main ECU 300 cooperates with first and second sub ECUs 100 and 200, even when there are added various units such as a regeneration cooperative brake system, a vehicle integrated control, and an ITS, which are in general necessary for hybrid vehicles and fuel cell vehicles, the brake control system is controlled independently of other controls systems so as to ensure the responsiveness of the brake control in conformance with these units. The foregoing configuration in which main ECU 300 cooperates with first and second sub ECUs 100 and 200 is advantageous, especially because such a brake-by-wire system as described in the present embodiments requires an elaborate control based on the amount of operation of a brake pedal during normal braking that is frequently employed.

Stroke simulator S/Sim is mounted in master cylinder M/C for generating a feedback force to brake pedal BP. Master cylinder M/C includes cancel valve Can/V for selectively allowing or inhibiting fluid communication between master cylinder M/C and stroke simulator S/Sim. Cancel valve Can/V is opened or closed by main ECU 300. When the brake-by-wire system is terminated, or when sub ECUs 100 and 200 are failed, then cancel valve Can/V is quickly closed so that the brake control apparatus enters manual braking mode. Master cylinder M/C includes first and second stroke sensors S/Sen1 and S/Sen2 for measuring the stroke of brake pedal BP, and outputting stroke signals S1 and S2 to main ECU 300.

The following describes first and second hydraulic units HU11 and HU12 in detail with reference to FIGS. 28 and 29. First hydraulic unit HU11 includes a shut-off valve "S.OFF/ V", front left and rear right inlet valves IN/V(FL) and IN/V (RR) and front left and rear right outlet valves OUT/V(FL) and OUT/V(RR), hydraulic pump P11, and electric motor M11.

Hydraulic pump P11 includes a discharge port hydraulically connected through fluid passages "C11(FL)" and "C11 (RR)" to front left and rear right wheel cylinders W/C(FL) and W/C(RR), and a suction port hydraulically connected through fluid passage B11 to reservoir RSV. Fluid passages C11(FL) and C11(RR) are hydraulically connected to fluid passage B11 through fluid passages "E11(FL)" and "E11 (RR)", respectively.

A node "I11" between fluid passages C11(FL) and E11 (FL) is hydraulically connected to master cylinder M/C through fluid passage A11. A node "J11" between fluid passages C11(FL) and C11(RR) is hydraulically connected to fluid passage B11 through a fluid passage "G11".

Shut-off valve S.OFF/V, which is a normally open electromagnetic valve, is disposed in fluid passage A11 for selectively allowing or inhibiting fluid communication between master cylinder M/C and node I11.

Front left and rear right inlet valves IN/V(FL) and IN/V (RR) are normally open linear electromagnetic valves disposed in fluid passages C11(FL) and C11(RR), respectively, for continuously regulating the hydraulic pressures supplied from hydraulic pump P11, and supplying the regulated hydraulic pressures to front left and rear right wheel cylinders W/C(FL) and W/C(RR). Check valves C/V(FL) and "C/V (RR)" are provided in fluid passages C11(FL) and C11(RR) for preventing the brake fluid from inversely flowing to hydraulic pump P11.

Front left and rear right outlet valves OUT/V(FL) and OUT/V(RR) are provided in fluid passages E11(FL) and E11 (RR), respectively. Front left outlet valve OUT/V(FL) is a normally closed linear electromagnetic valve, while rear right outlet valve OUT/V(RR) is a normally open linear electromagnetic valve. Relief valve Ref/V is provided in fluid passage G11.

First master cylinder pressure sensor MC/Sen1 is provided in fluid passage A11 between first hydraulic unit HU11 and master cylinder M/C, for outputting a data signal indicative of first measured master cylinder pressure Pm1 to main ECU 300. In first hydraulic unit HU11, front left and rear right wheel cylinder pressure sensors WC/Sen(FL) and WC/Sen (RR) are provided in fluid passages C11(FL) and C11(RR), respectively, for measuring the internal pressures of wheel cylinders W/C(FL) and W/C(RR), and outputting data signals indicative of measured front left and rear right wheel cylinder pressures Pfl and Prr, respectively, to first sub ECU 100. A first pump discharge pressure "P1/Sen" is provided on the discharge side of first hydraulic pump P11, for outputting a data signal indicative of measured first pump discharge pressure Pp1 to first sub ECU 100.

When it is desired to increase the wheel cylinder pressures under normal operating conditions, then first sub ECU 100 closes shut-off valve S.OFF/V, opens front left and rear right inlet valves IN/V(FL) and IN/V(RR), closes front left and rear right outlet valves OUT/V(FL) and OUT/V(RR), and drives first motor M11. Accordingly, first motor M11 drives first hydraulic pump P11 so as to supply a discharge pressure to fluid passages C11(FL) and C11(RR), and front left and rear right inlet valves IN/V(FL) and IN/V(RR) control the fluid pressures and supply them to front left and rear right wheel cylinders W/C(FL) and W/C(RR), so as to increase the wheel cylinder pressures.

When it is desired to reduce the wheel cylinder pressures under normal operating conditions, then first sub ECU 100 closes inlet valves IN/V(FL) and IN/V(RR), and opens outlet valves OUT/V(FL) and OUT/V(RR), for draining the brake fluid from front left and rear right wheel cylinders W/C(FL) and W/C(RR) to reservoir RSV, so as to reduce the wheel cylinder pressures. However, as in the preceding embodiments, at least one of the inlet valves is fully opened in the seventh embodiment.

When it is desired to hold constant the wheel cylinder pressures under normal operating conditions, then first sub ECU 100 closes all of front left and rear right inlet valves IN/V(FL) and IN/V(RR) and front left and rear right outlet valves OUT/V(FL) and OUT/V(RR) so as to hold constant the wheel cylinder pressures. However, as in the preceding embodiments, at least one of the inlet valves is fully opened in the seventh embodiment.

When the brake control apparatus is operating in manual braking mode, for example, when the brake-by-wire system is failed, then shut-off valve S.OFF/V is opened, and front left and rear right inlet valves IN/V(FL) and IN/V(RR) are opened. Because of check valve F/V(FL), master cylinder pressure Pm is not supplied to rear right wheel cylinder W/C (RR). On the other hand, front left outlet valve OUT/V(FL) is de-energized to be closed so that master cylinder pressure Pm is applied to front left wheel cylinder W/C(FL). Thus, master cylinder pressure Pm, which is increased by a driver's pedal depressing force, is applied to front left wheel cylinder W/C (FL), allowing manual braking.

It is alternatively considered that manual braking is applied to rear right wheel RR. In such a case, the load to depression of the driver is relatively large, because the wheel cylinder pressure of both of front left and rear right wheels FL and RR are implemented by the pedal depressing force. Accordingly, first hydraulic unit HU11 according to the seventh embodiment applies manual braking only to front left wheel FL, because front left wheel FL is subject to a larger load from a road, and thereby capable of generating a larger braking effort. On the other hand, rear right outlet valve OUT/V(RR) is implemented by a normally open valve so that when the brake-by-wire system is failed, rear right outlet valve OUT/ V(RR) quickly drains the remaining hydraulic pressure of rear right wheel cylinder W/C(RR) so as to prevent rear right wheel RR from locking up.

Second hydraulic unit HU12 has the same circuit configuration and performs the same control as first hydraulic unit HU11. In second hydraulic unit HU12, front right outlet valve OUT/V(FR) is implemented by a normally closed valve, and rear left outlet valve OUT/V(RL) is implemented by a normally open valve, so that manual braking is applied only to front right wheel FR when the brake-by-wire system is failed.

The brake control apparatus according to the seventh embodiment performs Step S30 in FIG. 3 in which the inlet valve control mode of each inlet valve is determined. Specifically, for each of first and second hydraulic units HU11 and HU12, the brake control apparatus performs one of the process for selection of inlet valve control mode according to the first embodiment shown in FIG. 6, the process for selection of inlet valve control mode according to the second embodiment shown in FIG. 16, and the process for selection of inlet valve control mode according to the third embodiment shown in FIG. 18.

If first and second hydraulic units HU11 and HU12 are provided separately from each other, one of first and second hydraulic units HU11 and HU12 is available for producing braking efforts even when the other of first and second hydraulic units HU11 and HU12 are failed. Conversely, if first and second hydraulic units HU11 and HU12 are provided as a unit, it is possible to collect electric circuit configurations at one place, shorten harnesses, etc., and thus simplify the layout.

As described above, first and second hydraulic units HU11 and HU12 includes first and second power supplies BATT1 and BATT2, respectively. According to this construction, one of first and second hydraulic units HU11 and HU12 is available for producing braking efforts even when one of first and second power supplies BATT1 and BATT2 is failed.

Figure 30:
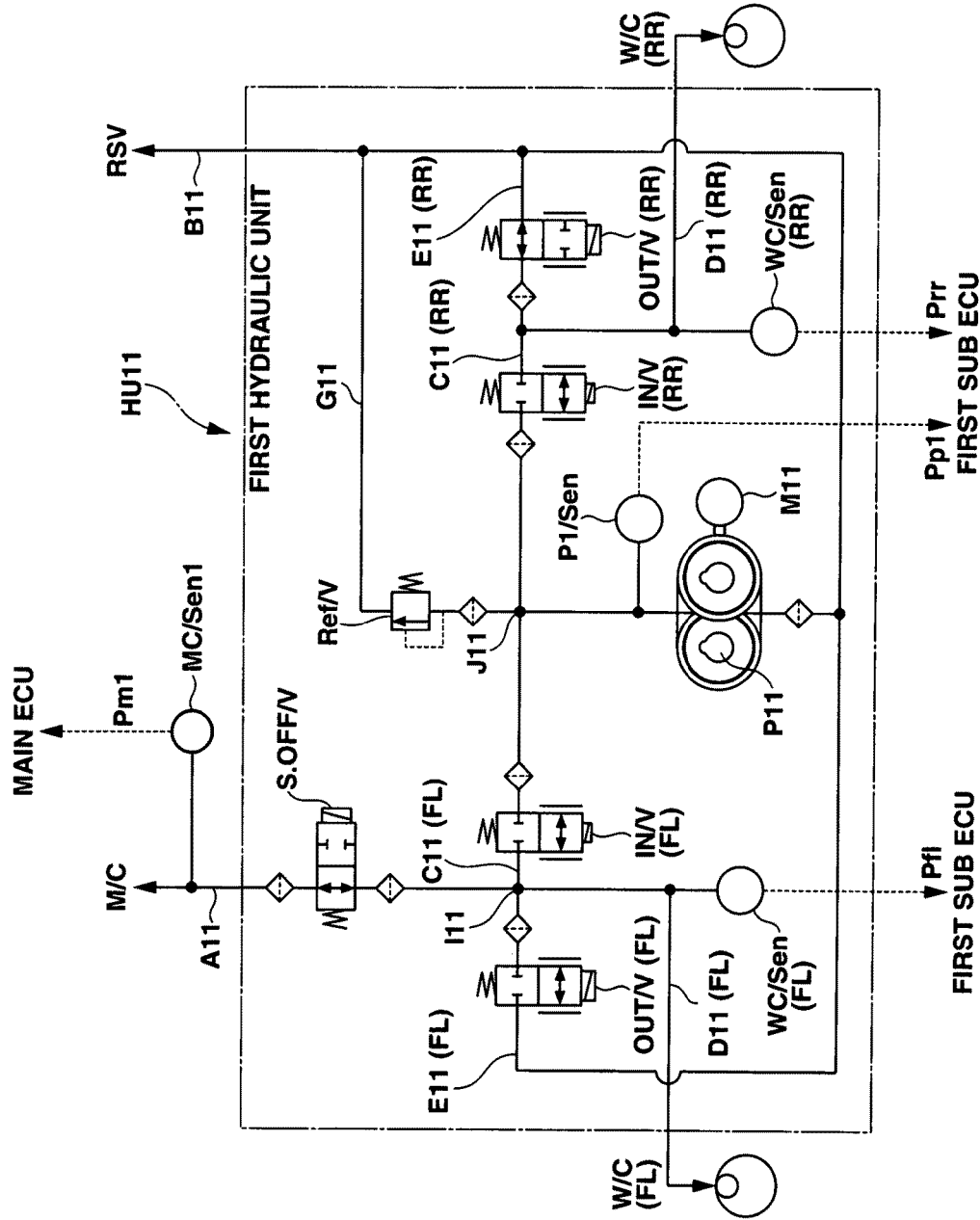
FIG. 30 is a hydraulic circuit diagram of a first hydraulic unit according to an eighth embodiment of the present invention.
Figure 31:
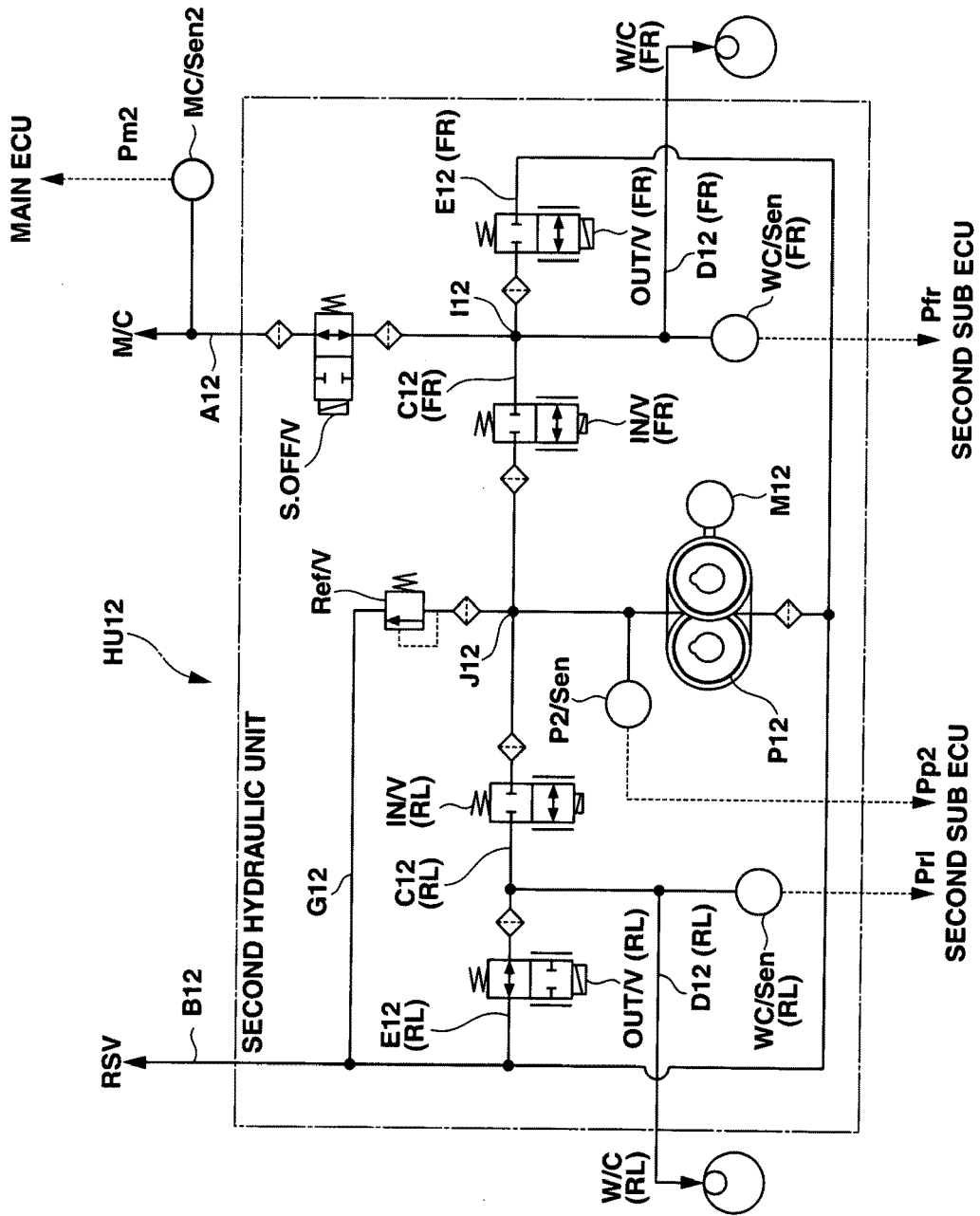
FIG. 31 is a hydraulic circuit diagram of a second hydraulic unit according to the eighth embodiment.

The following describes a brake control apparatus according to an eighth embodiment of the present invention with reference to FIGS. 30 and 31. The eighth embodiment is constructed based on the seventh embodiment. Although inlet valves IN/V(FL), IN/V(FR), IN/V(RL) and IN/V(RR) are normally open electromagnetic valves in the seventh embodiment, inlet valves IN/V(FL), IN/V(FR), IN/V(RL) and IN/V(RR) are normally closed electromagnetic valves in the eighth embodiment. Accordingly, there is no check valves C/V(FL), C/V(FR), C/V(RL) and C/V(RR) in fluid passages C11(FL), C11(FR), C11(RL) and C11(RR). Thus, front left and rear right inlet valves IN/V(FL) and IN/V(RR) are directly hydraulically connected to each other, while front right and rear left inlet valves IN/V(FR) and IN/V(RL) are directly hydraulically connected to each other.

The brake control apparatus according to the eighth embodiment performs Step S30 in FIG. 3 in which the inlet valve control mode of each inlet valve is determined. Specifically, the brake control apparatus performs one of the process for selection of inlet valve control mode according to the first embodiment shown in FIG. 6 and the process for selection of inlet valve control mode according to the second embodiment shown in FIG. 16, and performs the process for selection of inlet valve control mode according to the fourth embodiment shown in FIG. 21.

This application is based on a prior Japanese Patent Application No. 2006-310251 filed on Nov. 16, 2006. The entire contents of this Japanese Patent Application No. 2006-310251 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A brake control apparatus for a wheeled vehicle, comprising:
a plurality of wheel cylinders adapted to respective ones of wheels of the vehicle;
a pump hydraulically connected to the wheel cylinders for pressurizing the wheel cylinders;
a motor for driving the pump;
a plurality of control valves hydraulically connected between the pump and respective ones of the wheel cylinders for allowing fluid communication therebetween with respective variable cross-sectional flow areas;
a pressure sensor for measuring an internal pressure of each of the wheel cylinders; and
a control unit for performing wheel cylinder pressure control of controlling the internal pressures of the wheel cylinders by the motor and the control valves so as to conform the measured internal pressures of the wheel cylinders to respective ones of desired internal pressures of the wheel cylinders, the control unit being configured to, during the wheel cylinder pressure control, constantly keep a condition that the cross-sectional flow area of at least one of the control valves is maximized.

2. The brake control apparatus as claimed in claim 1, wherein the control unit is configured to implement the keeping the condition by:
identifying one of the wheel cylinders that is the highest in the desired internal pressure among all the wheel cylinders; and
maximizing the cross-sectional flow area of one of the control valves hydraulically connected between the pump and the identified one of the wheel cylinders.

3. The brake control apparatus as claimed in claim 2, wherein the control unit is further configured to:
determine an estimated discharge pressure of the pump in accordance with the measured internal pressure of the identified one of the wheel cylinders; and
implement the wheel cylinder pressure control by feedforward control based on the estimated discharge pressure of the pump.

4. The brake control apparatus as claimed in claim 2, wherein the control unit is configured to implement the keeping the condition by:
determining whether or not at least two of the wheel cylinders are equal in the desired internal pressure to each other and are the highest in the desired internal pressure among all the wheel cylinders; and
maximizing the cross-sectional flow area of at least two of the control valves hydraulically connected between the pump and respective ones of the at least two of the wheel cylinders, when determining that the at least two of the wheel cylinders are equal in the desired internal pressure to each other and are the highest in the desired internal pressure among all the wheel cylinders.

5. The brake control apparatus as claimed in claim 1, wherein the control unit is configured to implement the keeping the condition by:
determining for each of the wheel cylinders whether or not it is desired to increase the internal pressure of the each of the wheel cylinders;
identifying one of the wheel cylinders that is the highest in the desired internal pressure among at least one of the wheel cylinders, when determining that it is desired to increase the internal pressure of the at least one of the wheel cylinders; and
maximizing the cross-sectional flow area of one of the control valves hydraulically connected between the pump and the identified one of the wheel cylinders.

6. The brake control apparatus as claimed in claim 5, wherein the control unit is further configured to:
determine an estimated discharge pressure of the pump; and
implement the wheel cylinder pressure control by feedforward control based on the estimated discharge pressure of the pump.

7. The brake control apparatus as claimed in claim 6, wherein the control unit is configured to, when determining during the wheel cylinder pressure control that it is desired to increase the internal pressure of none of the wheel cylinders, implement the keeping the condition by:
  identifying one of the wheel cylinders that is the highest in the desired internal pressure among all the wheel cylinders;
  maximizing the cross-sectional flow area of one of the control valves hydraulically connected between the pump and the identified one of the wheel cylinders; and
  determining the estimated discharge pressure of the pump in accordance with the measured internal pressure of the identified one of the wheel cylinders.

8. The brake control apparatus as claimed in claim 1, wherein:
  the control valves are normally closed valves; and
  the control unit is further configured to:
    determine whether or not a predetermined precondition is satisfied; and
    inhibit the keeping the condition, when determining that the predetermined precondition is satisfied.

9. The brake control apparatus as claimed in claim 8, wherein the control unit is further configured to:
  determine whether or not at least one of first, second and third conditions is satisfied; and
  determine that the predetermined precondition is satisfied, when determining that at least one of the first, second and third conditions is satisfied, wherein:
  the first condition is a condition that the cross-sectional flow area of at least one of the control valves continues to be maximized over a predetermined period of time;
  the second condition is a condition that the vehicle is stationary; and
  the third condition is a condition that at least one of the control valves has a temperature higher than or equal to a predetermined temperature value.

10. The brake control apparatus as claimed in claim 1, further comprising:
  a plurality of unidirectional valves hydraulically connected between the pump and respective ones of the control valves for allowing fluid flow from the pump to the respective ones of the control valves and inhibiting fluid flow from the respective ones of the control valves to the pump,
  wherein the control unit is configured to implement the keeping the condition by:
    identifying a first one of the wheel cylinders that is the highest in the desired internal pressure among all the wheel cylinders;
    maximizing the cross-sectional flow area of one of the control valves hydraulically connected between the pump and the first identified one of the wheel cylinders;
    determining for each of the wheel cylinders whether or not it is desired to increase the internal pressure of the each of the wheel cylinders; and
    when determining that it is desired to increase the internal pressure of at least one of the wheel cylinders,
      identifying a second one of the wheel cylinders that is the highest in the desired internal pressure among the at least one of the wheel cylinders; and
      maximizing the cross-sectional flow area of one of the control valves hydraulically connected between the pump and the second identified one of the wheel cylinders.

11. A brake control apparatus for a wheeled vehicle, comprising:
  a plurality of wheel cylinders adapted to respective ones of wheels of the vehicle;
  a pump hydraulically connected to the wheel cylinders for pressurizing the wheel cylinders;
  drive means for driving the pump;
  a plurality of control valves hydraulically connected between the pump and respective ones of the wheel cylinders for allowing fluid communication therebetween with respective variable cross-sectional flow areas;
  means for measuring an internal pressure of each of the wheel cylinders; and
  control means for performing wheel cylinder pressure control of controlling the internal pressures of the wheel cylinders by the drive means and the control valves so as to conform the measured internal pressures of the wheel cylinders to respective ones of desired internal pressures of the wheel cylinders, the control means being configured to, during the wheel cylinder pressure control, constantly keep a condition that the cross-sectional flow area of at least one of the control valves is maximized.

12. The brake control apparatus as claimed in claim 11, wherein the control means is configured to implement the keeping the condition by:
  identifying one of the wheel cylinders that is the highest in the desired internal pressure among all the wheel cylinders; and
  maximizing the cross-sectional flow area of one of the control valves hydraulically connected between the pump and the identified one of the wheel cylinders.

13. The brake control apparatus as claimed in claim 12, wherein the control means is further configured to:
  determine an estimated discharge pressure of the pump; and
  implement the wheel cylinder pressure control by feedforward control based on the estimated discharge pressure of the pump.

14. The brake control apparatus as claimed in claim 12, wherein the control means is configured to implement the keeping the condition by:
  determining whether or not at least two of the wheel cylinders are equal in the desired internal pressure to each other and are the highest in the desired internal pressure among all the wheel cylinders; and
  maximizing the cross-sectional flow area of at least two of the control valves hydraulically connected between the pump and respective ones of the at least two of the wheel cylinders, when determining that the at least two of the wheel cylinders are equal in the desired internal pressure to each other and are the highest in the desired internal pressure among all the wheel cylinders.

15. The brake control apparatus as claimed in claim 11, wherein the control means is configured to implement the keeping the condition by:
  determining for each of the wheel cylinders whether or not it is desired to increase the internal pressure of the each of the wheel cylinders;
  identifying one of the wheel cylinders that is the highest in the desired internal pressure among at least one of the wheel cylinders, when determining that it is desired to increase the internal pressure of the at least one of the wheel cylinders; and
  maximizing the cross-sectional flow area of one of the control valves hydraulically connected between the pump and the identified one of the wheel cylinders.

16. The brake control apparatus as claimed in claim 15, wherein the control means is further configured to:
  determine an estimated discharge pressure of the pump; and implement the wheel cylinder pressure control by feedforward control based on the estimated discharge pressure of the pump.

17. The brake control apparatus as claimed in claim 16, wherein the control means is configured to, when determining during the wheel cylinder pressure control that it is desired to increase the internal pressure of none of the wheel cylinders, implement the keeping the condition by:
   identifying one of the wheel cylinders that is the highest in the desired internal pressure among all the wheel cylinders;
   maximizing the cross-sectional flow area of one of the control valves hydraulically connected between the pump and the identified one of the wheel cylinders; and
   determining the estimated discharge pressure of the pump in accordance with the measured internal pressure of the identified one of the wheel cylinders.

18. The brake control apparatus as claimed in claim 11, wherein:
   the control valves are normally closed valves; and
   the control means is further configured to:
      determine whether or not a predetermined precondition is satisfied; and
      inhibit the keeping the condition, when determining that the predetermined precondition is satisfied.

19. The brake control apparatus as claimed in claim 18, wherein the control means is further configured to:
   determine whether or not at least one of first, second and third conditions is satisfied; and
   determine that the predetermined precondition is satisfied, when determining that at least one of the first, second and third conditions is satisfied, wherein:
   the first condition is a condition that the cross-sectional flow area of at least one of the control valves continues to be maximized over a predetermined period of time;
   the second condition is a condition that the vehicle is stationary; and
   the third condition is a condition that at least one of the control valves has a temperature higher than or equal to a predetermined temperature value.

20. The brake control apparatus as claimed in claim 11, further comprising:
   a plurality of unidirectional valves hydraulically connected between the pump and respective ones of the control valves for allowing fluid flow from the pump to the respective ones of the control valves and inhibiting fluid flow from the respective ones of the control valves to the pump,
   wherein the control means is configured to implement the keeping the condition by:
      identifying a first one of the wheel cylinders that is the highest in the desired internal pressure among all the wheel cylinders;
      maximizing the cross-sectional flow area of one of the control valves hydraulically connected between the pump and the first identified one of the wheel cylinders;
      determining for each of the wheel cylinders whether or not it is desired to increase the internal pressure of the each of the wheel cylinders; and
      when determining that it is desired to increase the internal pressure of at least one of the wheel cylinders, and that it is not desired to increase the first identified one of the wheel cylinders:
         identifying a second one of the wheel cylinders that is the highest in the desired internal pressure among the at least one of the wheel cylinders; and
         maximizing the cross-sectional flow area of one of the control valves hydraulically connected between the pump and the second identified one of the wheel cylinders.

* * * * *